United States Patent
Chaturvedi et al.

(10) Patent No.: US 10,091,025 B2
(45) Date of Patent: Oct. 2, 2018

(54) SYSTEM AND METHOD FOR ENABLING USE OF A SINGLE USER IDENTIFIER ACROSS INCOMPATIBLE NETWORKS FOR UCC FUNCTIONALITY

(71) Applicant: DAMAKA, INC., Richardson, TX (US)

(72) Inventors: Sivakumar Chaturvedi, Allen, TX (US); Satish Gundabathula, Irving, TX (US); Rashmi Lohita, Allen, TX (US)

(73) Assignee: DAMAKA, INC., Richardson, TX (US)

( * ) Notice: Subject to any disclaimer, the term of this patent is extended or adjusted under 35 U.S.C. 154(b) by 109 days.

(21) Appl. No.: 15/090,394

(22) Filed: Apr. 4, 2016

(65) Prior Publication Data

US 2017/0288904 A1 Oct. 5, 2017

Related U.S. Application Data

(60) Provisional application No. 62/316,133, filed on Mar. 31, 2016.

(51) Int. Cl.
*G06F 15/16* (2006.01)
*H04L 12/46* (2006.01)
(Continued)

(52) U.S. Cl.
CPC ........ *H04L 12/4625* (2013.01); *H04L 12/184* (2013.01); *H04L 51/36* (2013.01); *H04L 61/103* (2013.01); *H04L 65/40* (2013.01)

(58) Field of Classification Search
CPC ... H04L 12/4625; H04L 51/36; H04L 61/103; H04L 65/40
(Continued)

(56) References Cited

U.S. PATENT DOCUMENTS

| | | |
|---|---|---|
| 5,442,637 A | 8/1995 | Nguyen |
| 5,761,309 A | 6/1998 | Ohashi et al. |

(Continued)

FOREIGN PATENT DOCUMENTS

| | | |
|---|---|---|
| EP | 1404082 A2 | 3/2004 |
| EP | 160339 A1 | 12/2005 |

(Continued)

OTHER PUBLICATIONS

International Search Report and Written Opinion of the International Searching Authority from PCT/US2006/040312, dated Mar. 2, 2007.

(Continued)

*Primary Examiner* — Thu Ha T Nguyen
(74) *Attorney, Agent, or Firm* — Gregory M. Howlson

(57) ABSTRACT

A method and system for supporting a cross-domain communication session between communication platforms using a bridge server are provided. In one example, the method includes registering the bridge server with multiple platforms using a user identifier. A request is received from one of the platforms to establish a communication session with a user corresponding to the user identifier. A communication leg is created for each of the platforms. The leg from which the request was received is an incoming leg and the other legs are outgoing legs. The request is sent over the outgoing legs. An acceptance is received from one of the outgoing legs. A cancel message is sent over the outgoing legs from which the acceptance was not received. The acceptance is sent over the incoming leg. The incoming leg and the outgoing leg from which the acceptance was received are bridged to establish the session.

30 Claims, 36 Drawing Sheets

(51) Int. Cl.
  *H04L 29/12*   (2006.01)
  *H04L 12/58*   (2006.01)
  *H04L 29/06*   (2006.01)
  *H04L 12/18*   (2006.01)

(58) Field of Classification Search
  USPC .................................. 709/227, 228, 229
  See application file for complete search history.

(56) References Cited

U.S. PATENT DOCUMENTS

| | | |
|---|---|---|
| 5,790,637 A | 8/1998 | Johnson et al. |
| 5,818,447 A | 10/1998 | Wolf et al. |
| 5,889,762 A | 3/1999 | Pajuvirta et al. |
| 6,031,818 A | 2/2000 | Lo et al. |
| 6,128,283 A | 10/2000 | Sabaa et al. |
| 6,141,687 A | 10/2000 | Blair |
| 6,161,082 A | 12/2000 | Goldberg et al. |
| 6,195,694 B1 | 2/2001 | Chen et al. |
| 6,202,084 B1 | 3/2001 | Kumar et al. |
| 6,219,638 B1 | 4/2001 | Padmanabhan et al. |
| 6,298,129 B1 | 10/2001 | Culver et al. |
| 6,311,150 B1 | 10/2001 | Ramaswamy et al. |
| 6,343,067 B1 | 1/2002 | Drottar et al. |
| 6,360,196 B1 | 3/2002 | Poznaski et al. |
| 6,389,016 B1 | 5/2002 | Sabaa et al. |
| 6,438,376 B1 | 8/2002 | Elliott et al. |
| 6,473,425 B1 | 10/2002 | Bellaton et al. |
| 6,574,668 B1 | 6/2003 | Gubbi et al. |
| 6,606,112 B1 | 8/2003 | Falco |
| 6,654,794 B1* | 11/2003 | French .................. H04L 29/06 709/217 |
| 6,741,691 B1 | 5/2004 | Ritter et al. |
| 6,754,181 B1 | 6/2004 | Elliott et al. |
| 6,766,373 B1 | 7/2004 | Beadle |
| 6,826,613 B1 | 11/2004 | Wang et al. |
| 6,836,765 B1 | 12/2004 | Sussman |
| 6,842,460 B1 | 1/2005 | Olkkonen et al. |
| 6,850,769 B2 | 2/2005 | Grob et al. |
| 6,898,413 B2 | 5/2005 | Yip et al. |
| 6,912,278 B1 | 6/2005 | Hamilton |
| 6,940,826 B1 | 9/2005 | Simard et al. |
| 6,963,555 B1 | 11/2005 | Brenner et al. |
| 6,975,718 B1 | 12/2005 | Pearce et al. |
| 6,987,756 B1 | 1/2006 | Ravindranath et al. |
| 6,999,469 B1* | 2/2006 | Chu .......................... H04L 51/36 370/466 |
| 6,999,575 B1 | 2/2006 | Sheinbein |
| 6,999,932 B1 | 2/2006 | Zhou |
| 7,006,508 B2 | 2/2006 | Bondy et al. |
| 7,010,109 B2 | 3/2006 | Gritzer et al. |
| 7,013,155 B1 | 3/2006 | Ruf et al. |
| 7,028,312 B1* | 4/2006 | Merrick .................. G06F 9/547 709/203 |
| 7,079,529 B1 | 7/2006 | Khuc |
| 7,080,158 B1 | 7/2006 | Squire |
| 7,092,385 B2 | 8/2006 | Gallant et al. |
| 7,117,526 B1 | 10/2006 | Short |
| 7,123,710 B2 | 10/2006 | Ravishankar |
| 7,184,415 B2 | 2/2007 | Chaney et al. |
| 7,185,114 B1 | 2/2007 | Hariharasubrahmanian |
| 7,272,377 B2 | 9/2007 | Cox et al. |
| 7,302,496 B1 | 11/2007 | Metzger |
| 7,304,985 B2 | 12/2007 | Sojka et al. |
| 7,345,999 B2 | 3/2008 | Su et al. |
| 7,346,044 B1 | 3/2008 | Chou et al. |
| 7,353,252 B1 | 4/2008 | Yang et al. |
| 7,353,255 B2 | 4/2008 | Acharya et al. |
| 7,412,374 B1 | 8/2008 | Seiler et al. |
| 7,457,279 B1 | 11/2008 | Scott et al. |
| 7,477,282 B2 | 1/2009 | Firestone et al. |
| 7,487,248 B2 | 2/2009 | Moran et al. |
| 7,512,652 B1 | 3/2009 | Appelman et al. |
| 7,542,472 B1 | 6/2009 | Gerendai et al. |
| 7,564,843 B2 | 7/2009 | Manjunatha et al. |
| 7,570,743 B2 | 8/2009 | Barclay et al. |
| 7,574,523 B2 | 8/2009 | Traversat et al. |
| 7,590,758 B2 | 9/2009 | Takeda et al. |
| 7,613,171 B2 | 11/2009 | Zehavi et al. |
| 7,623,476 B2 | 11/2009 | Ravikumar et al. |
| 7,623,516 B2 | 11/2009 | Chaturvedi et al. |
| 7,656,870 B2 | 2/2010 | Ravikumar et al. |
| 7,664,495 B1 | 2/2010 | Bonner et al. |
| 7,665,094 B2* | 2/2010 | Frender .................. G06F 9/465 715/716 |
| 7,769,881 B2 | 8/2010 | Matsubara et al. |
| 7,774,495 B2 | 8/2010 | Pabla et al. |
| 7,778,187 B2 | 8/2010 | Chaturvedi et al. |
| 7,782,866 B1 | 8/2010 | Walsh et al. |
| 7,796,984 B2* | 9/2010 | Hursey ................. H04Q 3/0025 455/414.1 |
| 7,882,247 B2* | 2/2011 | Sturniolo .............. H04L 63/0272 709/228 |
| 7,917,584 B2 | 3/2011 | Arthursson |
| 8,009,586 B2 | 8/2011 | Chaturvedi et al. |
| 8,065,418 B1 | 11/2011 | Abuan et al. |
| 8,200,796 B1 | 6/2012 | Margulis |
| 8,218,532 B1* | 7/2012 | Burritt ............... H04M 3/42391 370/352 |
| 8,407,576 B1 | 3/2013 | Yin et al. |
| 9,712,507 B2* | 7/2017 | Chaturvedi ........... H04L 63/061 |
| 10,002,115 B1* | 6/2018 | Killian ................. G06F 17/2247 |
| 2001/0050923 A1 | 12/2001 | Park et al. |
| 2002/0031212 A1 | 3/2002 | O'Neil et al. |
| 2002/0037000 A1 | 3/2002 | Park et al. |
| 2002/0038282 A1 | 3/2002 | Montgomery |
| 2002/0042769 A1 | 4/2002 | Gujral et al. |
| 2002/0062285 A1 | 5/2002 | Amann et al. |
| 2002/0064167 A1 | 5/2002 | Khan et al. |
| 2002/0080719 A1 | 6/2002 | Parkvall et al. |
| 2002/0087887 A1 | 7/2002 | Busam et al. |
| 2002/0097150 A1 | 7/2002 | Sandelman et al. |
| 2002/0120757 A1 | 8/2002 | Sutherland et al. |
| 2002/0124096 A1 | 9/2002 | Loguinov et al. |
| 2002/0143548 A1 | 10/2002 | Korall et al. |
| 2002/0150110 A1 | 10/2002 | Inbar et al. |
| 2002/0152325 A1 | 10/2002 | Elgebaly et al. |
| 2002/0156844 A1 | 10/2002 | Maehiro |
| 2002/0166053 A1 | 11/2002 | Wilson |
| 2002/0173303 A1 | 11/2002 | Shibutani |
| 2002/0176404 A1 | 11/2002 | Girard |
| 2002/0178087 A1 | 11/2002 | Henderson et al. |
| 2002/0184310 A1 | 12/2002 | Traversat et al. |
| 2003/0009565 A1 | 1/2003 | Arao |
| 2003/0031210 A1 | 2/2003 | Harris |
| 2003/0035441 A1 | 2/2003 | Cheng et al. |
| 2003/0043764 A1 | 3/2003 | Kim et al. |
| 2003/0044020 A1 | 3/2003 | Aboba et al. |
| 2003/0046056 A1 | 3/2003 | Godoy et al. |
| 2003/0046585 A1 | 3/2003 | Minnick |
| 2003/0061025 A1 | 3/2003 | Abir |
| 2003/0061481 A1 | 3/2003 | Levine et al. |
| 2003/0072485 A1 | 4/2003 | Guerin et al. |
| 2003/0076815 A1 | 4/2003 | Miller et al. |
| 2003/0078858 A1 | 4/2003 | Angelopoulos et al. |
| 2003/0088676 A1 | 5/2003 | Smith et al. |
| 2003/0105812 A1 | 6/2003 | Flowers, Jr. et al. |
| 2003/0110047 A1 | 6/2003 | Santosuosso |
| 2003/0115251 A1 | 6/2003 | Fredrickson et al. |
| 2003/0126213 A1 | 7/2003 | Betzler |
| 2003/0135569 A1 | 7/2003 | Khakoo et al. |
| 2003/0137939 A1 | 7/2003 | Dunning et al. |
| 2003/0158722 A1 | 8/2003 | Lord |
| 2003/0163525 A1 | 8/2003 | Hendriks et al. |
| 2003/0163697 A1 | 8/2003 | Pabla et al. |
| 2003/0172145 A1 | 9/2003 | Nguyen |
| 2003/0174707 A1 | 9/2003 | Grob et al. |
| 2003/0177186 A1 | 9/2003 | Goodman et al. |
| 2003/0177422 A1 | 9/2003 | Tararoukhine et al. |
| 2003/0187650 A1 | 10/2003 | Moore et al. |
| 2003/0202480 A1 | 10/2003 | Swami |
| 2003/0212772 A1 | 11/2003 | Harris |
| 2003/0214955 A1 | 11/2003 | Kim |
| 2003/0217171 A1 | 11/2003 | Von Stuermer et al. |

(56) References Cited

U.S. PATENT DOCUMENTS

| | | |
|---|---|---|
| 2003/0217318 A1 | 11/2003 | Choi |
| 2003/0220121 A1 | 11/2003 | Konishi et al. |
| 2003/0229715 A1 | 12/2003 | Baratakke et al. |
| 2004/0005877 A1 | 1/2004 | Vaananen |
| 2004/0024879 A1 | 2/2004 | Dingman et al. |
| 2004/0034776 A1 | 2/2004 | Fernando et al. |
| 2004/0034793 A1 | 2/2004 | Yuan |
| 2004/0039781 A1 | 2/2004 | Lavallee et al. |
| 2004/0044517 A1 | 3/2004 | Palmquist |
| 2004/0052234 A1 | 3/2004 | Ameigeiras et al. |
| 2004/0062267 A1 | 4/2004 | Minami et al. |
| 2004/0068567 A1 | 4/2004 | Moran et al. |
| 2004/0100973 A1 | 5/2004 | Prasad |
| 2004/0103212 A1 | 5/2004 | Takeuchi et al. |
| 2004/0128554 A1 | 7/2004 | Maher, III et al. |
| 2004/0133689 A1 | 7/2004 | Vasisht |
| 2004/0139225 A1 | 7/2004 | Takahashi |
| 2004/0139228 A1 | 7/2004 | Takeda et al. |
| 2004/0139230 A1 | 7/2004 | Kim |
| 2004/0143678 A1 | 7/2004 | Chari et al. |
| 2004/0148434 A1 | 7/2004 | Matsubara et al. |
| 2004/0153858 A1 | 8/2004 | Hwang |
| 2004/0158471 A1 | 8/2004 | Davis et al. |
| 2004/0162871 A1 | 8/2004 | Pabla et al. |
| 2004/0203834 A1 | 10/2004 | Mahany |
| 2004/0213184 A1 | 10/2004 | Hu et al. |
| 2004/0228279 A1 | 11/2004 | Midtun et al. |
| 2004/0240399 A1 | 12/2004 | Corrao et al. |
| 2004/0249885 A1 | 12/2004 | Petropoulakis et al. |
| 2004/0249953 A1 | 12/2004 | Fernandez et al. |
| 2004/0260952 A1 | 12/2004 | Newman et al. |
| 2004/0267527 A1 | 12/2004 | Creamer et al. |
| 2004/0267938 A1 | 12/2004 | Shoroff et al. |
| 2004/0268257 A1 | 12/2004 | Mudusuru |
| 2005/0004982 A1 | 1/2005 | Vernon et al. |
| 2005/0008024 A1 | 1/2005 | Newpol et al. |
| 2005/0015502 A1 | 1/2005 | Kang et al. |
| 2005/0033843 A1 | 2/2005 | Shahi et al. |
| 2005/0033985 A1 | 2/2005 | Xu et al. |
| 2005/0050227 A1 | 3/2005 | Michelman |
| 2005/0071481 A1 | 3/2005 | Danieli |
| 2005/0086309 A1 | 4/2005 | Galli et al. |
| 2005/0091407 A1 | 4/2005 | Vaziri et al. |
| 2005/0105524 A1 | 5/2005 | Stevens et al. |
| 2005/0119005 A1 | 6/2005 | Segal et al. |
| 2005/0120073 A1 | 6/2005 | Cho |
| 2005/0130650 A1 | 6/2005 | Creamer et al. |
| 2005/0132009 A1 | 6/2005 | Solie |
| 2005/0136911 A1 | 6/2005 | Csapo et al. |
| 2005/0138119 A1 | 6/2005 | Saridakis |
| 2005/0138128 A1 | 6/2005 | Baniel et al. |
| 2005/0143105 A1 | 6/2005 | Okamoto |
| 2005/0144242 A1* | 6/2005 | Marston .................. H04L 51/34 709/206 |
| 2005/0144288 A1 | 6/2005 | Liao |
| 2005/0187781 A1 | 8/2005 | Christensen |
| 2005/0187957 A1 | 8/2005 | Kramer et al. |
| 2005/0195802 A1 | 9/2005 | Klein et al. |
| 2005/0198499 A1 | 9/2005 | Salapaka et al. |
| 2005/0201357 A1 | 9/2005 | Poyhonen |
| 2005/0201485 A1 | 9/2005 | Fay |
| 2005/0208947 A1 | 9/2005 | Bahl |
| 2005/0220017 A1 | 10/2005 | Brand et al. |
| 2005/0246193 A1 | 11/2005 | Roever et al. |
| 2005/0249196 A1 | 11/2005 | Ansari et al. |
| 2005/0254440 A1 | 11/2005 | Sorrell |
| 2005/0259656 A1* | 11/2005 | Dollar .................... H04L 51/04 370/392 |
| 2005/0270992 A1 | 12/2005 | Sanzgiri et al. |
| 2005/0286519 A1 | 12/2005 | Ravikumar et al. |
| 2006/0002355 A1 | 1/2006 | Baek et al. |
| 2006/0026091 A1* | 2/2006 | Keen, Jr. ............... G06Q 40/025 705/37 |
| 2006/0062180 A1 | 3/2006 | Sayeedi et al. |
| 2006/0069775 A1 | 3/2006 | Artobello et al. |
| 2006/0072506 A1 | 4/2006 | Sayeedi et al. |
| 2006/0120375 A1 | 6/2006 | Ravikumar et al. |
| 2006/0121902 A1 | 6/2006 | Jagadeesan et al. |
| 2006/0121986 A1 | 6/2006 | Pelkey et al. |
| 2006/0123428 A1* | 6/2006 | Burns .................... G06F 21/34 719/318 |
| 2006/0148516 A1 | 7/2006 | Reddy et al. |
| 2006/0165029 A1 | 7/2006 | Melpignano et al. |
| 2006/0168643 A1 | 7/2006 | Howard et al. |
| 2006/0171534 A1 | 8/2006 | Baughman |
| 2006/0182100 A1 | 8/2006 | Li et al. |
| 2006/0183476 A1 | 8/2006 | Morita et al. |
| 2006/0187926 A1 | 8/2006 | Imai |
| 2006/0195402 A1 | 8/2006 | Malina et al. |
| 2006/0203750 A1 | 9/2006 | Ravikumar et al. |
| 2006/0205436 A1 | 9/2006 | Liu et al. |
| 2006/0218624 A1 | 9/2006 | Ravikumar et al. |
| 2006/0230166 A1 | 10/2006 | Philyaw |
| 2006/0233117 A1 | 10/2006 | Tomsu et al. |
| 2006/0246903 A1 | 11/2006 | Kong et al. |
| 2006/0258289 A1 | 11/2006 | Dua |
| 2007/0016921 A1 | 1/2007 | Levi et al. |
| 2007/0019545 A1 | 1/2007 | Alt et al. |
| 2007/0025270 A1 | 2/2007 | Sylvain |
| 2007/0078785 A1 | 4/2007 | Bush et al. |
| 2007/0082671 A1 | 4/2007 | Feng et al. |
| 2007/0110043 A1 | 5/2007 | Girard |
| 2007/0111794 A1 | 5/2007 | Hogan et al. |
| 2007/0116224 A1 | 5/2007 | Burke et al. |
| 2007/0130253 A1 | 6/2007 | Newson et al. |
| 2007/0136459 A1 | 6/2007 | Roche et al. |
| 2007/0165629 A1 | 7/2007 | Chaturvedi et al. |
| 2007/0190987 A1 | 8/2007 | Vaananen |
| 2007/0206563 A1 | 9/2007 | Silver et al. |
| 2007/0239892 A1 | 10/2007 | Ott et al. |
| 2007/0253435 A1 | 11/2007 | Keller et al. |
| 2007/0260359 A1 | 11/2007 | Benson et al. |
| 2007/0274276 A1 | 11/2007 | Laroia et al. |
| 2007/0280253 A1 | 12/2007 | Rooholamini et al. |
| 2007/0288657 A1* | 12/2007 | Koskimies ............ H04L 67/303 709/246 |
| 2007/0294626 A1 | 12/2007 | Fletcher et al. |
| 2007/0297430 A1 | 12/2007 | Nykanen et al. |
| 2008/0005328 A1 | 1/2008 | Shively et al. |
| 2008/0019285 A1 | 1/2008 | John et al. |
| 2008/0032695 A1 | 2/2008 | Zhu et al. |
| 2008/0046984 A1 | 2/2008 | Bohmer et al. |
| 2008/0069105 A1 | 3/2008 | Costa et al. |
| 2008/0080392 A1 | 4/2008 | Walsh et al. |
| 2008/0091813 A1 | 4/2008 | Bodlaender |
| 2008/0123685 A1 | 5/2008 | Varma et al. |
| 2008/0130639 A1 | 6/2008 | Costa-Requena et al. |
| 2008/0168440 A1 | 7/2008 | Regnier et al. |
| 2008/0192756 A1 | 8/2008 | Damola et al. |
| 2008/0235362 A1 | 9/2008 | Kjesbu et al. |
| 2008/0235511 A1 | 9/2008 | O'Brien et al. |
| 2008/0244718 A1 | 10/2008 | Frost et al. |
| 2008/0250408 A1 | 10/2008 | Tsui et al. |
| 2008/0273541 A1 | 11/2008 | Pharn |
| 2008/0320096 A1 | 12/2008 | Szeto |
| 2008/0320565 A1 | 12/2008 | Buch et al. |
| 2009/0003322 A1 | 1/2009 | Isumi |
| 2009/0006076 A1 | 1/2009 | Jindal |
| 2009/0052399 A1 | 2/2009 | Silver et al. |
| 2009/0055473 A1 | 2/2009 | Synnergren |
| 2009/0088150 A1 | 4/2009 | Chaturvedi et al. |
| 2009/0136016 A1 | 5/2009 | Gornoi et al. |
| 2009/0156217 A1 | 6/2009 | Bajpai |
| 2009/0182815 A1 | 7/2009 | Czechowski et al. |
| 2009/0187831 A1* | 7/2009 | Tiwana ................ G06Q 10/107 715/752 |
| 2009/0192976 A1 | 7/2009 | Spivack et al. |
| 2009/0234967 A1 | 9/2009 | Yu et al. |
| 2009/0240821 A1 | 9/2009 | Juncker et al. |
| 2009/0257433 A1 | 10/2009 | Mutikainen et al. |
| 2009/0300673 A1 | 12/2009 | Bachet et al. |

(56) References Cited

U.S. PATENT DOCUMENTS

| | | | |
|---|---|---|---|
| 2009/0303926 A1* | 12/2009 | Den Hartog | H04L 12/2809 370/328 |
| 2009/0327516 A1 | 12/2009 | Amishima et al. | |
| 2010/0011108 A1 | 1/2010 | Clark et al. | |
| 2010/0011111 A1 | 1/2010 | Vizaei | |
| 2010/0049980 A1 | 2/2010 | Barriga et al. | |
| 2010/0077023 A1 | 3/2010 | Eriksson | |
| 2010/0103837 A1* | 4/2010 | Jungck | H04L 29/12066 370/252 |
| 2010/0107205 A1 | 4/2010 | Foti | |
| 2010/0174783 A1 | 7/2010 | Zarom | |
| 2010/0191954 A1 | 7/2010 | Kim et al. | |
| 2010/0208634 A1* | 8/2010 | Eng | H04L 45/00 370/310 |
| 2010/0212004 A1* | 8/2010 | Fu | G06F 21/6218 726/9 |
| 2010/0223047 A1 | 9/2010 | Christ | |
| 2010/0279670 A1 | 11/2010 | Ghai et al. | |
| 2010/0299150 A1 | 11/2010 | Fein et al. | |
| 2010/0299313 A1 | 11/2010 | Orsini et al. | |
| 2010/0312832 A1 | 12/2010 | Allen et al. | |
| 2010/0312897 A1 | 12/2010 | Allen et al. | |
| 2011/0040836 A1 | 2/2011 | Allen et al. | |
| 2011/0099612 A1 | 4/2011 | Lee et al. | |
| 2011/0122864 A1 | 5/2011 | Cherifi et al. | |
| 2011/0141220 A1 | 6/2011 | Miura | |
| 2011/0145687 A1 | 6/2011 | Grigsby et al. | |
| 2011/0307556 A1 | 12/2011 | Chaturvedi et al. | |
| 2011/0314134 A1 | 12/2011 | Foti | |
| 2011/0320821 A1 | 12/2011 | Alkhatib et al. | |
| 2012/0078609 A1 | 3/2012 | Chaturvedi et al. | |
| 2012/0124191 A1 | 5/2012 | Lyon | |
| 2012/0246325 A1* | 9/2012 | Pancorbo Marcos | H04L 63/102 709/227 |
| 2012/0263144 A1 | 10/2012 | Nix | |
| 2013/0067004 A1 | 3/2013 | Logue et al. | |
| 2013/0106989 A1 | 5/2013 | Gage et al. | |
| 2013/0111064 A1 | 5/2013 | Mani et al. | |
| 2015/0207846 A1* | 7/2015 | Famaey | H04L 67/02 709/219 |
| 2016/0260003 A1* | 9/2016 | Hill | G06K 7/10722 |
| 2016/0314211 A1* | 10/2016 | Kerai | G06F 21/45 |
| 2017/0236206 A1* | 8/2017 | Keen | G06Q 40/04 705/37 |
| 2018/0069878 A1* | 3/2018 | Martini | H04L 63/1425 |

FOREIGN PATENT DOCUMENTS

| | | |
|---|---|---|
| EP | 1638275 A2 | 3/2006 |
| EP | 1848163 A1 | 10/2007 |
| EP | 1988697 A1 | 11/2008 |
| EP | 1988698 A1 | 11/2008 |
| JP | 2005-94600 | 4/2005 |
| JP | 2007-043598 | 2/2007 |
| KR | 10-2005-0030548 | 3/2005 |
| WO | WO 2003/079635 | 9/2003 |
| WO | WO 2004/063843 | 7/2004 |
| WO | WO 2005/009019 | 1/2005 |
| WO | 2006064047 A1 | 6/2006 |
| WO | WO 2006/075677 | 7/2006 |
| WO | WO 2008099420 A2 | 8/2008 |

OTHER PUBLICATIONS

International Search Report and Written Opinion of the International Searching Authority from PCT/US2006/047841, dated Sep. 12, 2008.

International Search Report and Written Opinion of the International Searching Authority from PCT/US2007/002424, dated Aug. 14, 2007.

International Search Report and Written Opinion of the International Searching Authority from PCT/US2007/068820, dated Jun. 11, 2008.

International Search Report and Written Opinion of the International Searching Authority from PCT/US2007/068821, dated Jun. 14, 2008.

International Search Report and Written Opinion of the International Searching Authority from PCT/U52007068823, dated Jun. 1, 2008.

Jeff Tyson, "How Instant Messaging Works", www.verizon.com/learningcenter, Mar. 9, 2005.

Rory Bland, et al,"P2P Routing" Mar. 2002.

Rosenberg, "STUN—Simple Traversal of UDP Through NAT", Sep. 2002, XP015005058.

Salman A. Baset, et al, "An Analysis of the Skype Peer-To-Peer Internet Telephony Protocol", Department of Computer Science, Columbia University, New York, NY, USA, Sep. 15, 2004.

Singh et al., "Peer-to Peer Internet Telephony Using SIP", Department of Computer Science, Columbia University, Oct. 31, 2004, XP-002336408.

Sinha, S. and Oglieski, A., A TCP Tutorial, Nov. 1998 (Date posted on Internet: Apr. 19, 2001) [Retrieved from the Internet <URL:http//www.ssfnet.org/Exchange/tcp/tcpTutorialNotes.html>].

Pejman Khadivi, Terence D. Todd and Dongmei Zhao, "Handoff trigger nodes for hybrid IEEE 802.11 WLAN/cellular networks," Proc. of IEEE International Conference on Quality of Service in Heterogeneous Wired/Wireless Networks, pp. 164-170, Oct. 18, 2004.

International Search Report and Written Opinion of the International Searching Authority from PCT/US2008/078142, dated Mar. 27, 2009.

International Search Report and Written Opinion of the International Searching Authority from PCT/US2008/084950, dated Apr. 27, 2009.

Hao Wang, Skype VoIP service-architecture and comparison, In: INFOTECH Seminar Advanced Communication Services (ASC), 2005, pp. 4, 7, 8.

Seta, N.; Miyajima, H.; Zhang, L;; Fujii, T., "All-SIP Mobility: Session Continuity on Handover in Heterogeneous Access Environment," Vehicular Technology Conference, 2007. VTC 2007—Spring. IEEE 65th, Apr. 22-25, 2007, pp. 1121-1126.

International Search Report and Written Opinion of the International Searching Authority from PCT/US2008/075141, dated Mar. 5, 2009.

Qian Zhang; Chuanxiong Guo; Zihua Guo; Wenwu Zhu, "Efficient mobility management for vertical handoff between WWAN and WLAN," Communications Magazine, IEEE, vol. 41. issue 11, Nov. 2003, pp. 102-108.

Isaacs, Ellen et al., "Hubbub: A sound-enhanced mobile instant messenger that supports awareness and opportunistic interactions," Proceedings of the SIGCHI Conference on Human Factors in Computing Systems; vol. 4, Issue No. 1; Minneapolis, Minnesota; Apr. 20-25, 2002; pp. 179-186.

PCT: International Preliminary Report on Patentability of PCT/US2008/084950; Jun. 1, 2010; 5 pgs.

International Search Report and Written Opinion of the International Searching Authority from PCT/US2014/039777, dated Sep. 30, 2014.

International Search Report and Written Opinion of the International Searching Authority from PCT/U52014/39782, dated Oct. 17, 2014.

International Search Report and Written Opinion of PCT/US2015/43633, dated Oct. 26, 2015, 21 pgs.

PCT: International Search Report and Written Opinion of PCT/US2015/43630 (related application), dated Oct. 30, 2015, 20 pgs.

PCT: International Preliminary Report on Patentability of PCT/US2014/039777; dated Jan. 28, 2016; 8 pgs.

PCT: International Preliminary Report on Patentability of PCT/US14/39782; dated Apr. 19, 2016; 9 pgs.

PCT: International Search Report and Written Opinion for PCT/US2011/024870; dated Oct. 26, 2011; 12 pages.

J. Rosenberg et al. "Session Traversal Utilities for NAT (STUN)", draft-ieff-behave-rfc3489bis-06, Mar. 5, 2007.

(56) References Cited

OTHER PUBLICATIONS

PCT: International Search Report and Written Opinion for PCT/US2011/028685; dated Nov. 9, 2011; 10 pages.
PCT: International Search Report and Written Opinion for PCT/US2011/029954; dated Nov. 24, 2011; 8 pages.
PCT: International Search Report and Written Opinion for PCT/US2011/024891; dated Nov. 25, 2011; 9 pages.
PCT: International Search Report and Written Opinion for PCT/US2011/031245; dated Dec. 26, 2011; 13 pages.
Wireless Application Protocol—Wireless Transport Layer Security Specification, Version Feb. 18, 2000, Wireless Application Forum, Ltd. 2000; 99 pages.
PCT: International Search Report and Written Opinion for PCT/US2011/040864; dated Feb. 17, 2012; 8 pages.
PCT: International Search Report and Written Opinion for PCT/US2011/041565; dated Jan. 5, 2012; 7 pages.
PCT: International Search Report and Written Opinion for PCT/US2011/031246; dated Dec. 27, 2011; 8 pages.
PCT: International Search Report and Written Opinion for PCT/US2011/049000; dated Mar. 27, 2012; 10 pages.
PCT: International Search Report and Written Opinion for PCT/US2011/051877; dated Apr. 13, 2012; 7 pages.
PCT: International Search Report and Written Opinion for PCT/US2011/055101; dated May 22, 2012; 9 pages.
Balamurugan Karpagavinayagam et al. (Monitoring Architecture for Lawful Interception in VoIP Networks, ICIMP 2007, Aug. 24, 2008).
NiceLog User's Manual 385A0114-08 Rev. A2, Mar. 2004.
WISPA: Wireless Internet Service Providers Association; WISPA-CS-IPNA-2.0; May 1, 2009.
PCT: International Preliminary Report on Patentability of PCT/US2011/024870; dated Aug. 30, 2012; 7 pgs.
RFC 5694 ("Peer-to-Peer (P2P) Architecture: Definition, Taxonomies, Examples, and Applicability", Nov. 2009).
Mahy et al., The Session Initiation Protocol (SIP) "Replaces" Header, Sep. 2004, RFC 3891, pp. 1-16.
PCT: International Preliminary Report on Patentability of PCT/US2011/024891; dated Aug. 30, 2012; 6 pgs.
T. Dierks & E. Rescorla, The Transport Layer Security (TLS) Protocol (Ver. 1.2, Aug. 2008) retrieved at http://tools.ietf.org/htmllrfc5246. Relevant pages provided.
J. Rosenberg et al., SIP: Session Initiation Protocol (Jun. 2008) retrieved at hftp://tools.ietf.org/html/rfc3261. Relevant pages provided.
Philippe Bazot et al., Developing SIP and IP Multimedia Subsystem (IMS) Applications (Feb. 5, 2007) retrieved at redbooks IBM form No. SG24-7255-00. Relevant pages provided.
PCT: International Preliminary Report on Patentability of PCT/US2011/028685; dated Oct. 4, 2012; 6 pgs.
PCT: International Preliminary Report on Patentability of PCT/US2011/031245; dated Oct. 26, 2012; 9 pgs.
PCT: International Preliminary Report on Patentability of PCT/US2011/029954; dated Oct. 11, 2012; 5 pgs.
PCT: International Preliminary Report on Patentability of PCT/US2011/031246; dated Nov. 8, 2012; 5 pgs.
Rosenberg, J; "Interactive Connectivity Establishment (ICE): A Protocol for Network Address Translator (NAT) Traversal for Offer/Answer Protocols"; Oct. 29, 2007; I ETF; I ETF draft of RFC 5245, draft-ietf-mmusic-ice-19; pp. 1-120.
Blanchet et al; "IPv6 Tunnel Broker with the Tunnel Setup Protocol (TSP)"; May 6, 2008; IETF; IETF draft of RFC 5572, draftblanchet-v6ops-tunnelbroker-tsp-04; pp. 1-33.
Cooper et al; "NAT Traversal for dSIP"; Feb. 25, 2007; IETF; IETF draft draft-matthews-p2psip-dsip-nat-traversal-00; pp. 1-23.
Cooper et al; "The Effect of NATs on P2PSIP Overlay Architecture"; IETF; IETF draft draft-matthews-p2psip-nats-and-overlays-01.txt; pp. 1-20.
Srisuresh et al; "State of Peer-to-Peer(P2P) Communication Across Network Address Translators(NATs)"; Nov. 19, 2007; I ETF; I ETF draft for RFC 5128, draft-ietf-behave-p2p-state-06.txt; pp. 1-33.
PCT: International Search Report and Written Opinion for PCT/US2012/046026; dated Oct. 18, 2012; 6 pages.
Dunigan, Tom, "Almost TCP over UDP (atou)," last modified Jan. 12, 2004; retrieved on Jan. 18, 2011 from <http://www.csm.ornl.gov/~dunigan/net100/atou.html> 18 pgs.
PCT: International Preliminary Report on Patentability of PCT/US2011/040864; dated Jan. 3, 2013; 6 pgs.
PCT: International Preliminary Report on Patentability of PCT/US2011/041565; dated Jan. 10, 2013; 6 pgs.
PCT: International Preliminary Report on Patentability of PCT/US2011/049000; dated Feb. 26, 2013; 6 pgs.
PCT: International Preliminary Report on Patentability of PCT/US2011/051877; dated Mar. 26, 2013; 5 pgs.
PCT: International Preliminary Report on Patentability of PCT/US2011/055101; dated Apr. 16, 2013; 7 pgs.
PCT: International Preliminary Report on Patentability of PCT/US2012/046026; dated Jan. 30, 2014; 5 pgs.
PCT: International Preliminary Report on Patentability of PCT/US2008/075141; dated Mar. 9, 2010; 5 pgs.
PCT: International Preliminary Report on Patentability of PCT/US2007/068820; dated Dec. 31, 2008; 8 pgs.
PCT: International Preliminary Report on Patentability of PCT/US2007/068823; dated Nov. 27, 2008; 8 pgs.
PCT: International Preliminary Report on Patentability of PCT/US2006/047841; dated Nov. 6, 2008; 7 pgs.
PCT: International Preliminary Report on Patentability of PCT/US2007/002424; dated Aug. 7, 2008; 6 pgs.
PCT: International Preliminary Report on Patentability of PCT/US2006/040312; dated May 2, 2008; 5 pgs.
PCT: International Preliminary Report on Patentability of PCT/IB2005/000821; dated Oct. 19, 2006; 10 pgs.
Chathapuram, "Security in Peer-To-Peer Networks", Aug. 8, 2001, XP002251813.
International Search Report and Written Opinion of the International Searching Authority from PCT/IB2005/000821, dated Aug. 5, 2005.
International Search Report and Written Opinion of the International Searching Authority from PCT/US2006/032791, dated Dec. 18, 2006.

* cited by examiner

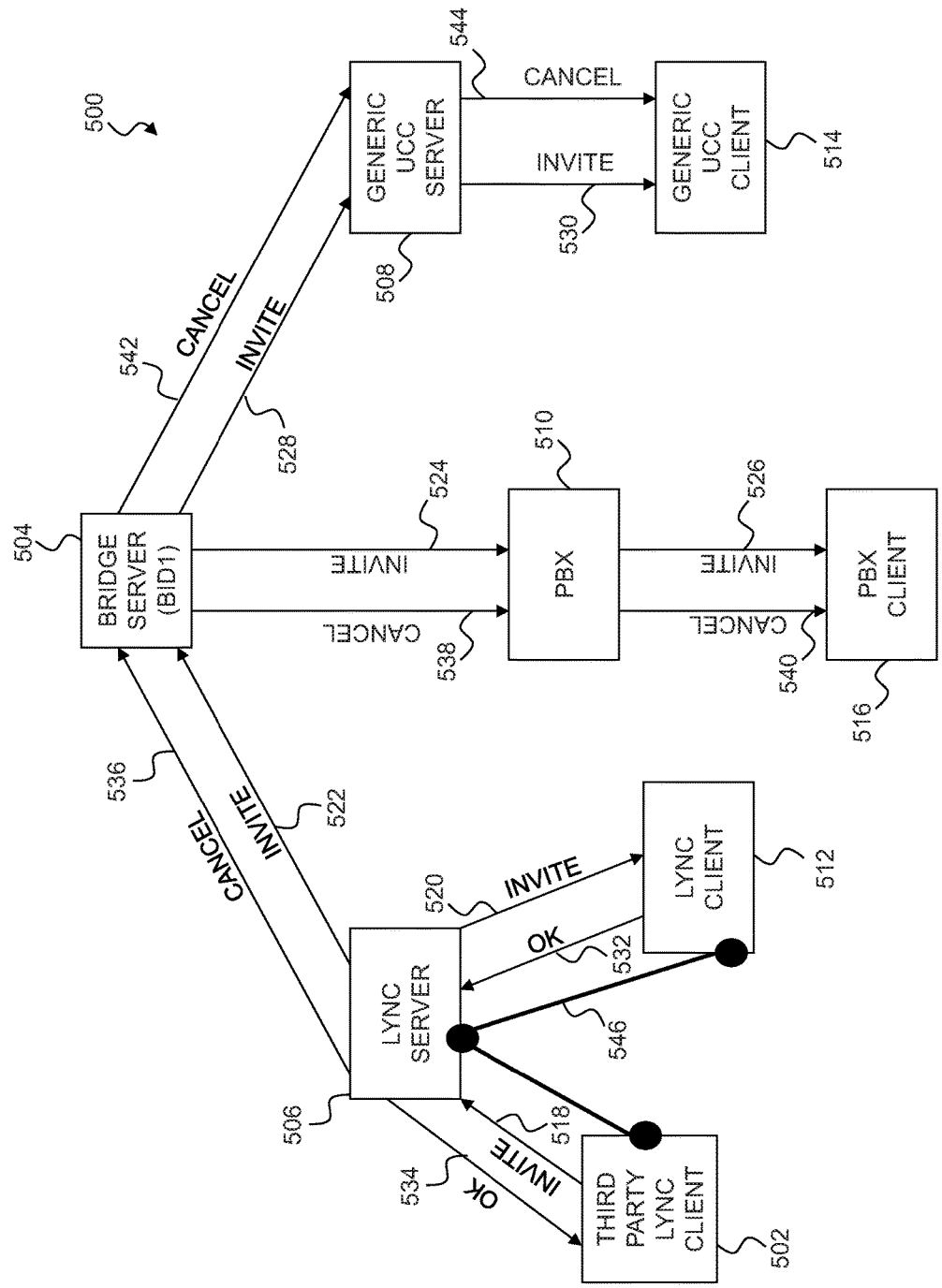

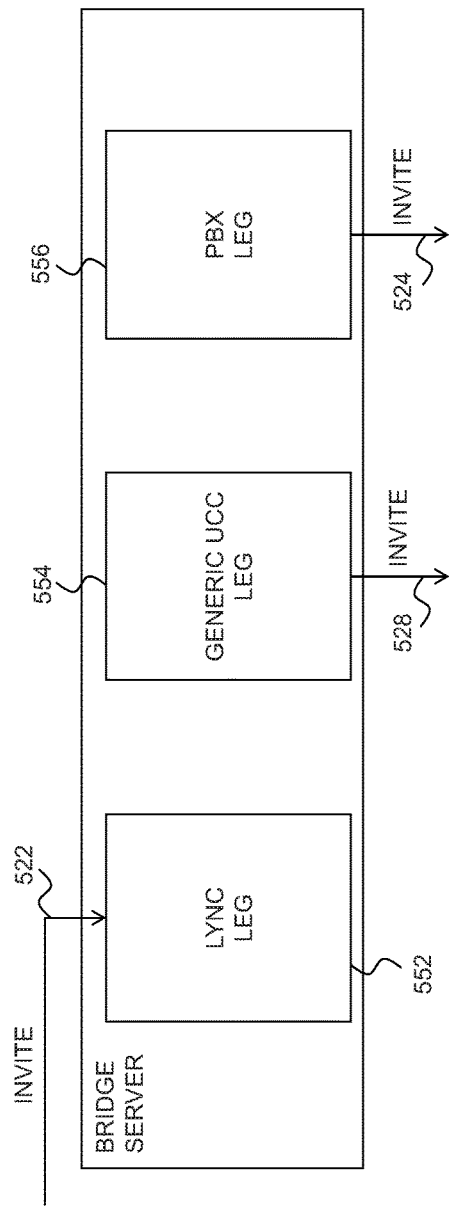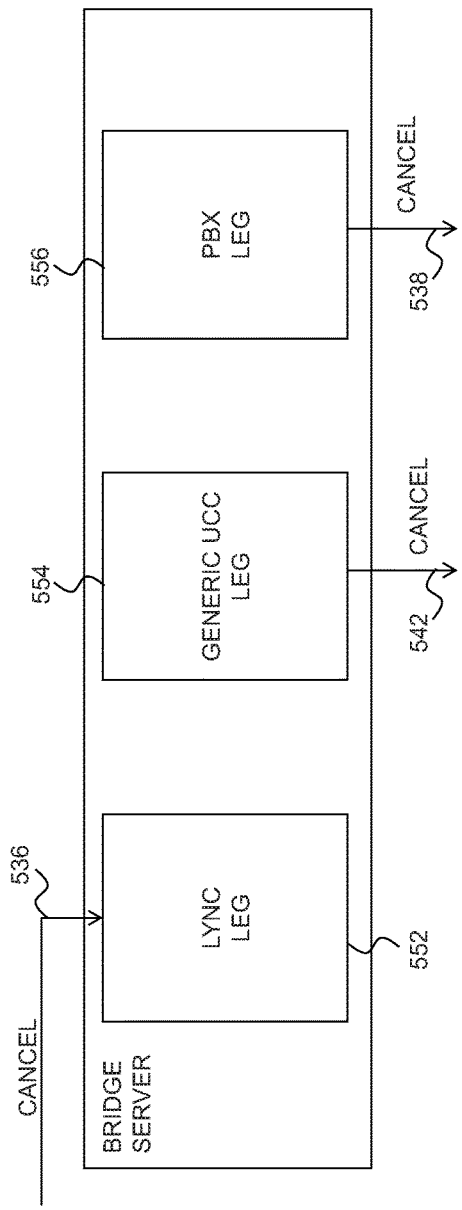

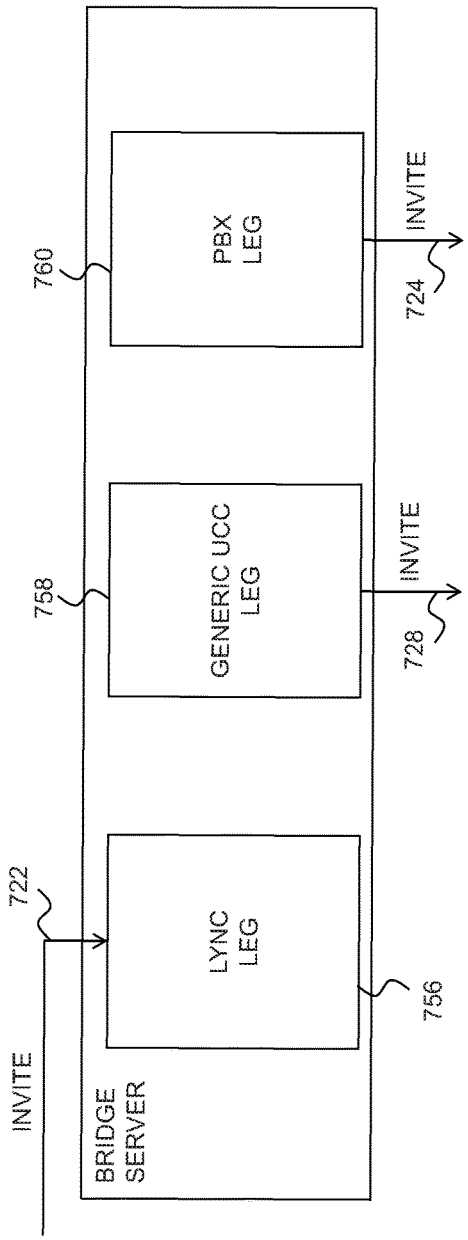
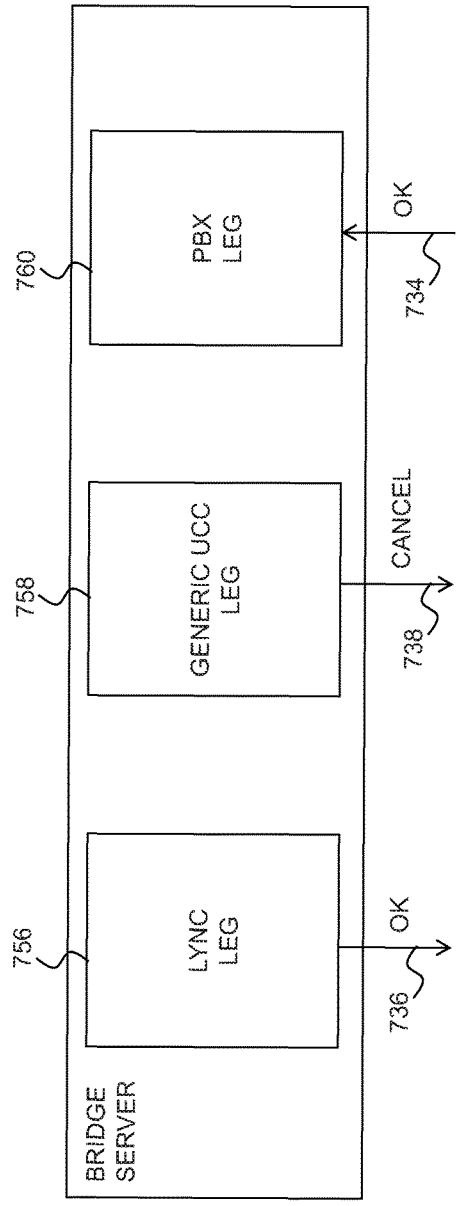

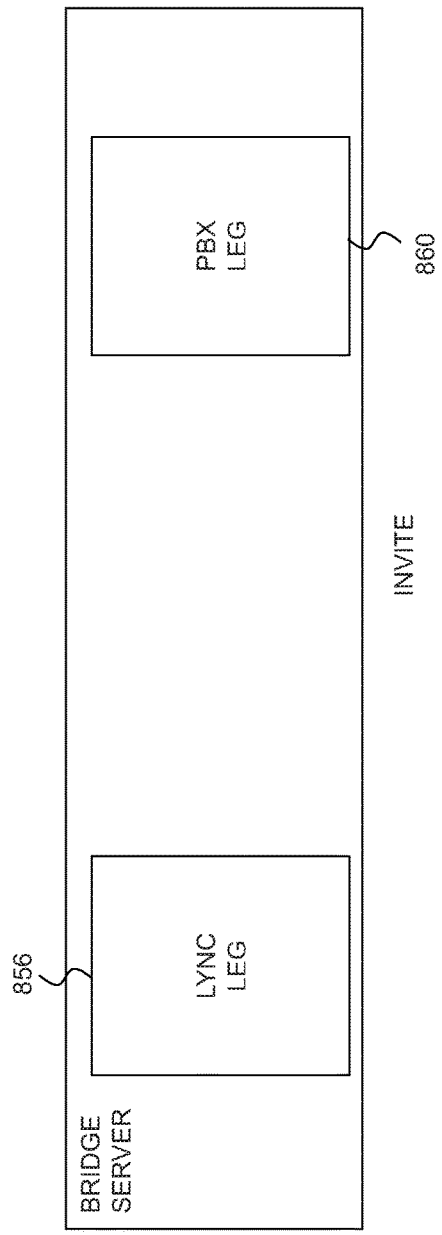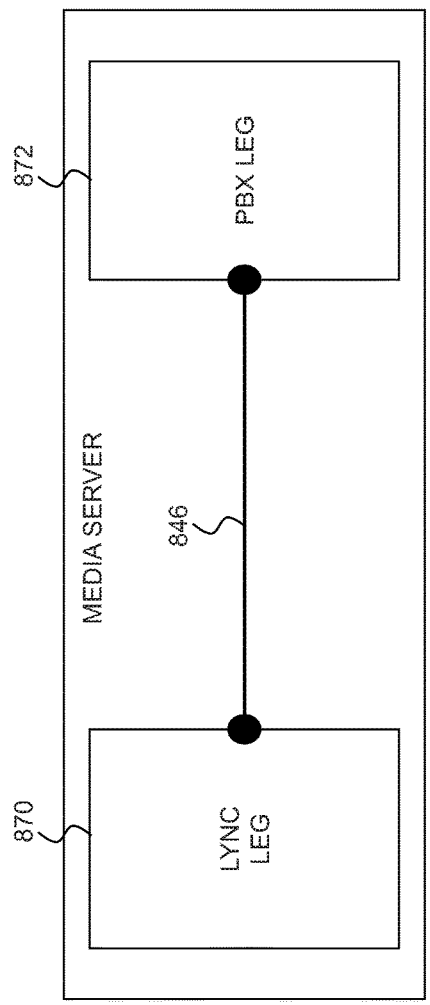

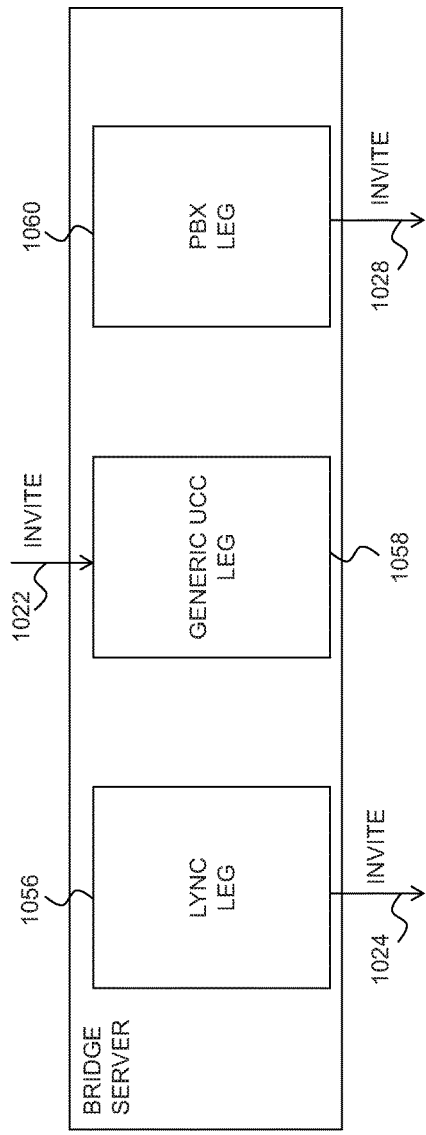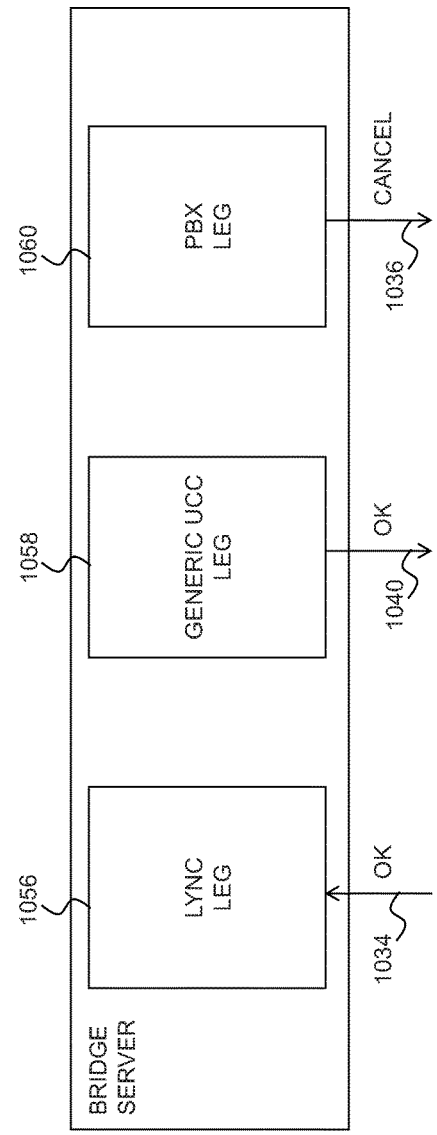

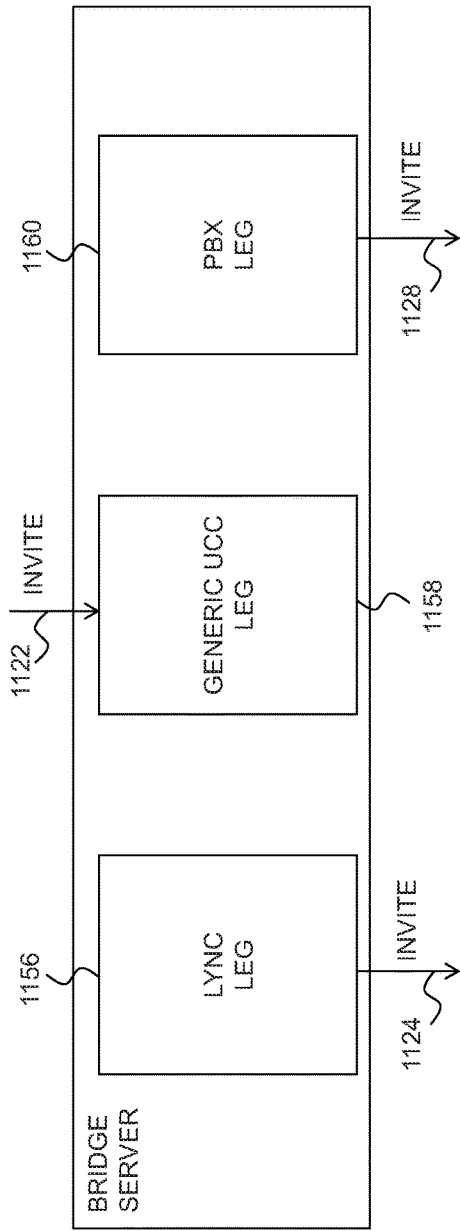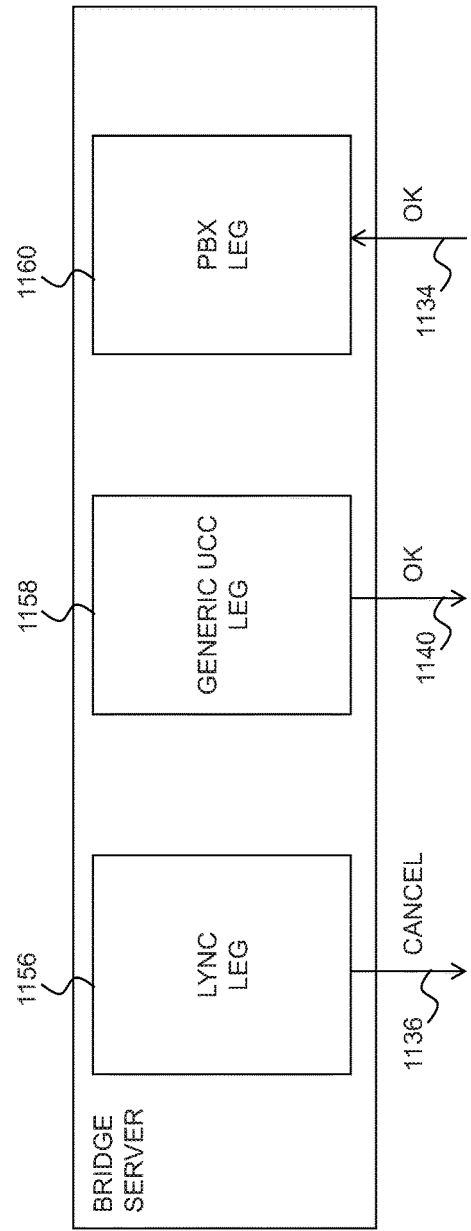

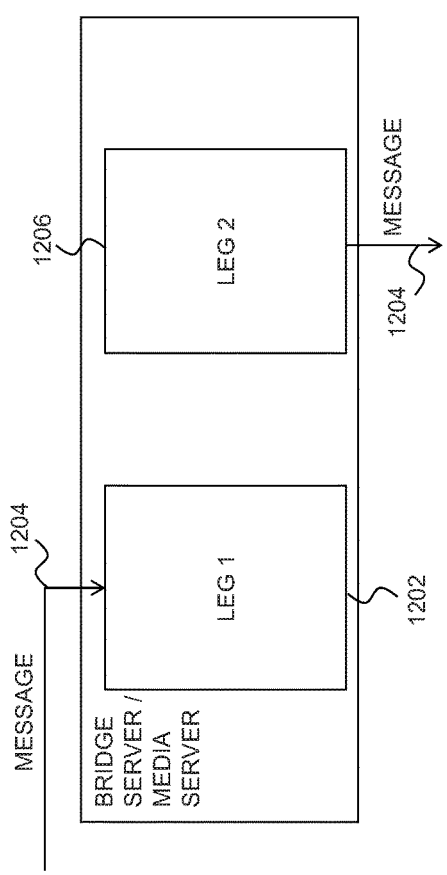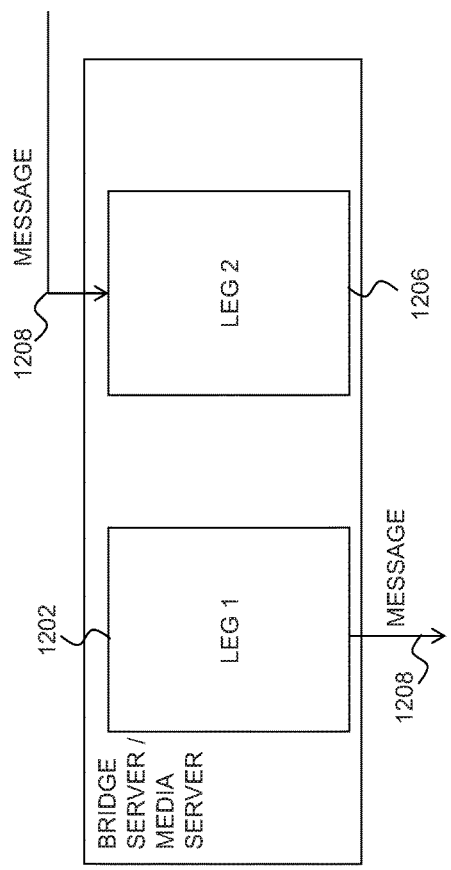
FIG. 12A
FIG. 12B

SYSTEM AND METHOD FOR ENABLING USE OF A SINGLE USER IDENTIFIER ACROSS INCOMPATIBLE NETWORKS FOR UCC FUNCTIONALITY

CROSS-REFERENCE TO RELATED APPLICATIONS

This application claims the benefit of U.S. Provisional Application No. 62/316,133, filed on Mar. 31, 2016, entitled SYSTEM AND METHOD FOR ENABLING USE OF A SINGLE USER IDENTIFIER ACROSS INCOMPATIBLE NETWORKS FOR UCC FUNCTIONALITY, which is incorporated by reference in its entirety.

BACKGROUND

Communications systems often have limitations that affect communications across system boundaries. Accordingly, what is needed are a system and method that addresses such issues.

BRIEF DESCRIPTION OF THE DRAWINGS

For a more complete understanding, reference is now made to the following description taken in conjunction with the accompanying Drawings in which:

FIG. 5A illustrates a diagrammatic view of one embodiment of a communication session within the environment of FIG. 1 or FIG. 3;

FIGS. 5C and 5D illustrate diagrammatic views of embodiments of objects that may be used by the bridge server to manage the communication session of FIGS. 5A and 5B;

FIGS. 7C-7E illustrate diagrammatic views of embodiments of objects that may be used by the bridge server to manage the communication session of FIGS. 7A and 7B;

FIGS. 8C-8E illustrate diagrammatic views of embodiments of objects that may be used by the bridge server to manage the communication session of FIGS. 8A and 8B;

FIG. 8F illustrates a diagrammatic view of one embodiment of objects that may be used by the media gateway to manage media legs for the communication session of FIGS. 8A and 8B;

FIGS. 10C-10E illustrate diagrammatic views of embodiments of objects that may be used by the bridge server to manage the communication session of FIGS. 10A and 10B;

FIGS. 11C-11E illustrate diagrammatic views of embodiments of objects that may be used by the bridge server to manage the communication session of FIGS. 11A and 11B;

FIGS. 12A and 12B illustrate diagrammatic views of embodiments of objects that may be used by the bridge server of FIG. 1 or FIG. 3 for an instant messaging communication session;

DETAILED DESCRIPTION

Figure 1:
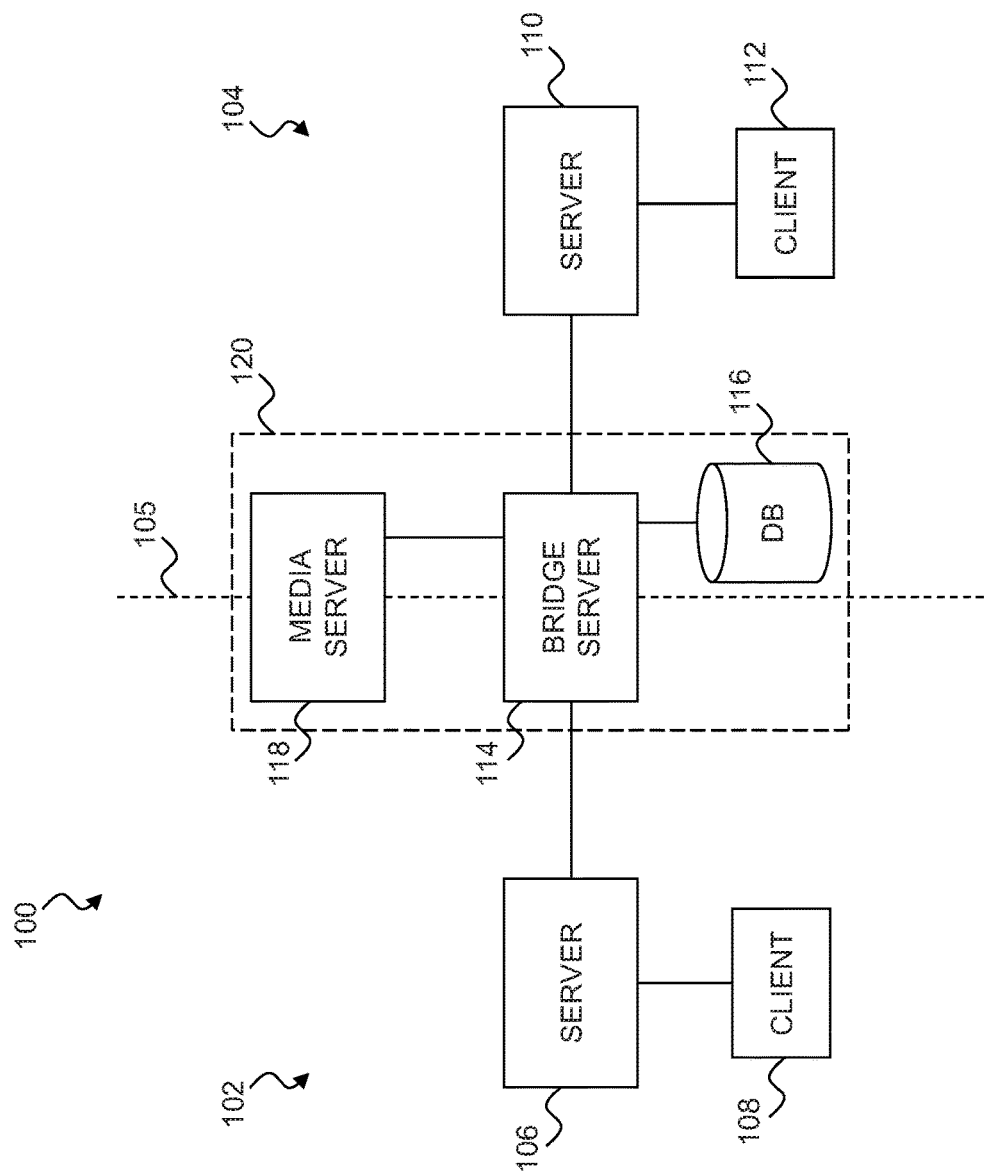
FIG. 1 illustrates one embodiment of an environment with two separate domains and a bridge server for cross-domain communications.

It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, there is illustrated one embodiment of an environment 100 with a domain 102 and a domain 104 (shown as separated by a line 105). In the present example, the domains 102 and 104 include separate, and likely incompatible, communication platforms that support one or more Unified Communications and Collaboration (UCC) functions, such as presence, instant messaging (IM), audio communications, video communications, screen sharing, file transfers, whiteboards, and conferencing (each of which may be referred to herein as a communication session). Examples of such platforms include Microsoft® Lync™ (referred to hereinafter as "Lync"), Skype™, IBM™ Sametime™, Cisco™ Jabber™, GoToMeeting™, and WebEx™. One or both of the domains may also include a Private Branch Exchange (PBX) system.

Domain 102 includes at least a server 106 as its communication platform and domain 104 includes at least a server 110 as its communication platform. It is understood that the communication platform(s) provided within one or both of the domains 102 and 104 may include multiple servers, gateways, and/or other components, and that the servers 106 and 110 may be gateway servers. In the present embodiment, both servers 106 and 110 support at least some UCC functionality.

A client 108 is coupled to the server 106 and a client 112 is coupled to the server 110. Each client 108 and 112 may be any type of communications device and examples of such communication devices include cellular telephones (including smart phones), personal digital assistants (PDAs), netbooks, tablets, laptops, desktops, workstations, and any other computing device that can communicate with another computing device using a wireless and/or wireline communication link. Such communications may be direct (e.g., via a peer-to-peer network, an ad hoc network, or using a direct connection), indirect, such as through a server or other proxy (e.g., in a client-server model), or may use a combination of direct and indirect communications. In some embodiments, a single device may represent multiple clients. For example, a single device may have one application for one client and another application for another client. In such embodiments, depending on the capabilities and configuration of the device, multiple clients on the device may be logged in simultaneously or only one client may be logged in at a time.

As the servers 106 and 110 are incompatible and in separate domains, each client 108 and 112 must register with the corresponding server 106 and 108, respectively, in order to be able to operate within that domain. The UCC functions available to the clients 108 and 112 depend on such factors as the respective server's configuration and supported UCC functionality, the access rights of each client to various UCC functions (e.g., whether a client is subscribed to a particular UCC function if a subscription is required), and the physical limitations of each client (e.g., does the client have the necessary bandwidth, processing power, and/or memory to use a particular UCC function).

It is desirable for a user to have a single identity in both of the domains 102 and 104. For example, the user may be identified as johndoe@company.com in both the domain 102 and the domain 104. This enables third parties to contact the user via the single identity regardless of which domain the third party is using and which domain(s) the user is currently logged into. However, for this cross-domain communication to occur, there must be coordination between the domains 102 and 104.

Accordingly, a bridge server 114 is provided as part of a cross-domain system 120 to manage communications between the domain 102 and the domain 104. The bridge server 114 accomplishes this by managing notifications and other signaling communications using protocol and authorization information of the domain 102 and the domain 104 that is stored in a cross-domain database 116. The bridge server 114 is able to communicate with each domain 102 and 104 using that domain's protocols and expected message sequences. Although shown as a separate component from the bridge server 114 within the cross-domain system 120, it is understood that the database 116 may be part of the bridge server 114 in some embodiments.

While the bridge server 114 handles signaling, a media server 118 (also referred to as a media gateway (MGW) herein) may be used as part of the cross-domain system 120 to handle media during cross-domain communications. This media handling may include performing conversions between media types and various protocols that may be used by the servers 106 and 110. Although shown as a separate component from the bridge server 114, it is understood that the media server 118 may be part of the bridge server 114 in some embodiments. If separate from the bridge server 114, the media server 118 may be coupled to the bridge server 114, or the bridge server 114 may simply be aware of the media server 118 and pass contact information (e.g., address and port information) of the media server 118 to the domains 102 and/or 104 when setting up a communication session.

The bridge server 114 allows a first user having an account with the bridge server 114 to receive communication requests on both clients 108 and 112 from a second user's client (not shown), and to participate in communications sessions using either client 108 or client 112, regardless of which server 106 or 110 the second user is using. For example, if the second user attempts to contact the first user via the domain 102, the first user may receive a communication request on both clients 108 and 112 (if both clients are logged into their respective servers 106 and 110), on only one of the clients 108 or 112 (if the other client is not currently logged in), or on neither client 108 or 112 (if neither of the clients are logged in). If the first user answers the communication request via client 112, the bridge server 114 allows the first user and the second user to communicate, even though the first user is using client 112 in the domain 104 and the second user is using the domain 102. If the first user answers the communication request via client 108, the bridge server 114 may not be needed following establishment of the communication session as the two users are in the same domain. Various embodiments of such communication sessions are illustrated in detail below.

To enable cross-domain communications using a single user identifier, the servers 106 and 110 should support both multiple registration and forking. Multiple registration enables multiple devices to log into a single server using identical authentication information. For example, the user identifier johndoe@company.com may be simultaneously registered multiple times on both the server 106 and the server 110. Multiple registration is needed because it enables the bridge server 114 to log in as a client to the servers 106 and 110 without disrupting identical simultaneous logins from the clients 108 and 112. Forking enables an incoming communication request to be routed to multiple potential destinations (e.g., to all destinations corresponding to a registered user identifier) and then a communication session can be established based on the destination (or destinations) that responds affirmatively.

It is understood that the server 106 and the server 110 may continue to operate normally even during cross-domain communications. More specifically, because the cross-domain system 120 is able to register as a client with the servers 106 and 110 using the appropriate protocols and signaling sequences, the servers themselves do not need to be changed to accommodate cross-domain communication sessions. This enables the cross-domain system 120 to be inserted between incompatible domains (e.g., the domains 102 and 104) and then configured as needed to communicate with the servers 106 and 110 to support cross-domain communications.

Figure 2:
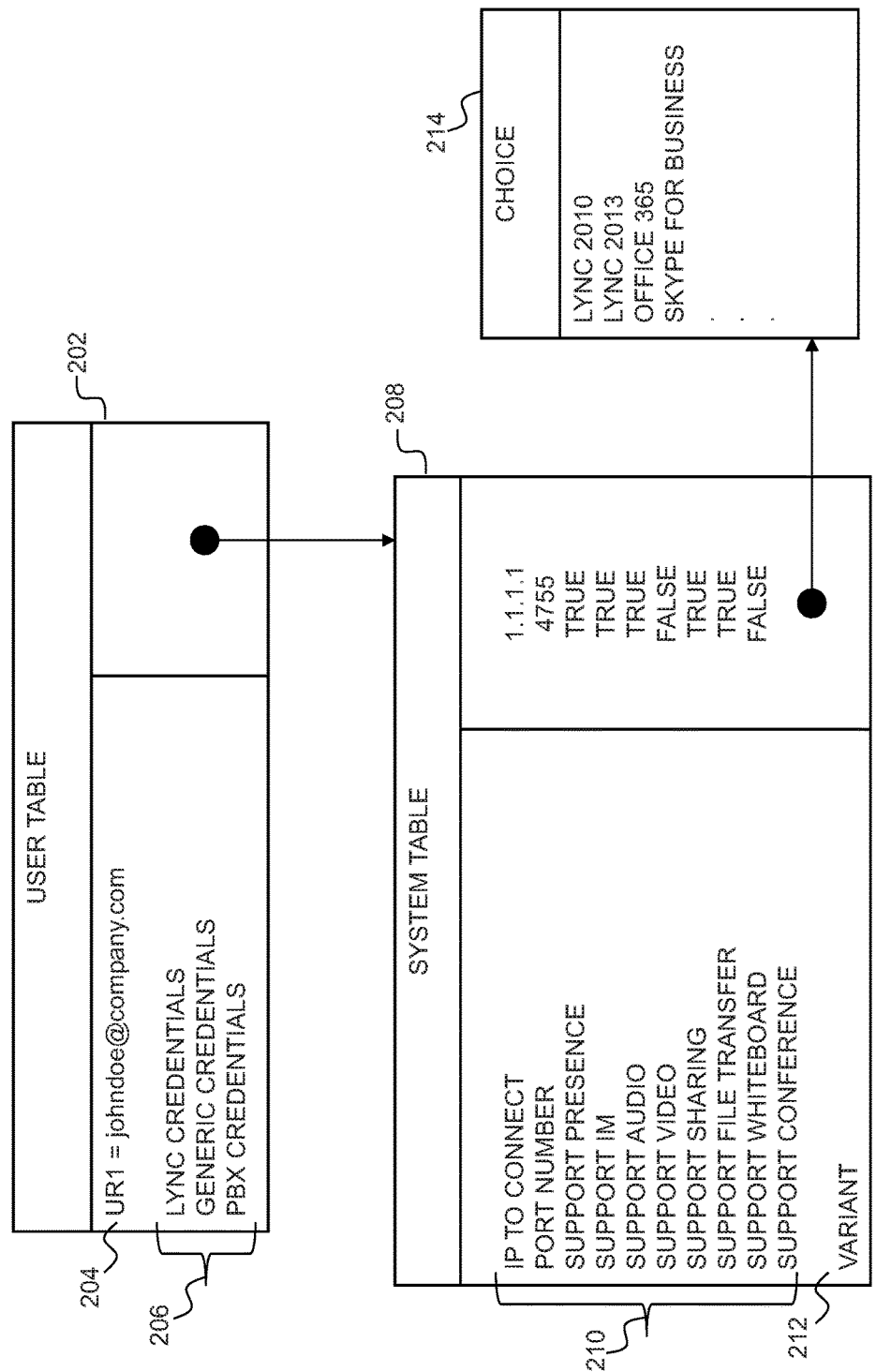
FIG. 2 illustrates a diagrammatic view of one embodiment of data contained within a cross-domain database that is accessible to the bridge server of FIG. 1.

Referring to FIG. 2, there is illustrated one embodiment of various entries and data that may be contained within the cross-domain database 116. The cross-domain database 116 may contain a user table 202. The user table 202 may store particular information related to a user associated with the bridge server 114, such as a username 204 and one or more credentials 206 for various communication platforms. In the present example, user table 202 includes a username 204 listed in the user table 202 as "UR1=johndoe@company. com," Lync credentials, generic UCC credentials (e.g., credentials for another type of UCC platform), and PBX credentials for a traditional PBX system. The user may have the same username 204 across all platforms. So, in the present example, the user has the username "johndoe@ company.com" associated with each of the Lync, Generic UCC, and PBX platforms. The credentials 206 for each of the platforms may be associated with a system table 208. In some embodiments, each credential may be associated with its own system table 208, while in other embodiments a single system table 208 may be used for all credentials of a user.

The system table 208 includes a plurality of information 210 particular to the associated communications platform. In the present example, such plurality of information 210 includes an IP address used to connect with the communications platform server (e.g., the server 106 or the server 110 of FIG. 1), a port number of the communications platform server, and various functionality identifiers. The identifiers may be used to indicate whether the communications platform supports particular types of UCC communications, such as presence, IM, audio, video, screen sharing, file transfer, whiteboard, and conferencing. It is understood that the functions illustrated in the system table 208 are for purposes of example only and many different functionalities that are not shown may be included.

The system table 208 may also include one or more variant entries 212. The variant entry 212 may be used to identify a particular variant of the communications platform, and therefore at least a portion of the plurality of information 210 that is associated with the credentials. For example, the variant entry 212 may identify whether the communications platform is running a particular release (e.g., Lync 2010 or Lync 2013), as well as various types of application packages (e.g., Skype for Business or Office 365). The variant entry 212 may be used to select an appropriate set of functions and also an appropriate set of protocols and signaling message sequences for use by the bridge server 114 when communicating with a particular server 106 or 110.

Figure 3:
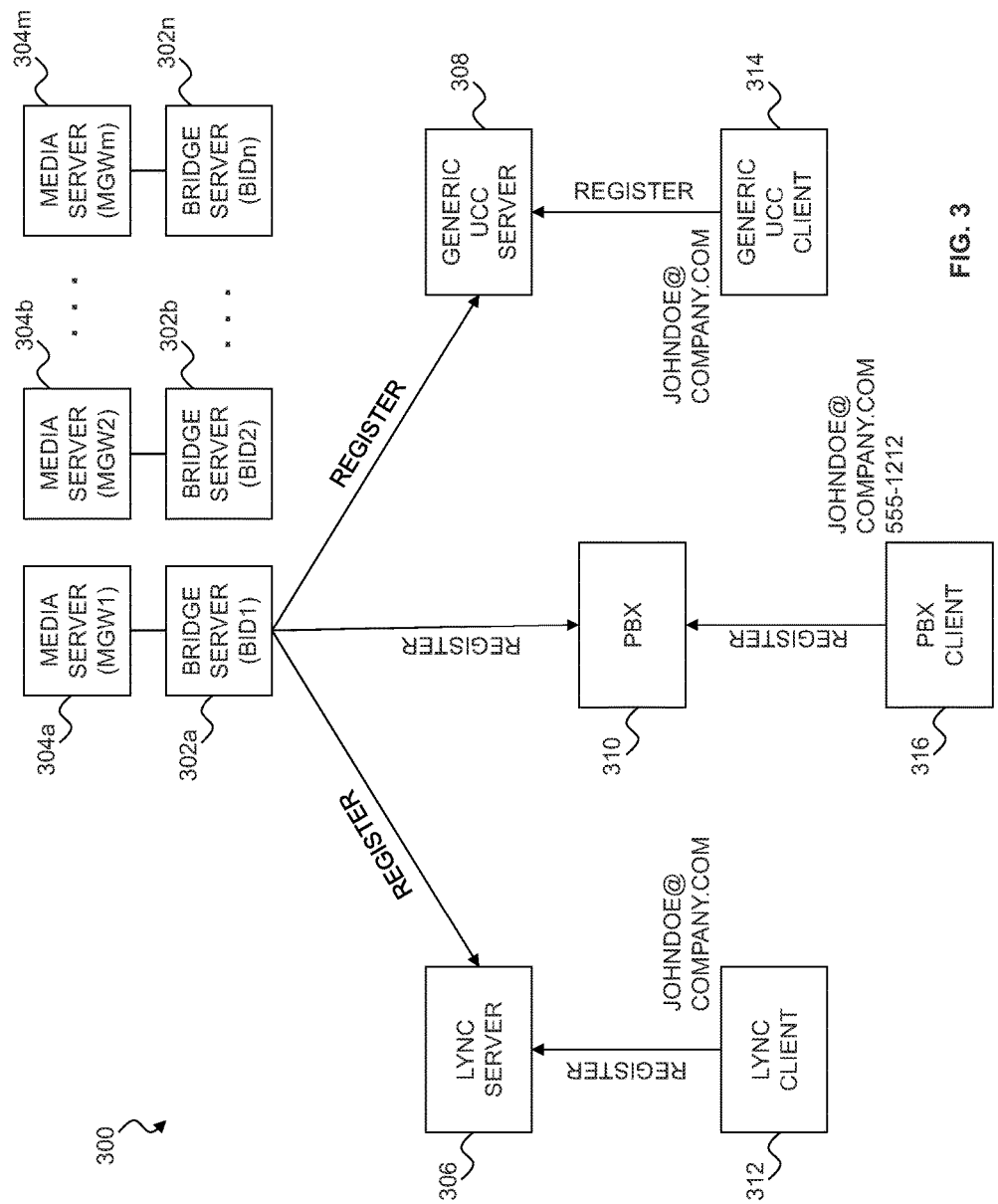
FIG. 3 illustrates a more detailed diagrammatic view of one embodiment of the environment of FIG. 1.

Referring to FIG. 3, there is illustrated one embodiment of an environment 300 that provides a more detailed view of the environment 100 of FIG. 1. The environment 300 includes a bridge server 302a that may be similar or identical to the bridge server 114 of FIG. 1. For purposes of illustration, the bridge server 302a may have an associated bridge ID (BID) that can be used to identify the bridge server 302a (e.g., as BID1) when multiple bridge servers 302a, 302b, . . . , 302n are present. Similarly, a media gateway (MGW) 304a, which may be similar or identical to the media server 118 of FIG. 1, may be one of multiple available media gateways 304a, 304b, . . . , 304m. The use of multiple bridge servers and media gateways enables the cross-domain system 120 of FIG. 1 to scale as needed depending on the needs of the domains 102 and 104.

In the present example, the environment 300 includes a Lync server 306 representing the server 106 of FIG. 1, a generic UCC server 308 (e.g., a server representing a non-Lync UCC platform that is incompatible with Lync) representing the server 110 of FIG. 1, and PBX system 310. However, in other embodiments, the generic UCC server 308 may be a Lync platform or another non-Lync platform that is compatible with Lync, wherein the bridge server 302a would still perform the same operations as described herein. Accordingly, it is understood that two domains may include compatible communications platforms of various types, and the bridge server 302a may operate in the same manner as described herein. The user johndoe@company.com is simultaneously registered with the Lync server 306 using a Lync client 312 (e.g., the client 108 of FIG. 1), with the UCC server 308 using a UCC client 314 (e.g., the client 112 of FIG. 1), and with the PBX 310 using a PBX client 316.

In addition, the bridge server 302a (that may be referred to hereinafter as BID1) is registered with the Lync server 306, the UCC server 308, and the PBX 310 as johndoe@company.com. This means that the Lync server 306, the UCC server 308, and the PBX 310 each have two simultaneous registrations for johndoe@company.com, one from the user and one from the bridge server 302a. Although not shown, it is understood that johndoe@company.com may also be logged into one or more of the Lync server 306, the generic UCC server 308, and the PBX 310 with additional devices, in which case additional registrations would be present. In the following embodiments, the REGISTER messages of FIG. 3 are not shown, but it is understood that the registrations of FIG. 3 have been performed before the various messages illustrated with respect to a particular embodiment are sent. In addition, the user associated with johndoe@company.com may be referred to as the "bridge server user" in various embodiments. It is understood that this refers to the fact that the bridge server 302a has this user's information stored in the database 116 and uses the information to support cross-domain communications for the user.

Figure 4:
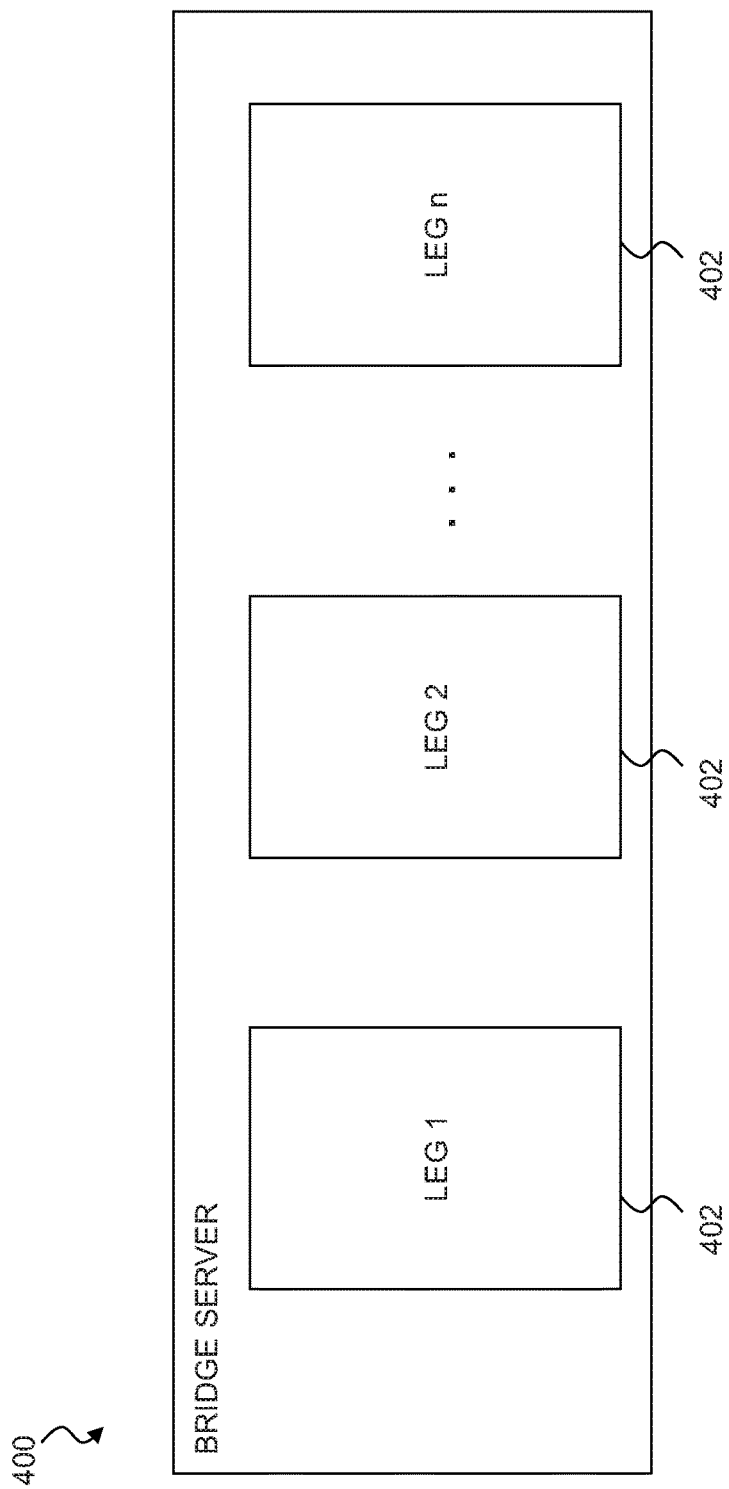
FIG. 4 illustrates a diagrammatic view of one embodiment of objects that may be used by the bridge server of FIG. 1 or FIG. 3 to maintain a communication session.

Referring to FIG. 4, there is illustrated a diagrammatic view of one embodiment of a communication session 400 on the bridge server 302a of FIG. 3. The session 400 includes a plurality of legs 402 that are labeled Leg 1-Leg n. A leg 402 is a protocol element or object that is used by the bridge server 302a as a logical, semantic, processing entity to handle communications with one of a number of UCC platforms (e.g., the Lync server 306, the generic UCC server 308, and the PBX 310 of FIG. 3). Generally, each platform with which the bridge server 302a is communicating will have its own leg 402. A leg 402 is configured by the bridge server 302a to send and receive messages using the appropriate protocol or protocols for the corresponding platform, such as SIP, HTTP, H.323, MGCP, and/or XMPP. By passing a message received via one leg 402 to another leg 402 within the bridge server 302a, the message may be converted from one domain's communication format to another domain's communication format. Accordingly, the legs 402 are utilized by the bridge server 302a to execute communications between disparate communications platforms as each leg is configured for its particular domain's communication format.

For purposes of example, legs 402 may recognize various message types, such as REGISTER, INVITE, CANCEL, OK, BYE, and MESSAGE. It is understood that these message types are not intended to be protocol specific terms, but are used in the present disclosure to indicate the purpose of the message being sent or received. For example, an INVITE message is not necessarily a SIP INVITE (although it may be if SIP is the protocol being used for a particular leg 402), but is instead intended to be an initiation message for an IM, a voice or video call, a file transfer, a screen sharing or conference call request, whiteboard functionality, mid-call features, and/or any other features. Similarly, an OK message is not necessarily a SIP OK (although it may be if SIP is the protocol being used for a particular leg 402), but is instead intended to be an acceptance message for a previously received INVITE. A CANCEL message cancels an INVITE previously sent. A BYE message terminates a current communication session. A MESSAGE message handles instant message (IM) transactions. A REGISTER message registers or unregisters (e.g., logs in or logs out) the sender with a platform using a given user identifier (e.g., johndoe@company.com).

Referring now to FIG. 5A, there is illustrated a diagrammatic view of an environment 500 that shows one embodiment of the environment 300 with a communication session between a third-party Lync client 502 and the Lync client 512 corresponding to johndoe@company.com. As described with respect to FIG. 3, the user identifier johndoe@company.com is simultaneously registered by multiple clients and by the bridge server 504. In the present example, the bridge server 504 is registered as johndoe@company.com with a Lync server 506, a generic UCC server 508, and a PBX system 510. In addition, the bridge server user has registered johndoe@company.com with a Lync client 512 registered with the Lync server 506, a UCC client 514 registered with the UCC server 508, and a PBX client 516 registered with the PBX 510.

Figure 5B:
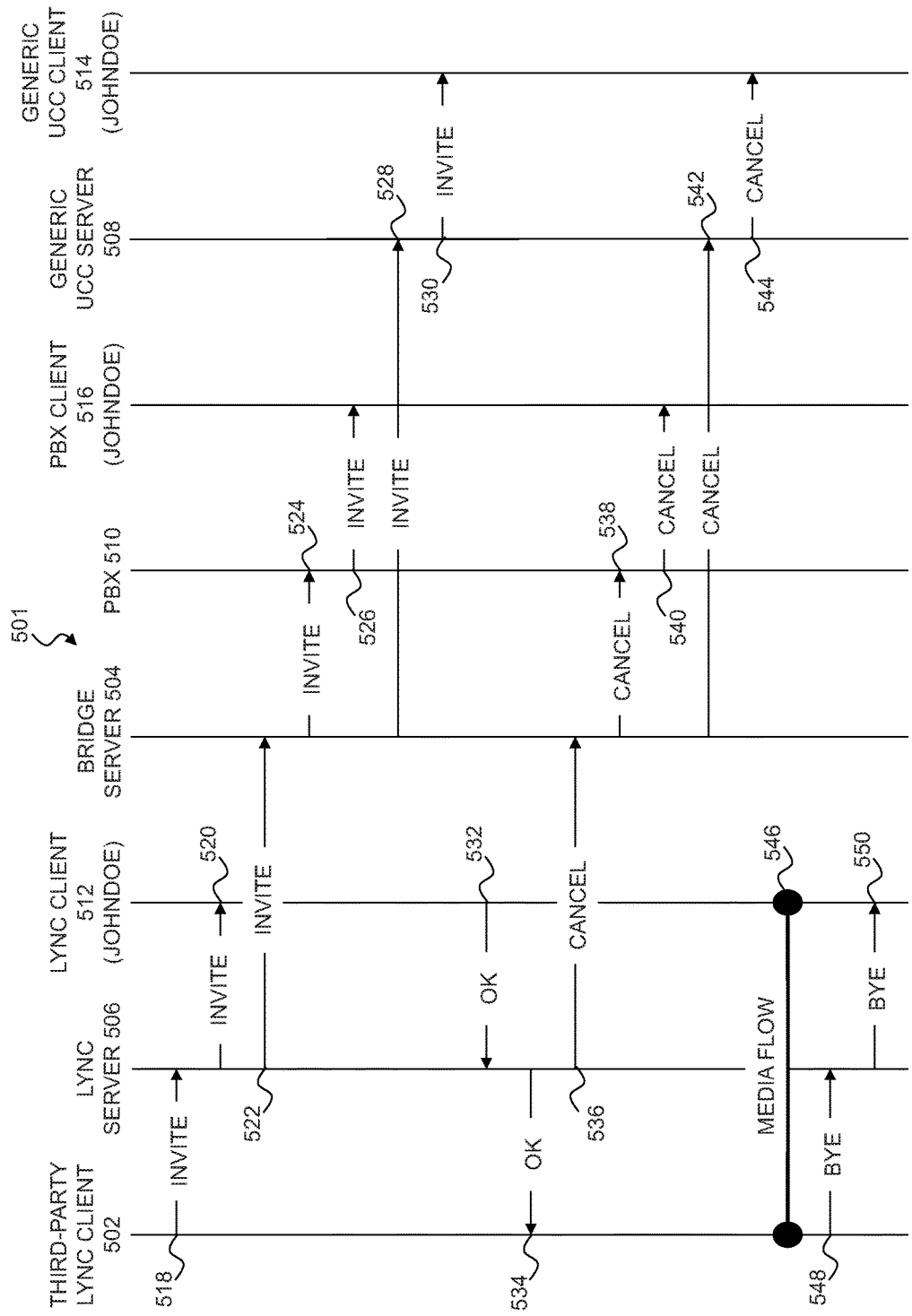
FIG. 5B illustrates a sequence diagram of one embodiment of the communication session of FIG. 5A.

With additional reference to FIG. 5B and continued reference to FIG. 5A, there is illustrated a sequence diagram 501 of one embodiment of a message sequence that may be used to establish a communication session between the third-party Lync client 502 and the Lync client 512. In step 518, the third-party Lync client 502 initiates a communication session with the bridge server user by sending an INVITE from the third-party Lync client 502 to the Lync server 506. In step 520, an INVITE is then sent from the Lync server 506 to the Lync client 512. In step 522, an INVITE is sent from the Lync server 506 to the bridge server 504. The bridge server 504 then sends an INVITE to the PBX 510 in step 524, which causes the PBX 510 to send an INVITE to the PBX client 516 in step 526. Although not shown, it is understood that the bridge server 504 (in each communication of which a bridge server is a part in this embodiment and/or other embodiments) may perform the conversions or other translations as described with respect to FIG. 4. Another INVITE is sent from the bridge server 504 to the generic UCC server 508 in step 528, which causes the generic UCC server 508 to send an INVITE to the generic UCC client 514 in step 530.

At this point, an INVITE has been sent to each of the bridge server user's clients (Lync, generic UCC, and PBX), allowing the bridge server user to answer the communication using any of these clients. In the present example, the bridge server user answers via the Lync client 512. This results in the sending of an OK message from the Lync client 512 to the Lync server 506 in step 532. The Lync server 506 then sends an OK to the third-party Lync client 502 in step 534. A CANCEL is sent from the Lync server 506 to the bridge server 504 in step 536. The bridge server 504 then sends a CANCEL to the PBX 510 in step 538, which then sends a CANCEL to the PBX client in step 540. The bridge server 504 also sends a CANCEL to the generic UCC server 508 in step 542, which then sends a CANCEL to the generic UCC client 514 in step 544. As the communication session has been established between the third-party Lync client 502 and the bridge server user's Lync client 512 through the Lync server 506, the bridge server 504 is not needed for the remainder of the communication session.

A media flow 546 is therefore established between the third-party Lync client 502 and the Lync client 512. To end the communication session, a BYE is sent from the third-party Lync client 502 to the Lync server 506 in step 548, which then sends a BYE to the Lync client 512 in step 550. It is understood that the BYE may originate from either side of the communication session.

It is understood with respect to FIGS. 5A, 5B, and other embodiments herein that contain similar steps (e.g., FIGS. 6A, 6B, 7A, 7B, 8A, 8B, 9A, 9B, 10A, 10B, 11A, and 11B), that some steps need not be performed in the exact order shown. For example, while the sequence of OK steps must generally occur as shown due to the natural propagation of the OK from the accepting client to the client initiating the INVITE, other messages may occur in different orders. For example, the INVITE of step 528 may occur before or simultaneously with the INVITE of step 524. Similarly, the CANCEL of step 542 may occur before or simultaneously with the CANCEL of step 538. In another example, the CANCEL of step 536 may occur before or simultaneously with the OK of step 534. Furthermore, it is possible for a CANCEL to be sent before the corresponding INVITE had reached its destination. Accordingly, it is understood that while some steps must logically occur in a certain order, other steps need not occur in the exact order shown in a particular embodiment.

Referring now to FIGS. 5C and 5D, there is illustrated a diagrammatic view of one embodiment of the communication session of FIGS. 5A and 5B on the bridge server 504. In FIG. 5C, a Lync leg 552 of the bridge server 504 receives the INVITE of step 522. The INVITE of step 528 is sent out over a generic UCC leg 554 and the INVITE of step 524 is sent out over a PBX leg 556. In FIG. 5D, after the bridge server user has answered using the Lync client 512, the CANCEL of step 536 is received via the Lync leg 552. The CANCEL of step 538 is then sent out over the PBX leg 556 and the CANCEL of step 542 is sent out over the generic UCC leg 554. The Lync leg 552, the generic UCC leg 554, and the PBX leg 556 are then destroyed because they are not needed for the communication session that has been established between the Lync client 512 and the third-party Lync client 502 via the Lync server 506.

A similar process as that illustrated in FIGS. 5A-5D would occur for other scenarios where the bridge server 504 is not needed to create the signaling and media paths, such as when a third-party generic UCC client attempts to contact the bridge server user and the bridge server user answers using the generic UCC client 514, or when a third-party PBX client attempts to contact the bridge server user and the bridge server user answers using the PBX client 516. In such cases, the communication session exists within a single domain and does not need the cross-domain support of the bridge server 504. Accordingly, while the bridge server 504 may be active prior to establishment of the communication session, such as by passing INVITE messages to other domains, its role generally ends once a communication session is established within a single domain. It will be understood that any type of communications platform may be used, and that Lync and PBX platforms are merely used for illustrative purposes.

Figure 6A:
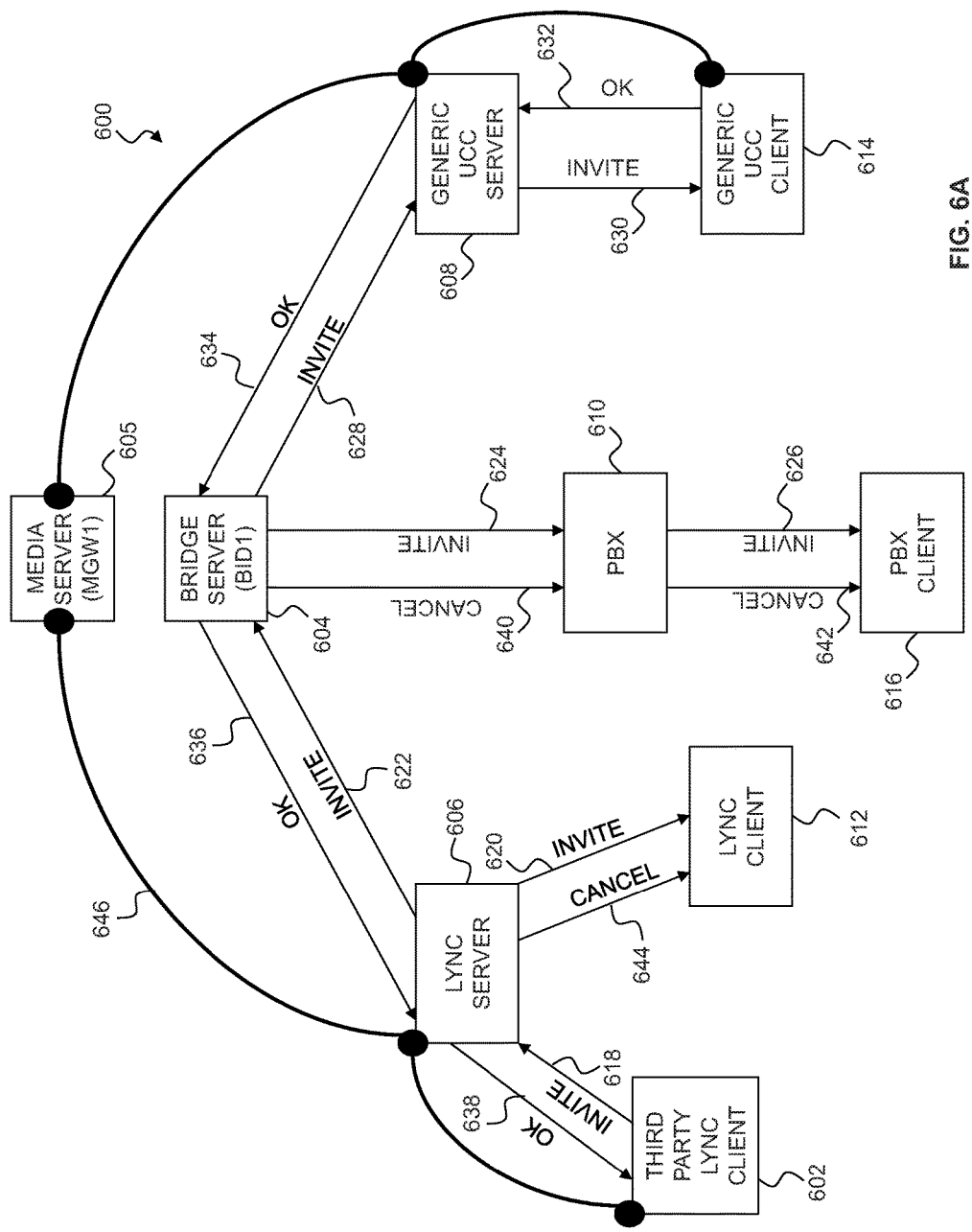
FIG. 6A illustrates a diagrammatic view of another embodiment of a communication session within the environment of FIG. 1 or FIG. 3.

Referring now to FIG. 6A, there is illustrated a diagrammatic view of an environment 600 that shows one embodiment of the environment 300 with a communication session between a third-party Lync client 602 and a generic UCC client 614 corresponding to johndoe@company.com. As described with respect to FIG. 3, the user identifier johndoe@company.com is simultaneously registered by multiple clients and by the bridge server 604. In the present example, the bridge server 604 is registered as johndoe@company.com with a Lync server 606, a generic UCC server 608, and a PBX system 610. In addition, the bridge server user has registered johndoe@company.com with a Lync client 612 registered with the Lync server 606, a UCC client 614 registered with the UCC server 608, and a PBX client 616 registered with the PBX 610.

Figure 6B:
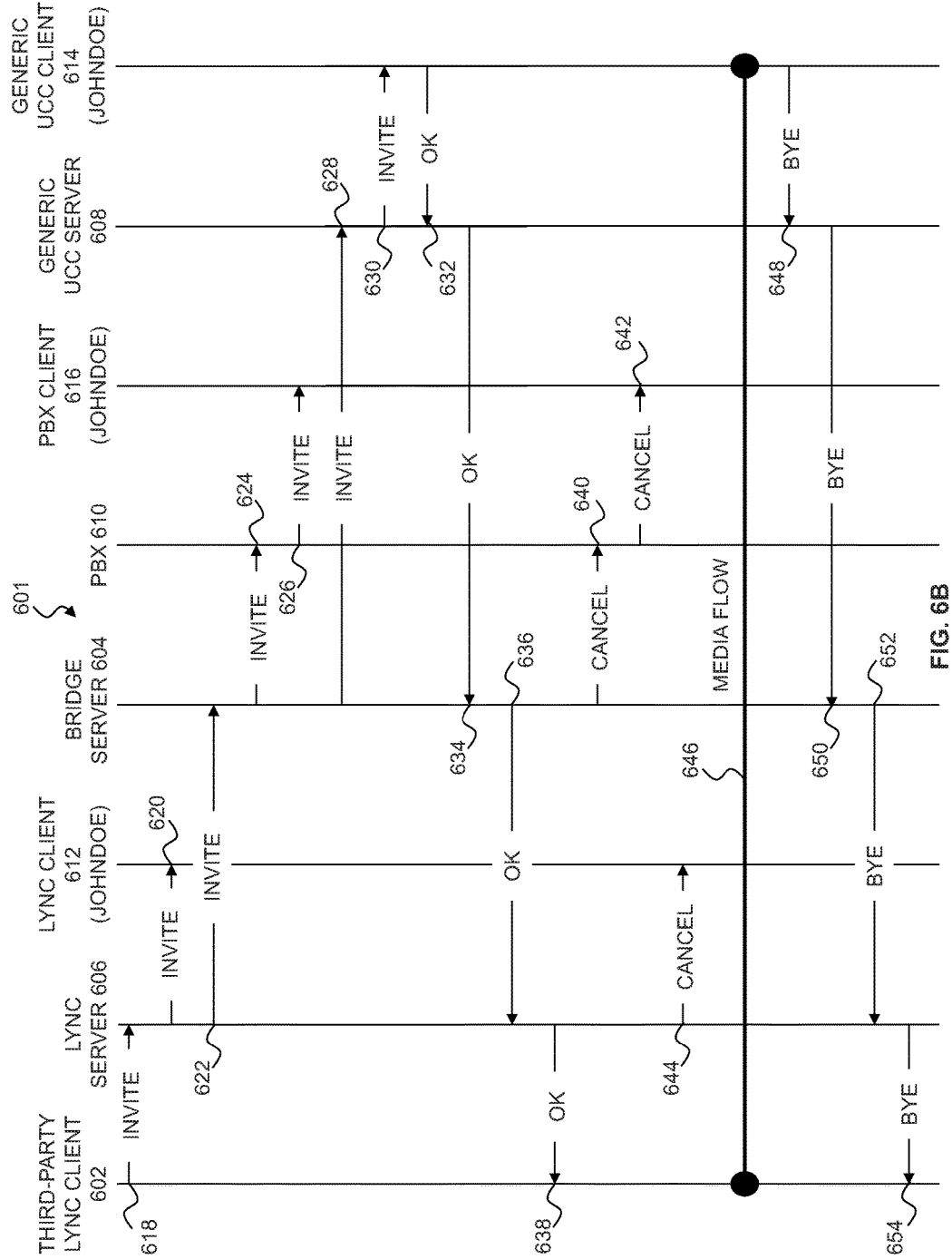
FIG. 6B illustrates a sequence diagram of one embodiment of the communication session of FIG. 6A.

With additional reference to FIG. 6B and continued reference to FIG. 6A, there is illustrated a sequence diagram 601 of one embodiment of a message sequence that may be used to establish a communication session between the third-party Lync client 602 and the generic UCC client 614. In step 618, the third-party Lync client 602 initiates a communication session with the bridge server user by sending an INVITE from the third-party Lync client 602 to the Lync server 606. An INVITE is then sent from the Lync server 606 to the Lync client 612 in step 620. Another INVITE is sent from the Lync server 606 to the bridge server 604 in step 622. The bridge server 604 then sends an INVITE to the PBX 610 in step 624, which causes the PBX 610 to send an INVITE to the PBX client 616 in step 626. Another INVITE is sent from the bridge server 604 to the generic UCC server 608 in step 628, which causes the generic UCC server 608 to send an INVITE to the generic UCC client 614 in step 630.

At this point, an INVITE has been sent to each of the bridge server user's clients (Lync, generic UCC, and PBX), allowing the bridge server user to answer the communication using any of these clients. In the present example, the bridge server user answers via the generic UCC client 614. This causes an OK message to be sent from the generic UCC client 614 to the generic UCC server 608 in step 632. The generic UCC server 608 then sends an OK to the bridge server 604 in step 634. The bridge server 604 then sends an OK to the Lync server 606 in step 636. The Lync server 606 then sends an OK to the third-party Lync client 602 in step 638. Since the communication has been accepted between the third-party Lync client 602 and the bridge server user's generic UCC client 614, a CANCEL is sent from the bridge server 604 to the PBX 610 in step 640, which causes the PBX 610 to send a CANCEL to the PBX client 616 in step 642. A CANCEL is also sent from the Lync server 606 to the Lync client 612 in step 644.

A media flow 646 is therefore established between the third-party Lync client 602 and the generic UCC client 614, with the media gateway 605 acting to bridge the media path 646, as shown in FIG. 6A. To end the communication session, a BYE is sent from the generic UCC client 614 to the generic UCC server 608 in step 648, which then sends a BYE to the bridge server 604 in step 650. The bridge server 604 then sends a BYE to the Lync server 606 in step 652, which then sends a BYE to the third-party Lync client 602 in step 654. It is understood that the BYE may originate from either side of the communication session.

Figure 6C:
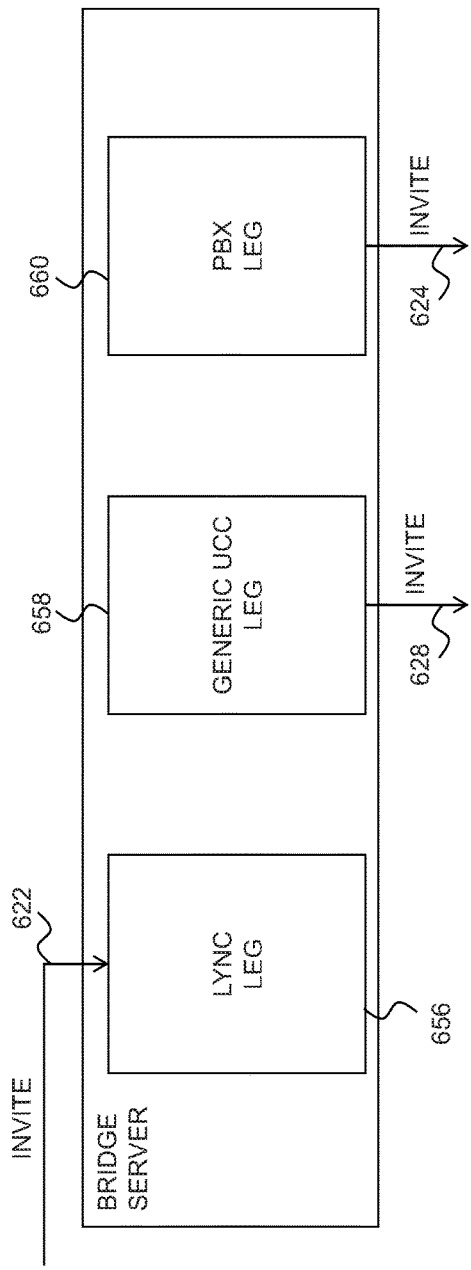
FIGS. 6C-6E illustrate diagrammatic views of embodiments of objects that may be used by the bridge server to manage the communication session of FIGS. 6A and 6B.
Figure 6D:
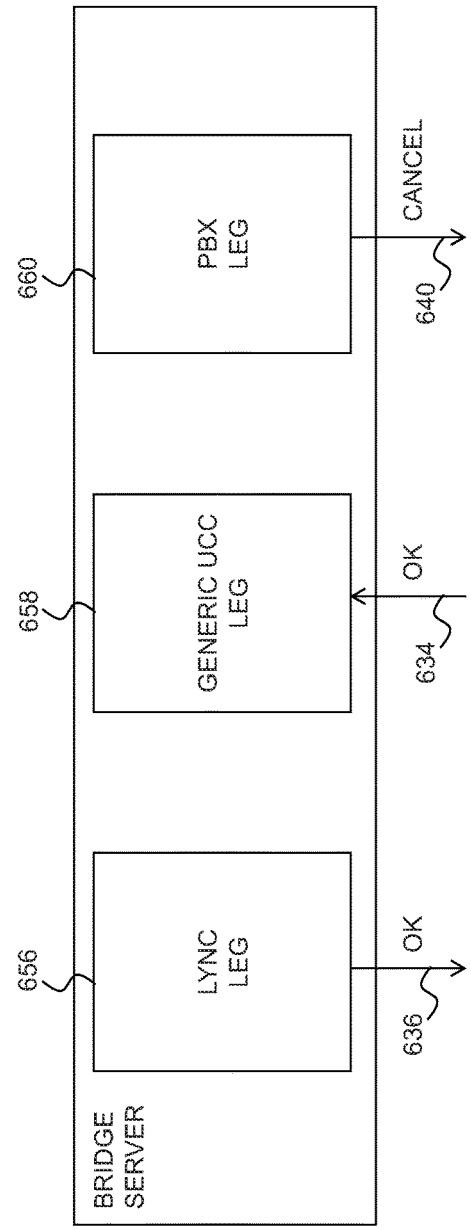
Figure 6E:
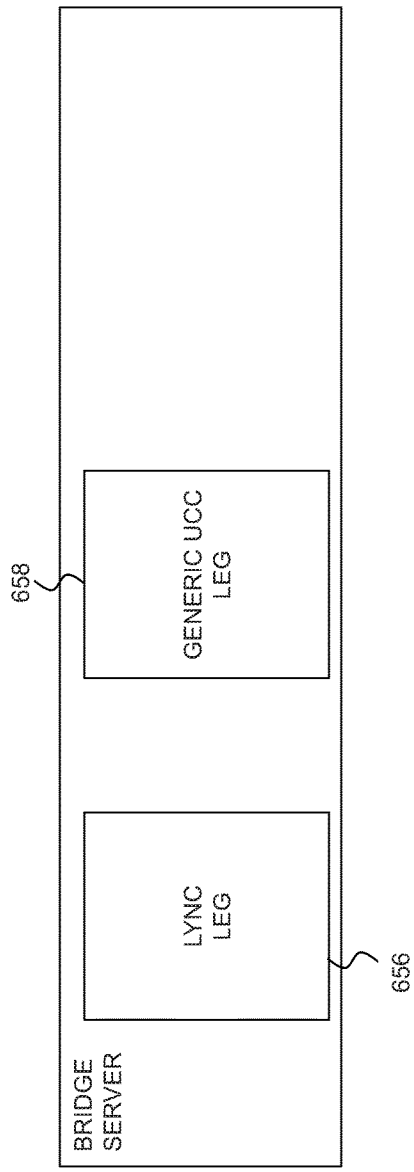

Referring now to FIGS. 6C-6E, there is illustrated a diagrammatic view of one embodiment of the communication session of FIGS. 6A and 6B on the bridge server 604. In FIG. 6C, a Lync leg 656 receives the INVITE of step 622. The INVITE of step 628 is sent out over a generic UCC leg 658 and the INVITE of step 624 is sent out over a PBX leg 660, to reach their respective server, as described herein. In FIG. 6D, after the bridge server user has answered using the generic UCC client 614, the OK of step 634 is received via the generic UCC leg 658. The CANCEL of step 540 is then sent out over the PBX leg 640 and the OK of step 636 is sent out over the Lync leg 656. This results in a signaling path being formed using the Lync leg 656 and the generic UCC leg 658, while the PBX leg 660 can be destroyed as shown in FIG. 6E. It will be understood that any type of communications platform may be used, and that Lync and PBX platforms are merely used for illustrative purposes.

Figure 6F:
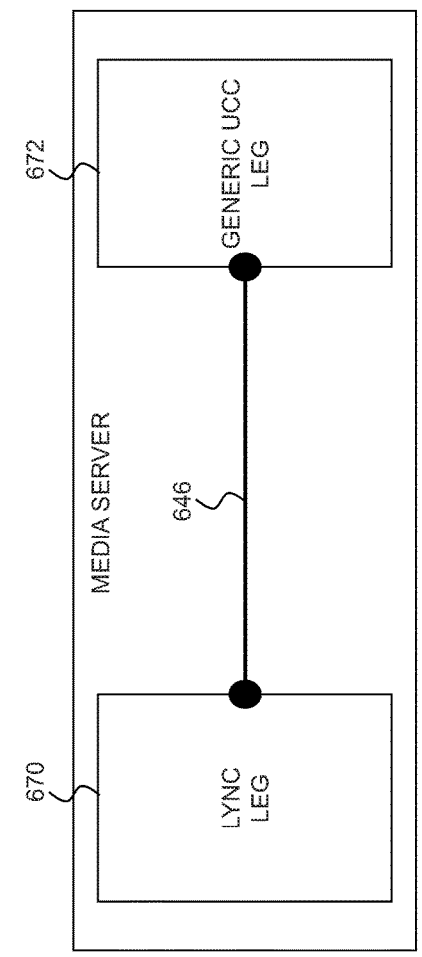
FIG. 6F illustrates a diagrammatic view of one embodiment of objects that may be used by the media gateway to manage media legs for the communication session of FIGS. 6A and 6B.

Referring to FIG. 6F, there is illustrated a diagrammatic view of one embodiment of the communication session of FIGS. 6A and 6B on the media server 604. The media server 604 establishes a Lync leg 670 with the Lync server 606 and a generic UCC leg 672 with the generic UCC server 608. The media server 604 then bridges the two legs 670 and 672. The bridging process may include converting between different media formats and/or protocols in order to make the media received by one of the legs 670 and 672 compatible with the media requirements of the domain coupled to the other of the legs.

It will be understood that, in some embodiments, the generic UCC server 608 may be a communications platform that is compatible with the Lync server 606 or the Lync server 606 may be a different communications platform that is compatible with the generic UCC server 608. In such a scenario, the bridge server 604 may perform the same operations as in the embodiments where the generic UCC server 608 is incompatible with the Lync server. The bridge server 604 may still, using the information contained in the cross-domain database 116, translate the information received from the Lync server 606 and the UCC server 608 into the required protocols, even if no translation is needed. It will be appreciated that this treatment of compatible communications platforms can be applied in any of the embodiments described herein. In other embodiments, the bridge server 604 may perform a check to determine whether a communications platform, such as the Lync server 606, is compatible with another communications platform, such as the generic UCC server 608, and then skip any translations. It will be appreciated that this treatment of compatible communications platforms can be applied in any of the embodiments described herein.

Figure 7A:
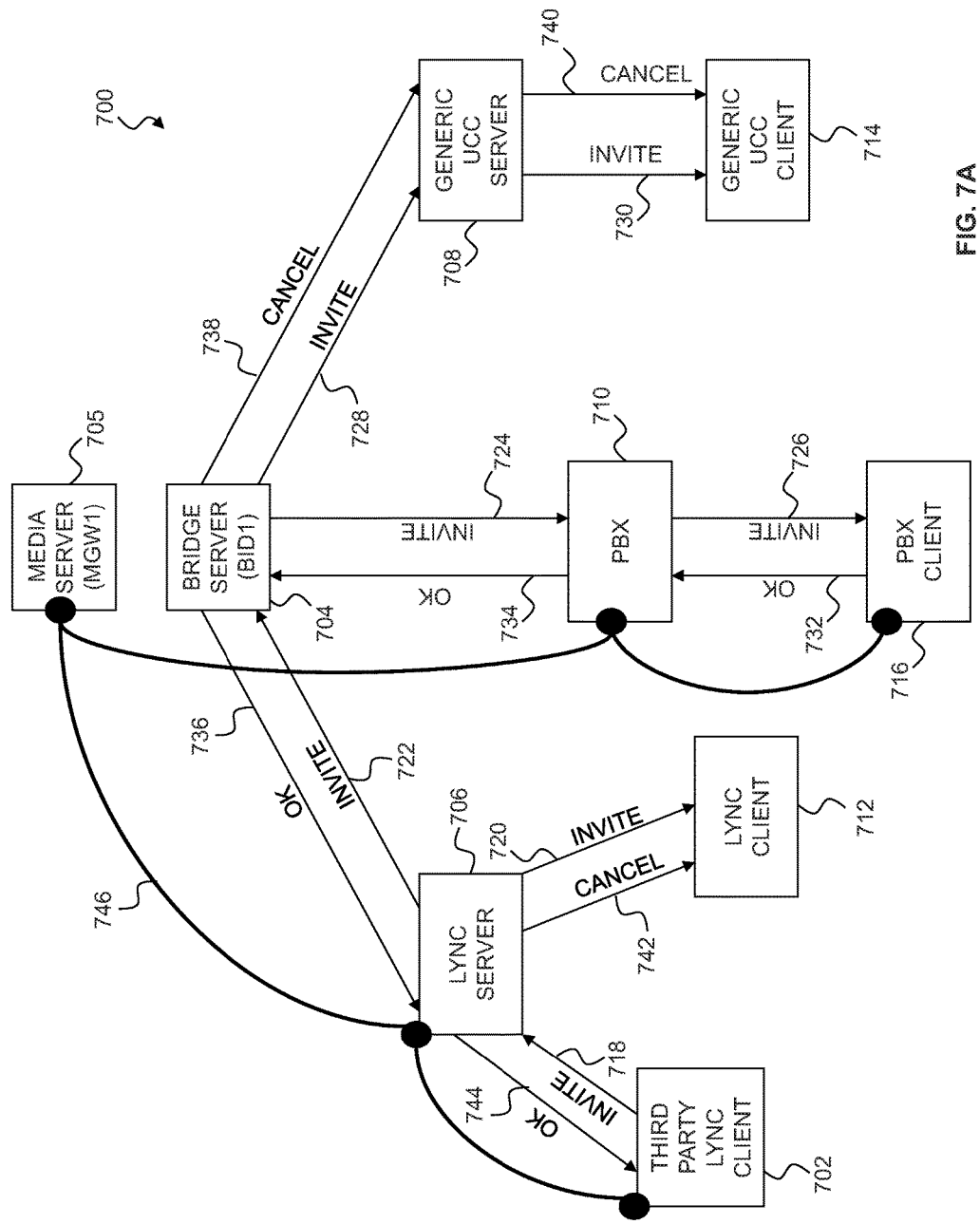
FIG. 7A illustrates a diagrammatic view of another embodiment of a communication session within the environment of FIG. 1 or FIG. 3.

Referring now to FIG. 7A, there is illustrated a diagrammatic view of an environment 700 that shows one embodiment of the environment 300 with a communication session between a third-party Lync client 702 and a PBX client 716 corresponding to johndoe@company.com. As described with respect to FIG. 3, the user identifier johndoe@company.com is simultaneously registered by multiple clients and by the bridge server 704. In the present example, the bridge server 704 is registered as johndoe@company.com with a Lync server 706, a generic UCC server 708, and a PBX system 710. In addition, the bridge server user has registered johndoe@company.com with a Lync client 712 registered with the Lync server 706, a UCC client 714 registered with the UCC server 708, and a PBX client 716 registered with the PBX 710.

Figure 7B:
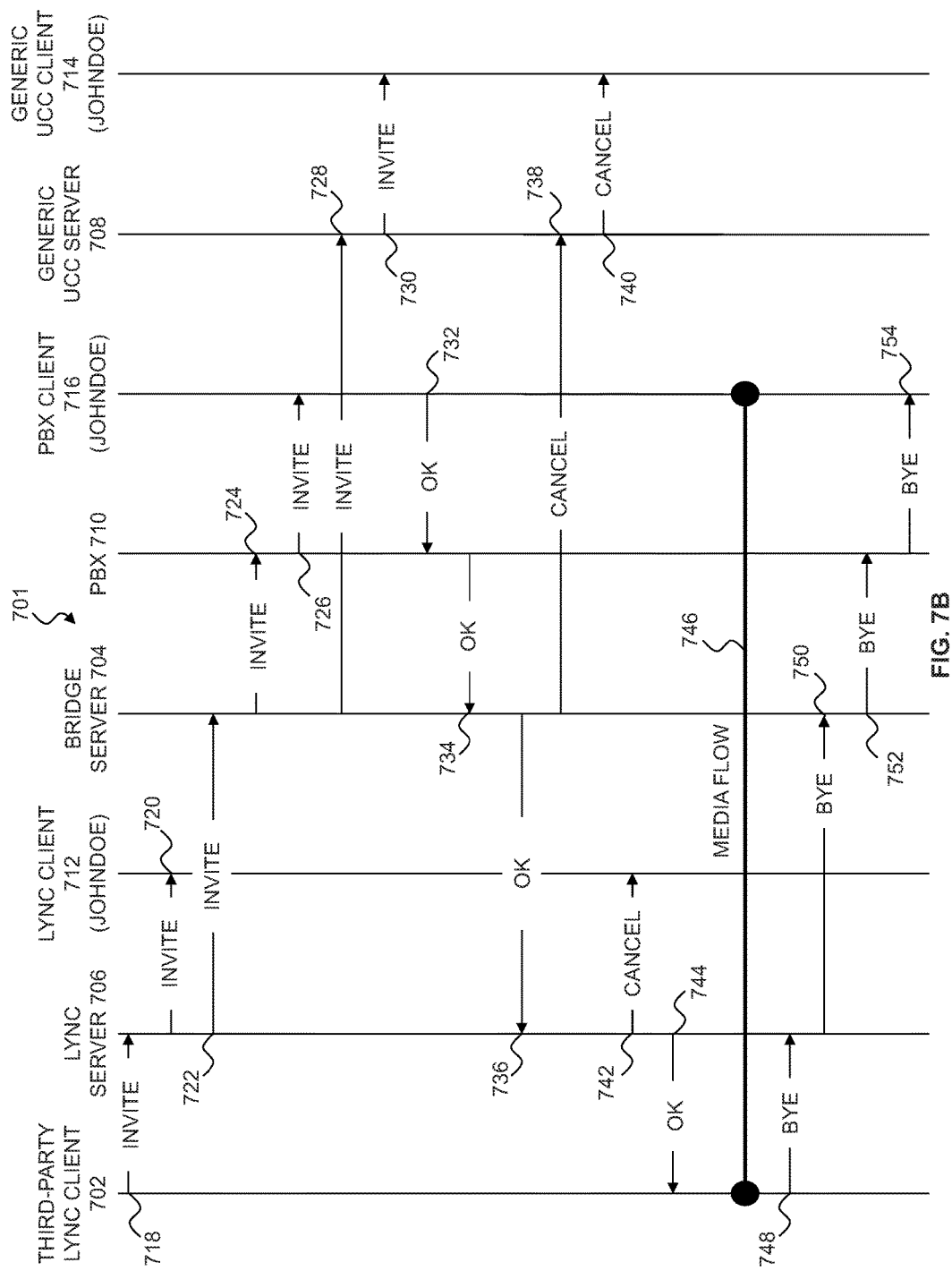
FIG. 7B illustrates a sequence diagram of one embodiment of the communication session of FIG. 7A.

With additional reference to FIG. 7B and continued reference to FIG. 7A, there is illustrated a sequence diagram 701 of one embodiment of a message sequence that may be used to establish a communication session between the third-party Lync client 702 and the PBX client 716. In step 718, the third-party Lync client 702 initiates a communication session with the bridge server user by sending an INVITE from the third-party Lync client 702 to the Lync server 706. An INVITE is then sent from the Lync server 706 to the Lync client 712 in step 720. Another INVITE is sent from the Lync server 706 to the bridge server 704 in step 722. The bridge server 704 then sends an INVITE to the PBX 710 in step 724, which causes the PBX 710 to send an INVITE to the PBX client 716 in step 726. Another INVITE is sent from the bridge server 704 to the generic UCC server 708 in step 728, which causes the generic UCC server 708 to send an INVITE to the generic UCC client 714 in step 730.

At this point, an INVITE has been sent to each of the bridge server user's clients (Lync, generic UCC, and PBX), allowing the bridge server user to answer the communication using any of these clients. In the present example, the bridge server user answers via the PBX client 716. This causes an OK to be sent from the PBX client 716 to the PBX system 710 in step 732. The PBX system 710 then sends an OK to the bridge server 704 in step 734. The bridge server 704 then sends an OK to the Lync server 706 in step 736. The bridge server 704 also sends a CANCEL to the generic UCC server 708 in step 738, which sends a CANCEL to the generic UCC client 714 in step 740. The Lync server 706 sends a CANCEL to the Lync client 712 in step 742. The Lync server 706 sends an OK to the third-party Lync client 702 in step 744.

A media flow 746 is therefore established between the third-party Lync client 702 and the PBX client 716, with the media gateway 705 acting to bridge the media path 746, as shown in FIG. 7A. To end the communication session, a BYE is sent from the third-party Lync client 702 to the Lync server 706 in step 748, which then sends a BYE to the bridge server 704 in step 750. The bridge server 704 then sends a BYE to the PBX system 710 in step 752, which then sends a BYE to the PBX client 716 in step 754. It will be understood that the BYE may originate from either side of the communication session.

Figure 7E:
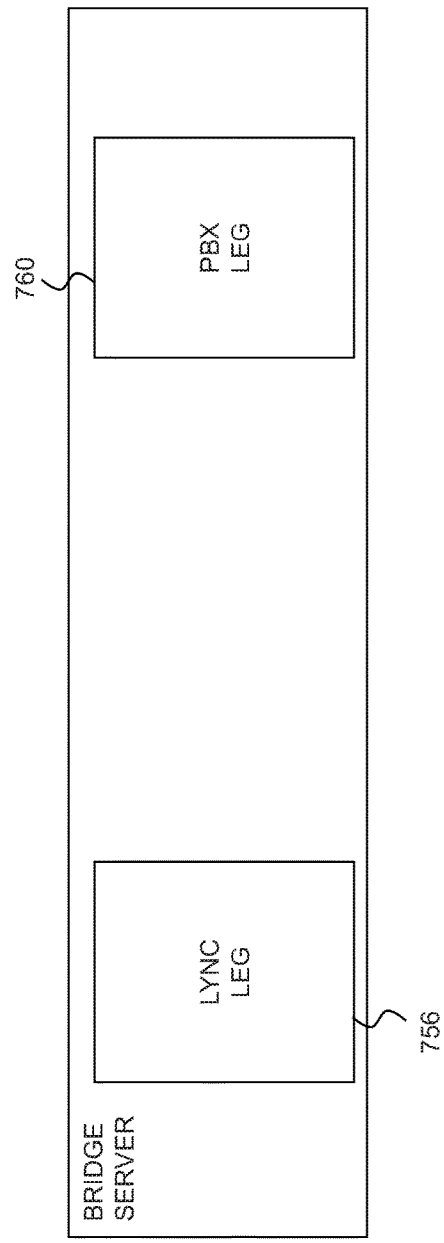

Referring now to FIGS. 7C-7E, there is illustrated a diagrammatic view of one embodiment of the communication session of FIGS. 7A and 7B on the bridge server 704. In FIG. 7C, a Lync leg 756 receives the INVITE of step 722. The INVITE of step 728 is sent out over a generic UCC leg 758 and the INVITE of step 724 is sent out over a PBX leg 760, to reach their respective server, as described herein. In FIG. 7D, after the bridge server user has answered using the PBX client 716, the OK of step 734 is received via the PBX leg 760. The CANCEL of step 738 is then sent out over the generic UCC leg 758 and the OK of step 736 is sent out over the Lync leg 756. This results in a signaling path being formed between the Lync leg 756 and the PBX leg 760, while the generic UCC leg 758 can be destroyed as shown in FIG. 7E. It will be understood that any type of communications platform may be used, and that Lync and PBX platforms are merely used for illustrative purposes.

Figure 7F:
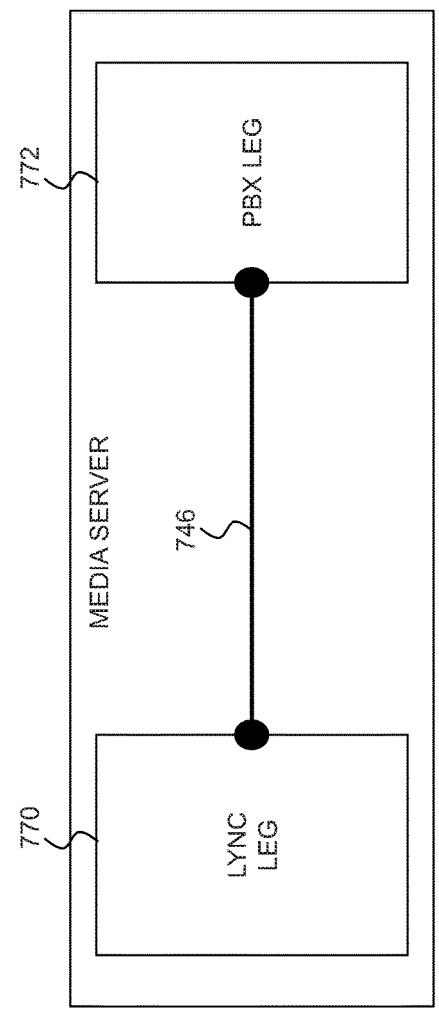
FIG. 7F illustrates a diagrammatic view of one embodiment of objects that may be used by the media gateway to manage media legs for the communication session of FIGS. 7A and 7B.

Referring to FIG. 7F, there is illustrated a diagrammatic view of one embodiment of the communication session of FIGS. 7A and 7B on the media server 704. The media server 704 establishes a Lync leg 770 with the Lync server 706 and a PBX leg 772 with the PBX 710. The media server 704 then bridges the two legs 770 and 772. The bridging process may include converting between different media formats and/or protocols in order to make the media received from one of the legs 770 and 772 compatible with the media requirements of the other of the legs.

Figure 8A:
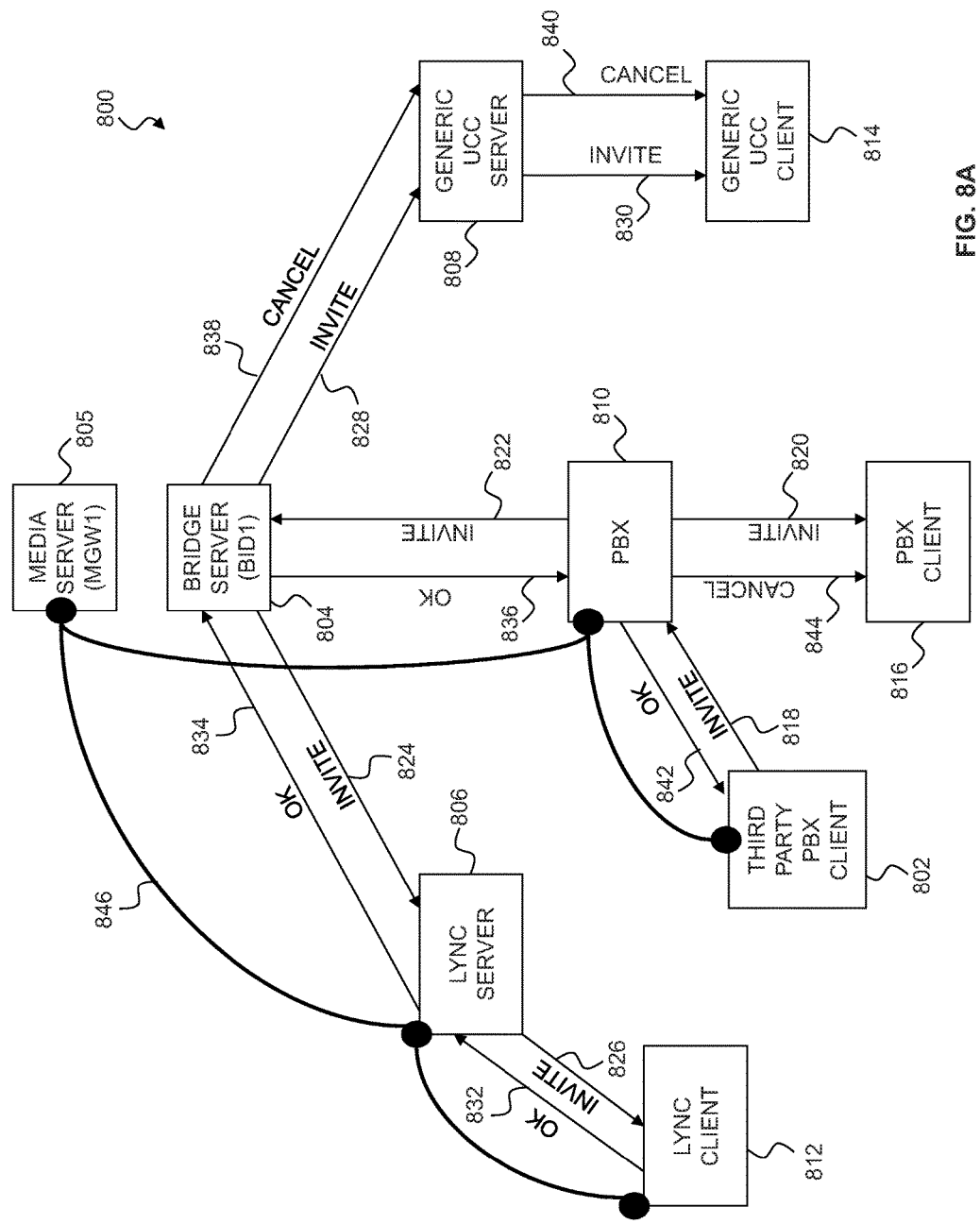
FIG. 8A illustrates a diagrammatic view of another embodiment of a communication session within the environment of FIG. 1 or FIG. 3.

Referring now to FIG. 8A, there is illustrated a diagrammatic view of an environment 800 that shows one embodiment of the environment 300 with a communication session between a third-party PBX client 802 and a Lync client 812 corresponding to johndoe@company.com. As described with respect to FIG. 3, the user identifier johndoe@company.com is simultaneously registered by multiple clients and by the bridge server 804. In the present example, the bridge server 804 is registered as johndoe@company.com with a Lync server 806, a generic UCC server 808, and a PBX system 810. In addition, the bridge server user has registered johndoe@company.com with a Lync client 812 registered with the Lync server 806, a UCC client 814 registered with the UCC server 808, and a PBX client 816 registered with the PBX 810.

Figure 8B:
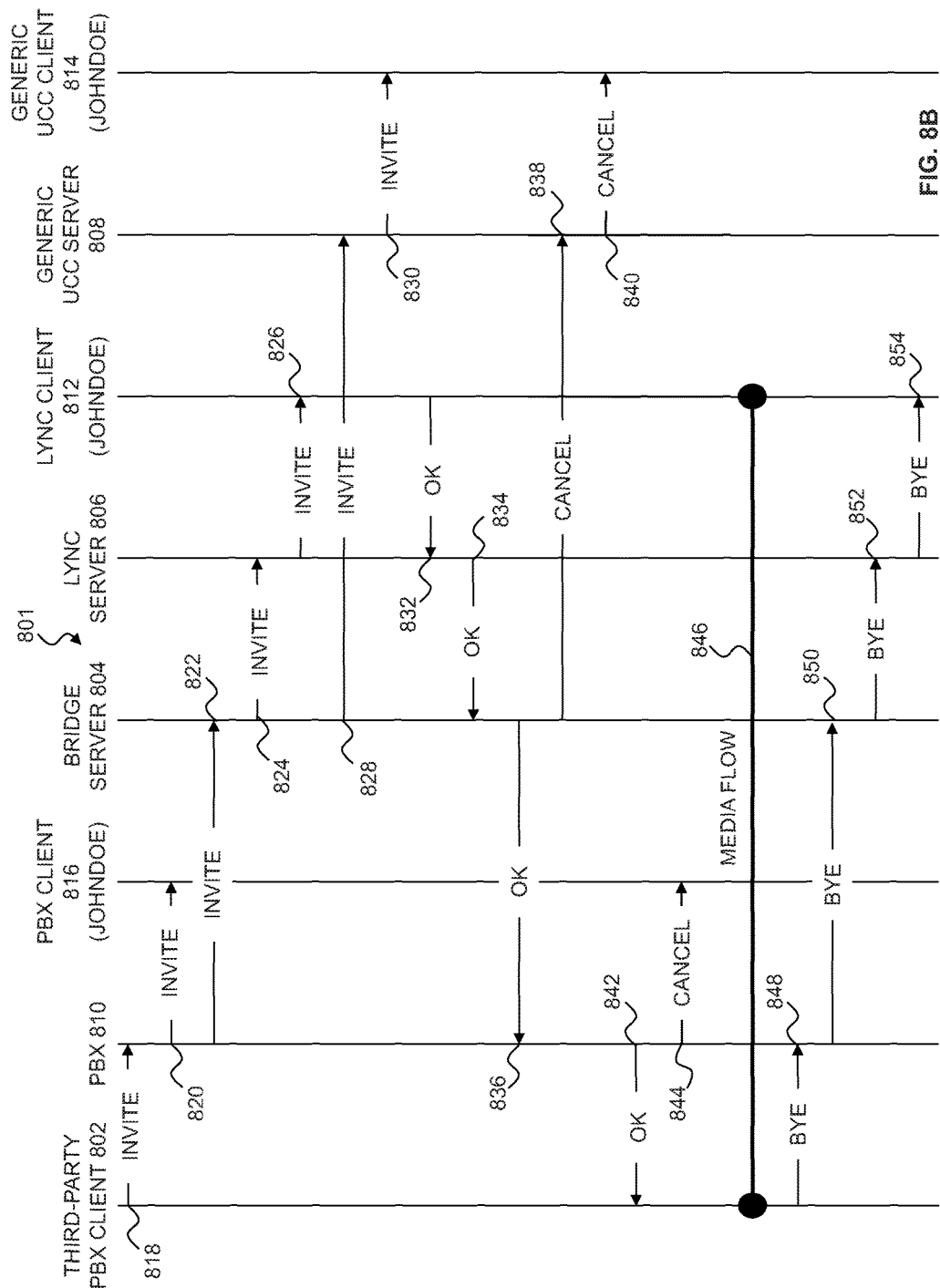
FIG. 8B illustrates a sequence diagram of one embodiment of the communication session of FIG. 8A.

With additional reference to FIG. 8B and continued reference to FIG. 8A, there is illustrated a sequence diagram 801 of one embodiment of a message sequence that may be used to establish a communication session between the third-party PBX client 802 and the Lync client 812. In step 818, the third-party PBX client 802 initiates a communication session with the bridge server user by sending an INVITE from the PBX client 802 to the PBX 810. An INVITE is then sent from the PBX 810 to the PBX client 816 in step 820. Another INVITE is sent from the PBX 810 to the bridge server 804 in step 822. The bridge server 804 then sends an INVITE to the Lync server 806 in step 824, which causes the Lync server 806 to send an INVITE to the Lync client 812 in step 826. Another INVITE is sent from the bridge server 804 to the generic UCC server 808 in step 828, which causes the generic UCC server 808 to send an INVITE to the generic UCC client 814 in step 830.

At this point, an INVITE has been sent to each of the bridge server user's clients (Lync, generic UCC, and PBX), allowing the bridge server user to answer the communication using any of these clients. In the present example, the bridge server user answers via the Lync client 812. This causes an OK to be sent from the Lync client 812 to the Lync server 806 in step 832. The Lync server 806 then sends an OK to the bridge server 804 in step 834. The bridge server 804 then sends an OK to the PBX 810 in step 836. The bridge server 804 also sends a CANCEL to the generic UCC server 808 in step 838, which sends a CANCEL to the generic UCC client 814 in step 840. The PBX 810 sends an OK to the third-party PBX client 802 in step 842 and the PBX 810 also sends a CANCEL to the PBX client 816 in step 844.

A media flow 846 is therefore established between the third-party PBX client 802 and the Lync client 812, with the media gateway 805 acting to bridge the media path 846, as shown in FIG. 8A. To end the communication session, a BYE is sent from the third-party PBX client 802 to the PBX 810 in step 848, which then sends a BYE to the bridge server 804 in step 850. The bridge server 804 then sends a BYE to the Lync server 806 in step 852, which then sends a BYE to the Lync client 812 in step 854. It will be understood that the BYE may originate from either side of the communication session.

Figure 8C:
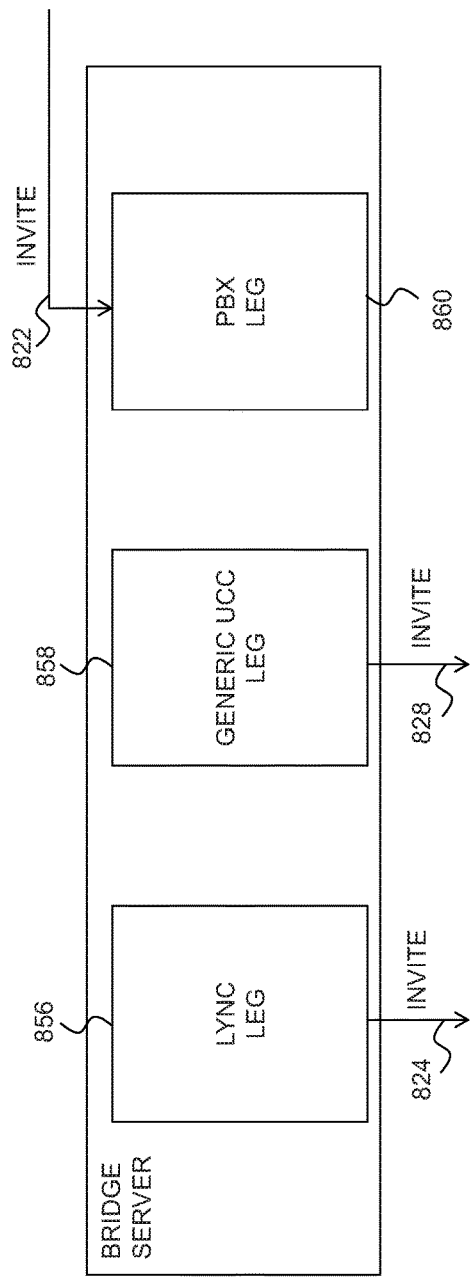
Figure 8D:
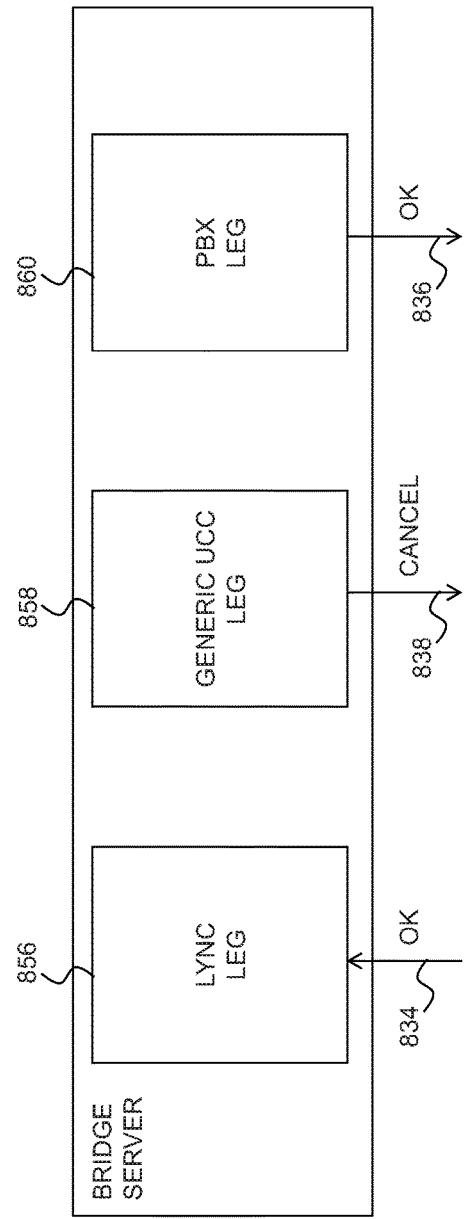

Referring now to FIGS. 8C-8E, there is illustrated a diagrammatic view of one embodiment of the communication session of FIGS. 8A and 8B on the bridge server 804. In FIG. 8C, a PBX leg 860 receives the INVITE of step 822. The INVITE of step 828 is sent out over a generic UCC leg 858 and the INVITE of step 824 is sent out over a Lync leg 856, to reach their respective server, as described herein. In FIG. 8D, after the bridge server user has answered using the Lync client 812, the OK of step 834 is received via the Lync leg 856. The CANCEL of step 838 is then sent out over the generic UCC leg 858 and the OK of step 836 is sent out over the PBX leg 860. This results in a signaling path being formed between the Lync leg 856 and the PBX leg 860, while the generic UCC leg 858 can be destroyed as shown in FIG. 8E. It will be understood that any type of communications platform may be used, and that Lync and PBX platforms are merely used for illustrative purposes.

Referring to FIG. 8F, there is illustrated a diagrammatic view of one embodiment of the communication session of FIGS. 8A and 8B on the media server 804. The media server 804 establishes a Lync leg 870 with the Lync server 806 and a PBX leg 872 with the PBX 810. The media server 804 then bridges the two legs 870 and 872. The bridging process may include converting between different media formats and/or protocols in order to make the media received from one of the legs 870 and 872 compatible with the media requirements of the other of the legs.

Figure 9A:
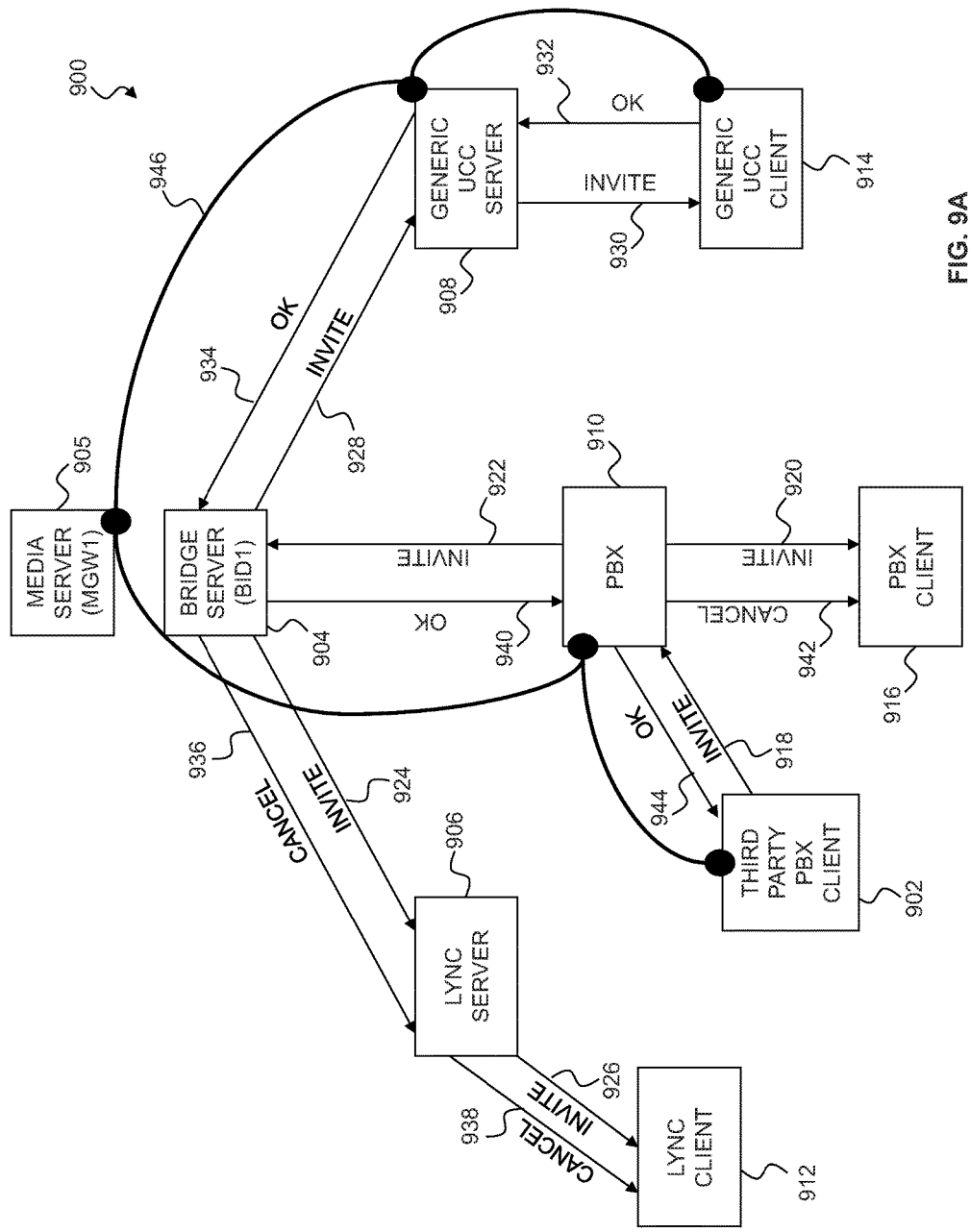
FIG. 9A illustrates a diagrammatic view of another embodiment of a communication session within the environment of FIG. 1 or FIG. 3.

Referring now to FIG. 9A, there is illustrated a diagrammatic view of an environment 900 that shows one embodiment of the environment 300 with a communication session between a third-party PBX client 902 and a generic UCC client 914 corresponding to johndoe@company.com. As described with respect to FIG. 3, the user identifier johndoe@company.com is simultaneously registered by multiple clients and by the bridge server 904. In the present example, the bridge server 904 is registered as johndoe@company.com with a Lync server 906, a generic UCC server 908, and a PBX system 910. In addition, the bridge server user has registered johndoe@company.com with a Lync client 912 registered with the Lync server 906, a UCC client 914 registered with the UCC server 908, and a PBX client 916 registered with the PBX 910.

Figure 9B:
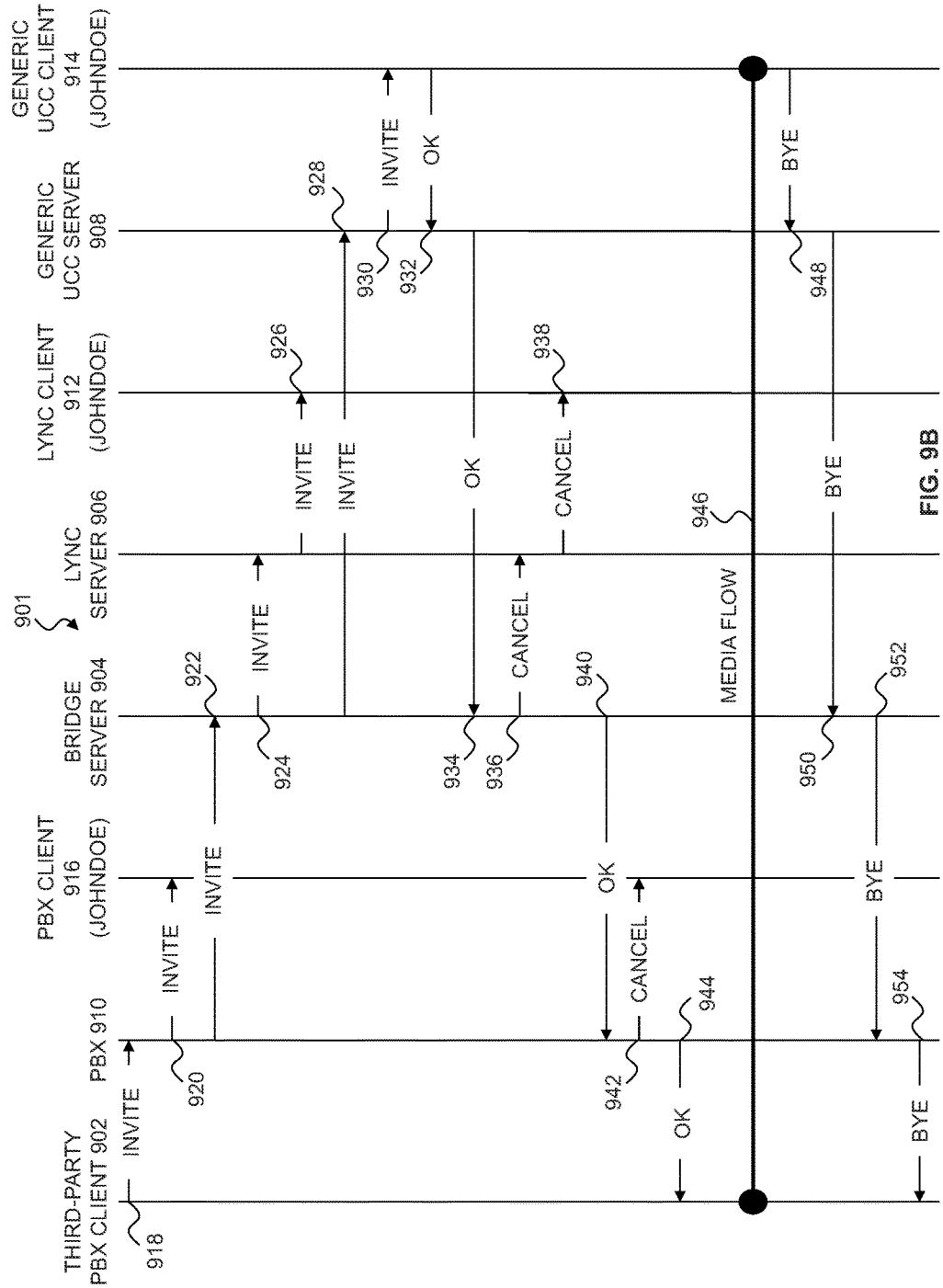
FIG. 9B illustrates a sequence diagram of one embodiment of the communication session of FIG. 9A.

With additional reference to FIG. 9B and continued reference to FIG. 9A, there is illustrated a sequence diagram 901 of one embodiment of a message sequence that may be used to establish a communication session between the third-party PBX client 902 and the generic UCC client 914. In step 918, the third-party PBX client 902 initiates a communication session with the bridge server user by sending an INVITE from the PBX client 902 to the PBX 910. An INVITE is then sent from the PBX 910 to the PBX client 916 in step 920. Another INVITE is sent from the PBX 910 to the bridge server 904 in step 922. The bridge server 904 then sends an INVITE to the Lync server 906 in step 924, which causes the Lync server 906 to send an INVITE to the Lync client 912 in step 926. Another INVITE is sent from the bridge server 904 to the generic UCC server 908 in step 928, which causes the generic UCC server 908 to send an INVITE to the generic UCC client 914 in step 930.

At this point, an INVITE has been sent to each of the bridge server user's clients (Lync, generic UCC, and PBX), allowing the bridge server user to answer the communication using any of these clients. In the present example, the bridge server user answers via the generic UCC client 914. This causes an OK to be sent from the generic UCC client 914 to the generic UCC server 908 in step 932. The generic UCC server 908 then sends an OK to the bridge server 904 in step 934. The bridge server 904 sends a CANCEL to the Lync server 906 in step 936, which sends a CANCEL to the Lync client 812 in step 938. The bridge server 904 also sends an OK to the PBX 910 in step 940. The PBX 910 sends a CANCEL to the PBX client 916 in step 942 and also sends an OK to the third-party PBX client 902 in step 944.

A media flow 946 is therefore established between the third-party PBX client 902 and the generic UCC client 914, with the media gateway 905 acting to bridge the media path 946, as shown in FIG. 9A. To end the communication session, a BYE is sent from the generic UCC client 914 to the generic UCC server 908 in step 948, which then sends a BYE to the bridge server 904 in step 950. The bridge server 904 then sends a BYE to the PBX 910 in step 952, which then sends a BYE to the third-party PBX client 902 in step 954. It will be understood that the BYE may originate from either side of the communication session.

Figure 9C:
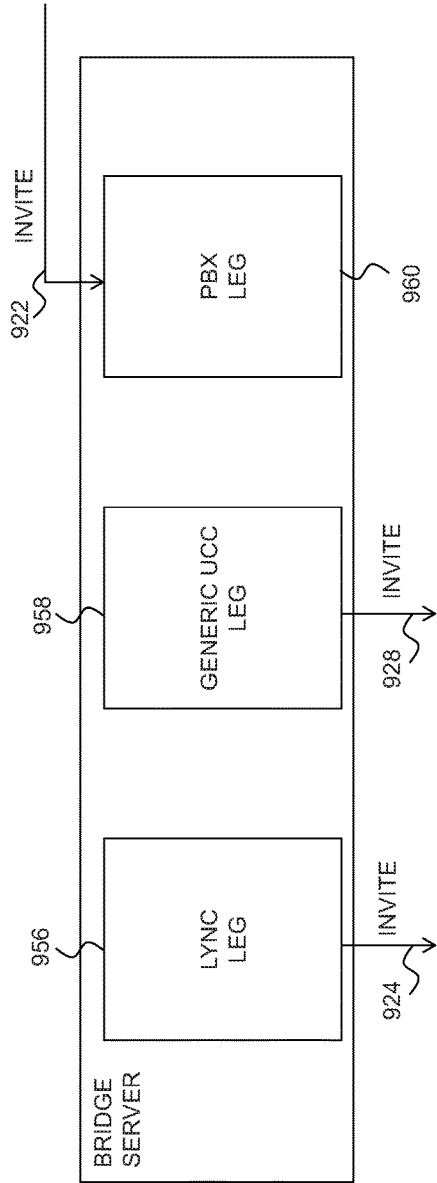
FIGS. 9C-9E illustrate diagrammatic views of embodiments of objects that may be used by the bridge server to manage the communication session of FIGS. 9A and 9B.
Figure 9D:
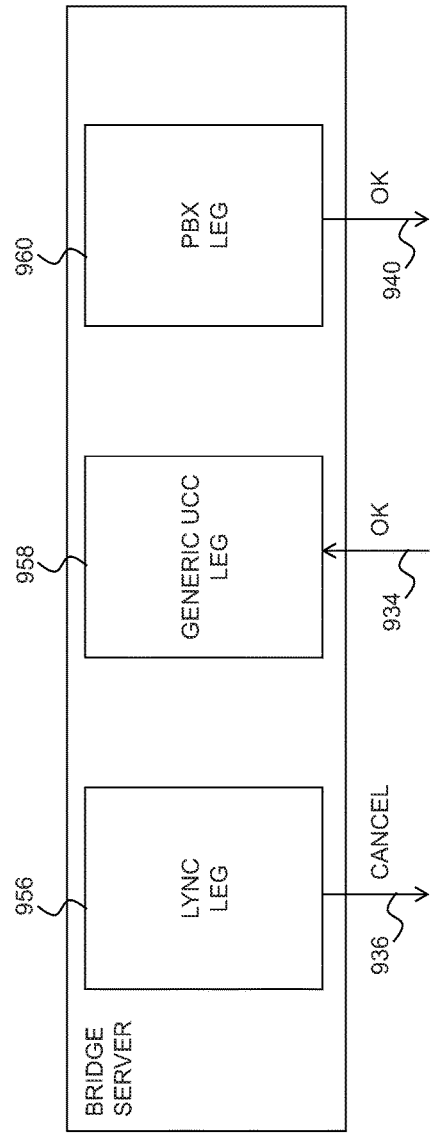
Figure 9E:
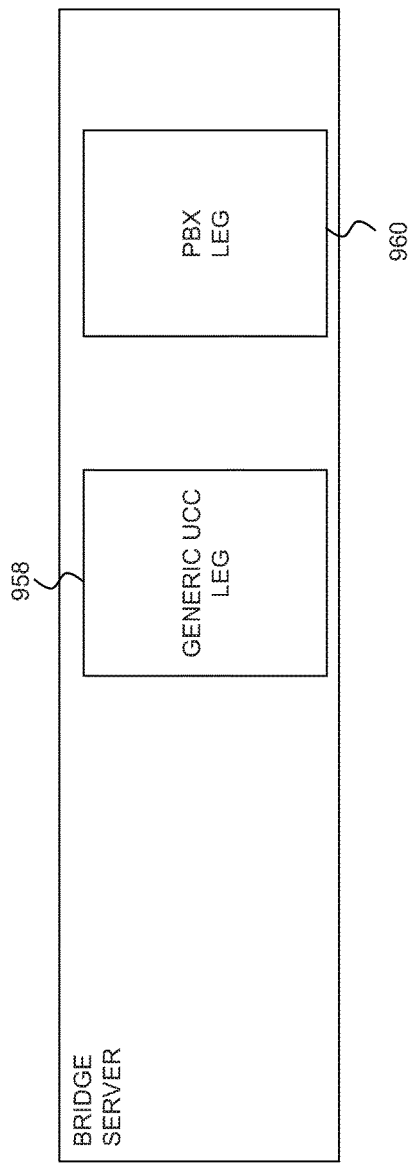

Referring now to FIGS. 9C-9E, there is illustrated a diagrammatic view of one embodiment of the communication session of FIGS. 9A and 9B on the bridge server 904. In FIG. 9C, a PBX leg 960 receives the INVITE of step 922. The INVITE of step 928 is sent out over a generic UCC leg 958 and the INVITE of step 924 is sent out over a Lync leg 956, to reach their respective server, as described herein. In FIG. 9D, after the bridge server user has answered using the generic UCC client 914, the OK of step 934 is received via the generic UCC leg 958. The CANCEL of step 936 is then sent out over the Lync leg 956 and the OK of step 940 is sent out over the PBX leg 960. This results in a signaling path being formed between the generic UCC leg 958 and the PBX leg 960, while the Lync leg 956 can be destroyed as shown in FIG. 9E. It will be understood that any type of communications platform may be used, and that Lync and PBX platforms are merely used for illustrative purposes.

Figure 9F:
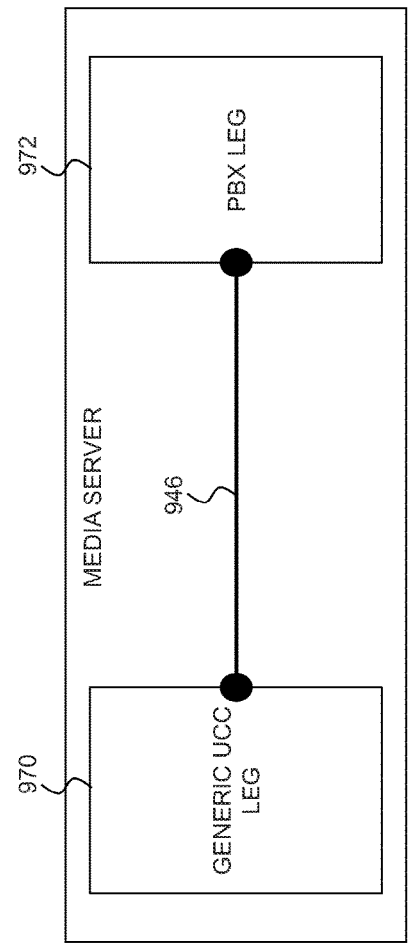
FIG. 9F illustrates a diagrammatic view of one embodiment of objects that may be used by the media gateway to manage media legs for the communication session of FIGS. 9A and 9B.

Referring to FIG. 9F, there is illustrated a diagrammatic view of one embodiment of the communication session of FIGS. 9A and 9B on the media server 904. The media server 904 establishes a generic UCC leg 970 with the generic UCC server 908 and a PBX leg 972 with the PBX 910. The media server 904 then bridges the two legs 970 and 972. The bridging process may include converting between different media formats and/or protocols in order to make the media received from one of the legs 970 and 972 compatible with the media requirements of the other of the legs.

Figure 10A:
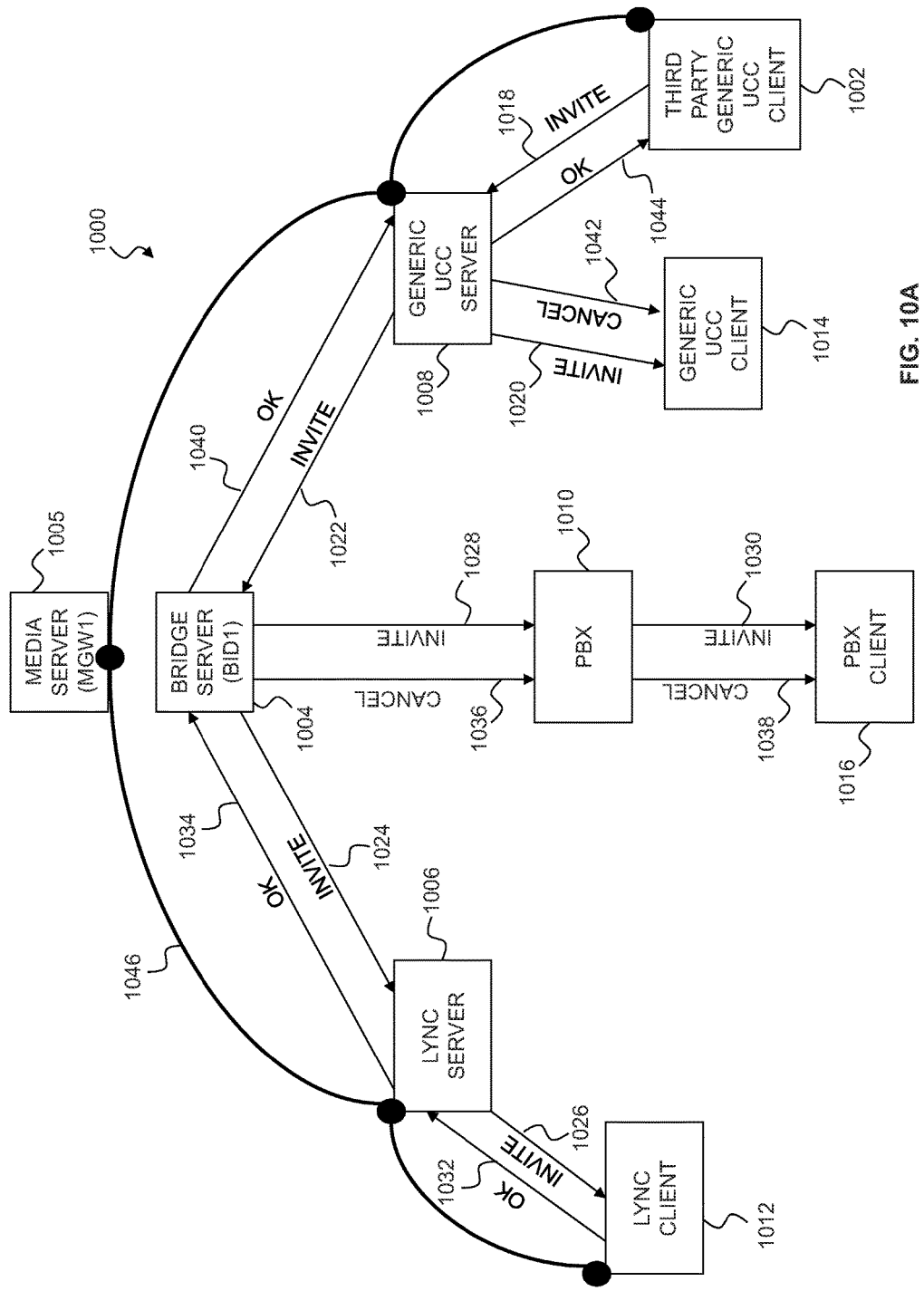
FIG. 10A illustrates a diagrammatic view of another embodiment of a communication session within the environment of FIG. 1 or FIG. 3.

Referring now to FIG. 10A, there is illustrated a diagrammatic view of an environment 1000 that shows one embodiment of the environment 300 with a communication session between a third-party generic UCC client 1002 and a Lync client 1012 corresponding to johndoe@company.com. As described with respect to FIG. 3, the user identifier johndoe@company.com is simultaneously registered by multiple clients and by the bridge server 1004. In the present example, the bridge server 1004 is registered as johndoe@company.com with a Lync server 1006, a generic UCC server 1008, and a PBX system 1010. In addition, the bridge server user has registered johndoe@company.com with the Lync client 1012 registered with the Lync server 1006, a UCC client 1014 registered with the UCC server 1008, and a PBX client 1016 registered with the PBX 1010.

Figure 10B:
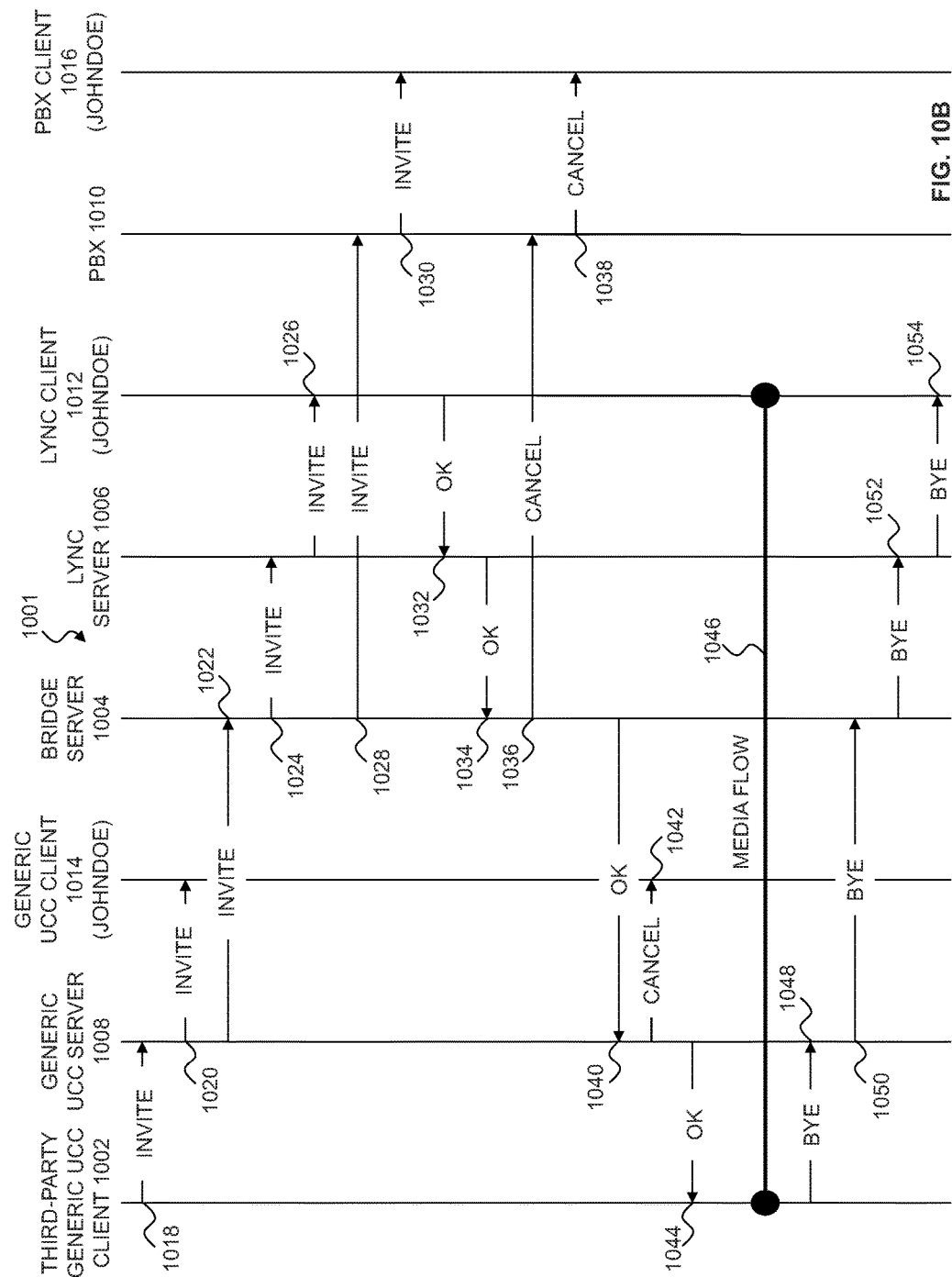
FIG. 10B illustrates a sequence diagram of one embodiment of the communication session of FIG. 10A.

With additional reference to FIG. 10B and continued reference to FIG. 10A, there is illustrated a sequence diagram 1001 of one embodiment of a message sequence that may be used to establish a communication session between the third-party generic UCC client 1002 and the Lync client 1012. In step 1018, the third-party generic UCC client 1002 initiates a communication session with the bridge server user by sending an INVITE from the third-party generic UCC client 1002 to the generic UCC server 1008. An INVITE is then sent from the generic UCC server 1008 to the generic UCC client 1014 in step 1020. Another INVITE is sent from the generic UCC server 1008 to the bridge server 1004 in step 1022. The bridge server 1004 then sends an INVITE to the Lync server 1006 in step 1024, which causes the Lync server 1006 to send an INVITE to the Lync client 1012 in step 1026. Another INVITE is sent from the bridge server 1004 to the PBX 1010 in step 1028, which causes the PBX 1010 to send an INVITE to the PBX client 1016 in step 1030.

At this point, an INVITE has been sent to each of the bridge server user's clients (Lync, generic UCC, and PBX), allowing the bridge server user to answer the communication using any of these clients. In the present example, the bridge server user answers via the Lync client 1012. This causes an OK to be sent from the Lync client 1012 to the Lync server 1006 in step 1032. The Lync server 1006 then sends an OK to the bridge server 1004 in step 1034. The bridge server 1004 sends a CANCEL to the PBX 1010 in step 1036, which sends a CANCEL to the PBX client 1016 in step 1038. The bridge server 1004 also sends an OK to the generic UCC server 1008 in step 1040. The generic UCC server 1008 sends a CANCEL to the generic UCC client 1014 in step 1042 and also sends an OK to the third-party generic UCC client 1002 in step 1044.

A media flow 1046 is therefore established between the third-party generic UCC client 1002 and the Lync client 1012, with the media gateway 1005 acting to bridge the media path 1046, as shown in FIG. 10A. To end the communication session, a BYE is sent from the third-party generic UCC client 1002 to the generic UCC server 1008 in step 1048, which then sends a BYE to the bridge server 1004 in step 1050. The bridge server 1004 then sends a BYE to the Lync server 1006 in step 1052, which then sends a BYE to the Lync client 1012 in step 1054. It will be understood that the BYE may originate from either side of the communication session.

Figure 10E:
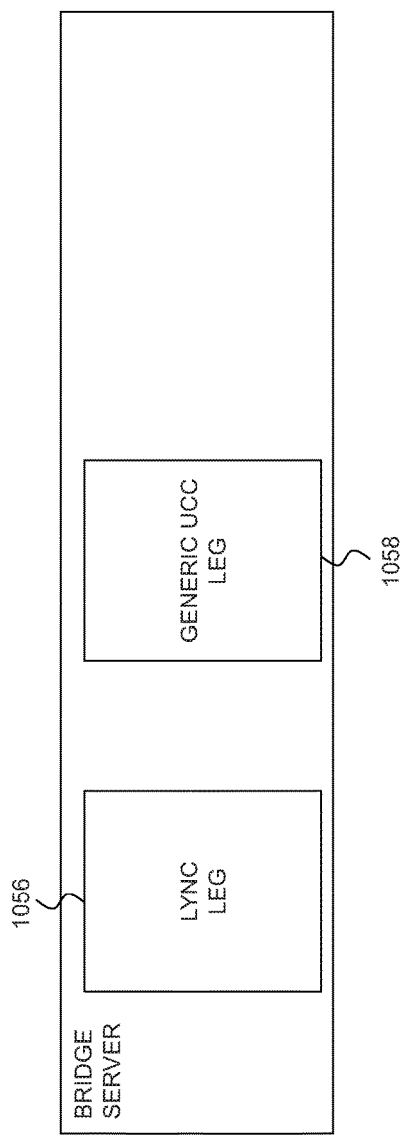

Referring now to FIGS. 10C-10E, there is illustrated a diagrammatic view of one embodiment of the communication session of FIGS. 10A and 10B on the bridge server 1004. In FIG. 10C, a generic UCC leg 1058 receives the INVITE of step 1022. The INVITE of step 1024 is sent out over a Lync leg 1056 and the INVITE of step 1028 is sent out over a PBX leg 1060, to reach their respective server, as described herein. In FIG. 10D, after the bridge server user has answered using the Lync client 1012, the OK of step 1034 is received via the Lync leg 1056. The CANCEL of step 1036 is then sent out over the PBX leg 1060 and the OK of step 1040 is sent out over the generic UCC leg 1058. This results in a signaling path being formed between the Lync leg 1056 and the generic UCC leg 1058, while the PBX leg 1060 can be destroyed as shown in FIG. 10E. It will be understood that any type of communications platform may be used, and that Lync and PBX platforms are merely used for illustrative purposes.

Figure 10F:
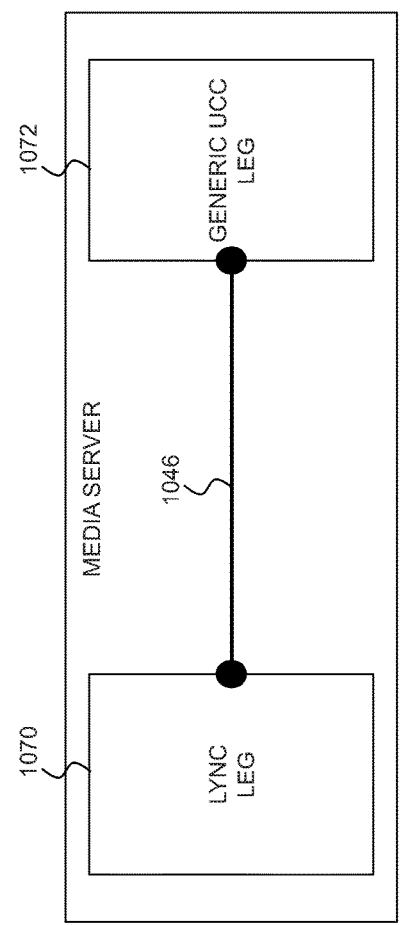
FIG. 10F illustrates a diagrammatic view of one embodiment of objects that may be used by the media gateway to manage media legs for the communication session of FIGS. 10A and 10B.

Referring to FIG. 10F, there is illustrated a diagrammatic view of one embodiment of the communication session of FIGS. 10A and 10B on the media server 1004. The media server 1004 establishes a Lync leg 1070 with the Lync server 1006 and a generic UCC leg 1072 with the generic UCC server 1008. The media server 1004 then bridges the two legs 1070 and 1072. The bridging process may include converting between different media formats and/or protocols in order to make the media received from one of the legs 1070 and 1072 compatible with the media requirements of the other of the legs.

Figure 11A:
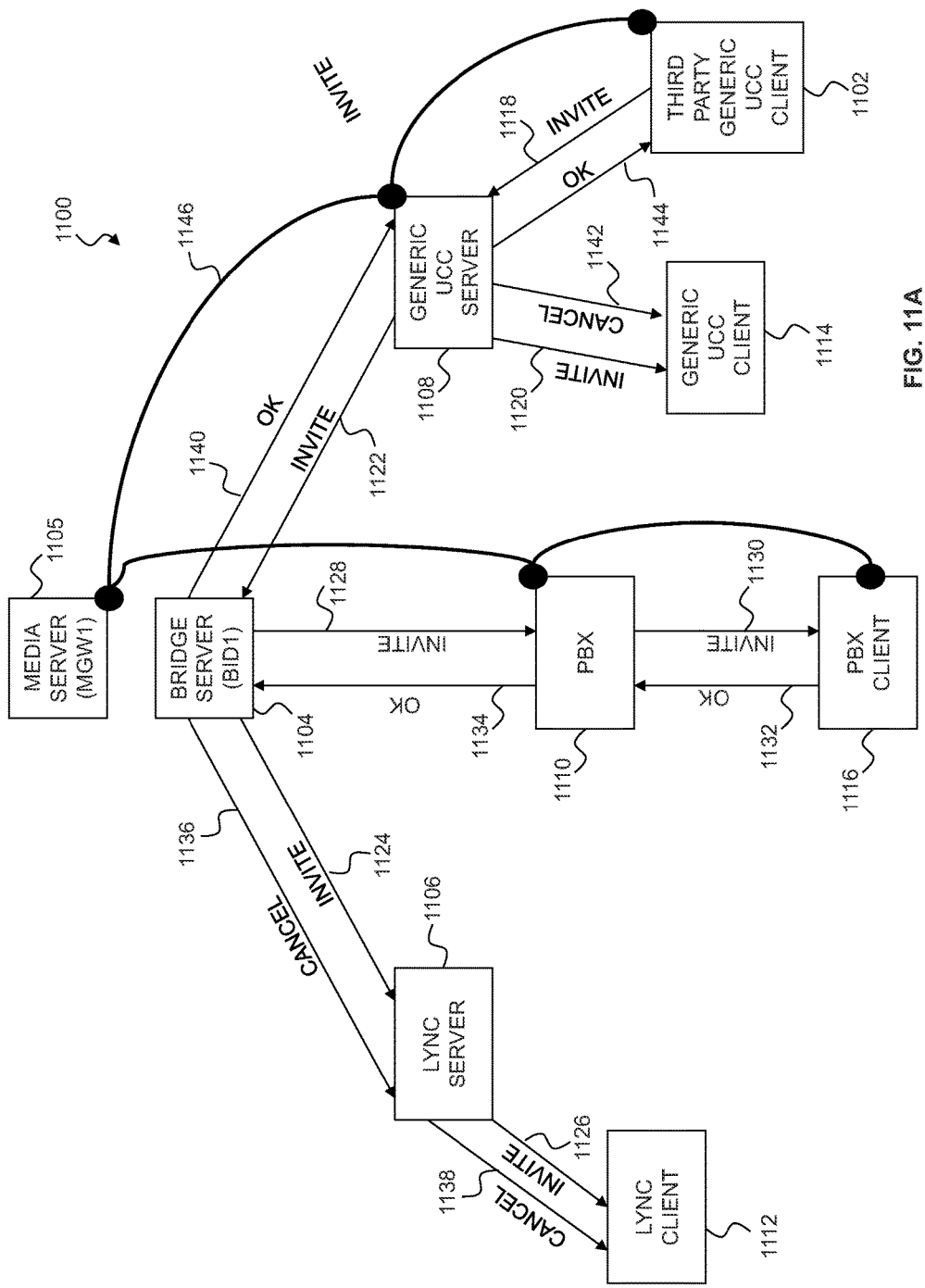
FIG. 11A illustrates a diagrammatic view of another embodiment of a communication session within the environment of FIG. 1 or FIG. 3.

Referring now to FIG. 11A, there is illustrated a diagrammatic view of an environment 1100 that shows one embodiment of the environment 300 with a communication session between a third-party generic UCC client 1102 and a PBX client 1116 corresponding to johndoe@company.com. As described with respect to FIG. 3, the user identifier johndoe@company.com is simultaneously registered by multiple clients and by the bridge server 1104. In the present example, the bridge server 1104 is registered as johndoe@company.com with a Lync server 1106, a generic UCC server 1108, and a PBX system 1110. In addition, the bridge server user has registered johndoe@company.com with a Lync client 1112 registered with the Lync server 1106, a UCC client 1114 registered with the UCC server 1108, and the PBX client 1116 registered with the PBX 1110.

Figure 11B:
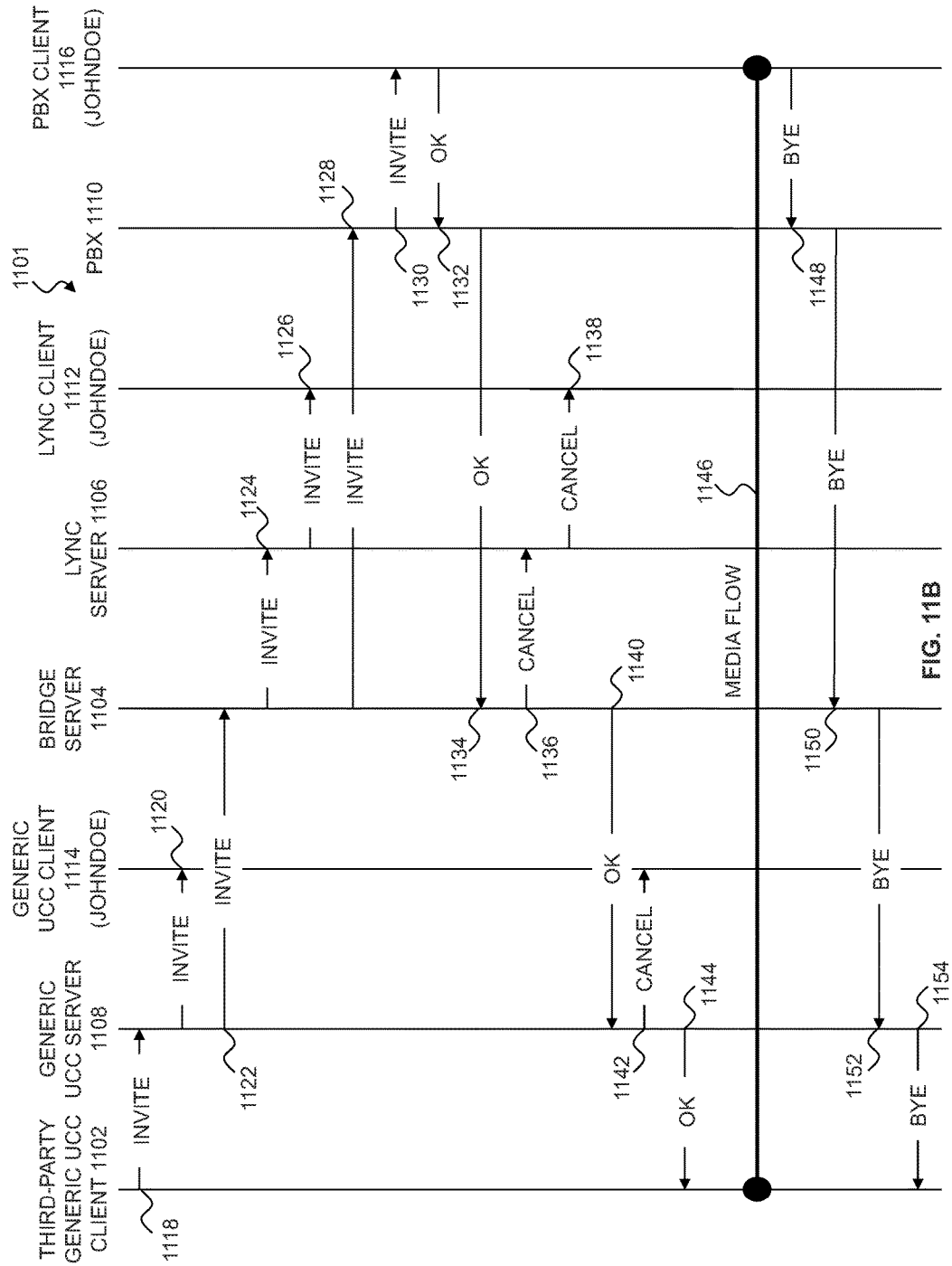
FIG. 11B illustrates a sequence diagram of one embodiment of the communication session of FIG. 11A.

With additional reference to FIG. 11B and continued reference to FIG. 11A, there is illustrated a sequence diagram 1101 of one embodiment of a message sequence that may be used to establish a communication session between the third-party generic UCC client 1102 and the PBX client 1116. In step 1118, the third-party generic UCC client 1102 initiates a communication session with the bridge server user by sending an INVITE from the third-party generic UCC client 1102 to the generic UCC server 1108. An INVITE is then sent from the generic UCC server 1108 to the generic UCC client 1114 in step 1120. Another INVITE is sent from the generic UCC server 1108 to the bridge server 1104 in step 1122. The bridge server 1104 then sends an INVITE to the Lync server 1106 in step 1124, which causes the Lync server 1106 to send an INVITE to the Lync client 1112 in step 1126. Another INVITE is sent from the bridge server 1104 to the PBX 1110 in step 1128, which causes the PBX 1110 to send an INVITE to the PBX client 1116 in step 1130.

At this point, an INVITE has been sent to each of the bridge server user's clients (Lync, generic UCC, and PBX), allowing the bridge server user to answer the communication using any of these clients. In the present example, the bridge server user answers via the PBX client 1116. This causes an OK to be sent from the PBX client 1116 to the PBX 1110 in step 1132. The PBX 1110 then sends an OK to the bridge server 1104 in step 1134. The bridge server 1104 sends a CANCEL to the Lync server 1106 in step 1136, which sends a CANCEL to the Lync client 1112 in step 1138. The bridge server 1104 also sends an OK to the generic UCC server 1108 in step 1140. The generic UCC server 1108 sends a CANCEL to the generic UCC client 1114 in step 1142 and also sends an OK to the third-party generic UCC client 1102 in step 1144.

A media flow 1146 is therefore established between the third-party generic UCC client 1102 and the PBX client 1116, with the media gateway 1105 acting to bridge the media path 1146, as shown in FIG. 11A. To end the communication session, a BYE is sent from the PBX client 1116 to the PBX 1110 in step 1148, which then sends a BYE to the bridge server 1104 in step 1150. The bridge server 1104 then sends a BYE to the generic UCC server 1108 in step 1152, which then sends a BYE to the third-party generic UCC client 1102 in step 1154. It will be understood that the BYE may originate from either side of the call.

Figure 11E:
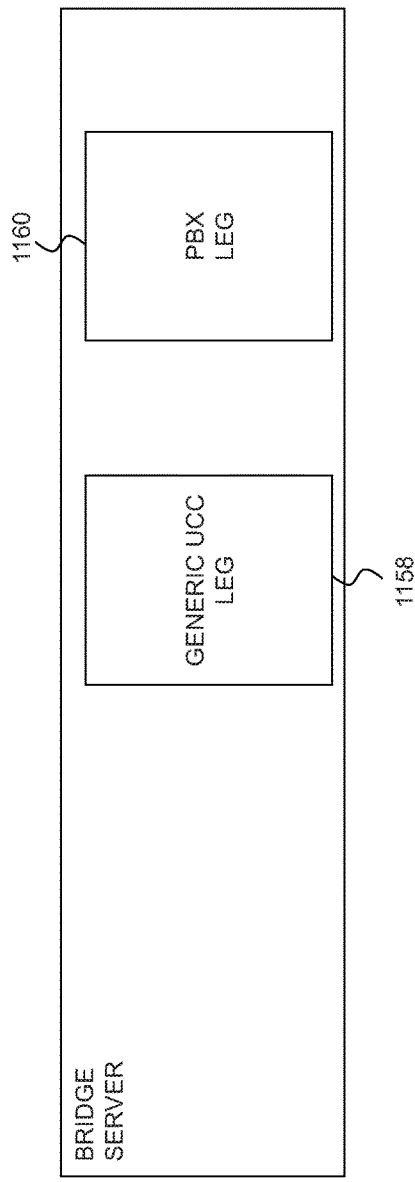

Referring now to FIGS. 11C-11E, there is illustrated a diagrammatic view of one embodiment of the communication session of FIGS. 11A and 11B on the bridge server 1104. In FIG. 11C, a generic UCC leg 1158 receives the INVITE of step 1122. The INVITE of step 1124 is sent out over a Lync leg 1156 and the INVITE of step 1128 is sent out over a PBX leg 1160, to reach their respective server, as described herein. In FIG. 11D, after the bridge server user has answered using the PBX client 1116, the OK of step 1134 is received via the PBX leg 1160. The CANCEL of step 1136 is then sent out over the Lync leg 1156 and the OK of step 1140 is sent out over the generic UCC leg 1158. This results in a signaling path being formed between the PBX leg 1160 and the generic UCC leg 1158, while the Lync leg 1156 can be destroyed as shown in FIG. 11E. It will be understood that any type of communications platform may be used, and that Lync and PBX platforms are merely used for illustrative purposes.

Figure 11F:
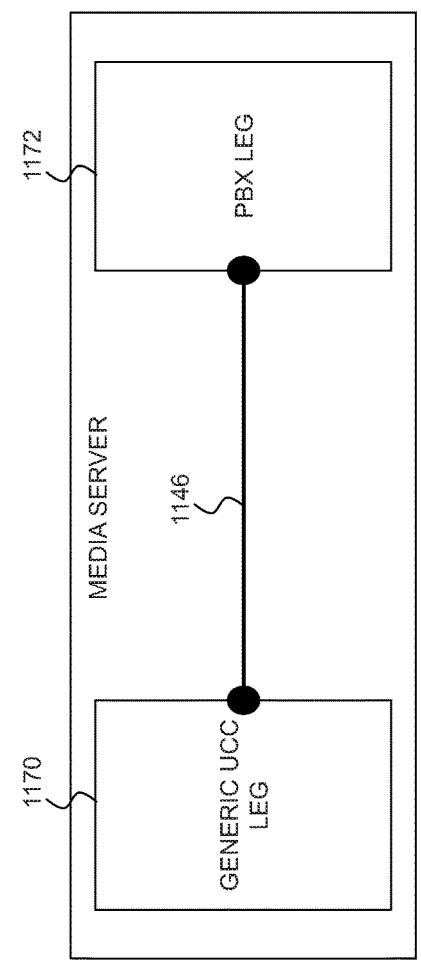
FIG. 11F illustrates a diagrammatic view of one embodiment of objects that may be used by the media gateway to manage media legs for the communication session of FIGS. 11A and 11B.

Referring to FIG. 11F, there is illustrated a diagrammatic view of one embodiment of the communication session of FIGS. 11A and 11B on the media server 1104. The media server 1104 establishes a generic UCC leg 1172 with the generic UCC server 1108 and a PBX leg 1172 with the PBX 1110. The media server 1104 then bridges the two legs 1170 and 1172. The bridging process may include converting between different media formats and/or protocols in order to make the media received from one of the legs 1170 and 1172 compatible with the media requirements of the other of the legs.

Referring to FIGS. 12A and 12B, there is illustrated a diagrammatic view of one embodiment of an instant messaging communication session that may be supported by a bridge server, such as the bridge server 302a of FIG. 3, or a media server, such as the media server 304a of FIG. 3. A first leg 1202 receives a message 1204 and a second leg 1206 sends the message 1204 out. When a user who received the message 1204 responds to the message 1204 with a message 1208, the message 1208 is received by the second leg 1206 and then sent out over the first leg 1202.

Figure 13:
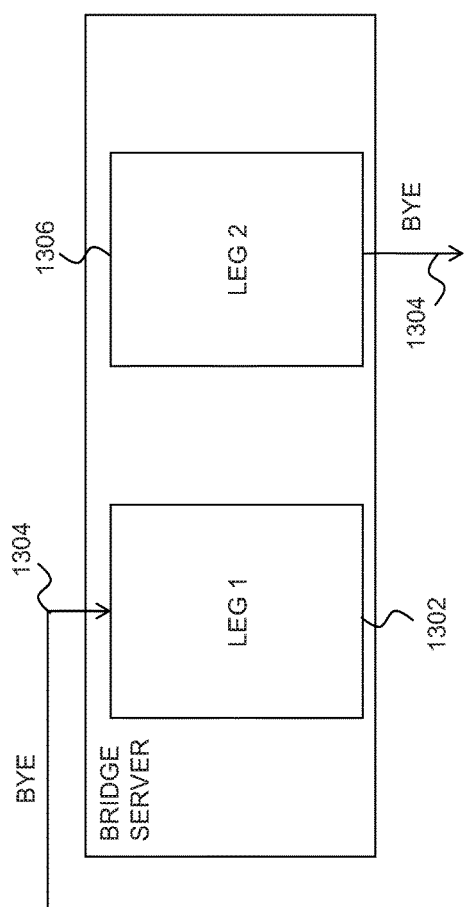
FIGS. 13 and 14 illustrate diagrammatic views of embodiments of objects that may be used by the bridge server of FIG. 1 or FIG. 3 for terminating a communication session.

Referring to FIG. 13, there is illustrated a diagrammatic view of one embodiment of messages used to terminate a communication session being supported by a bridge server, such as the bridge server 302a of FIG. 3. A first leg 1302 receives a BYE 1304 and a second leg 1306 then sends out the BYE 1304, resulting in both first and second legs 1302 and 1306 being torn down.

Figure 14:
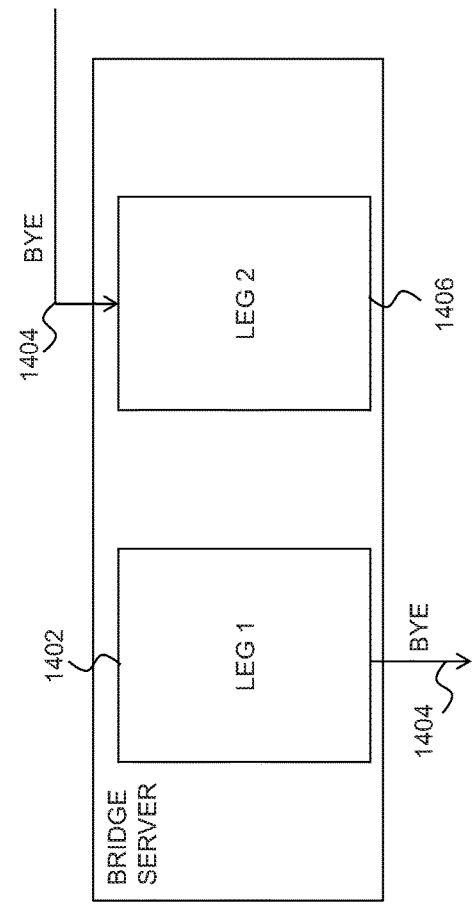

Referring to FIG. 14, there is illustrated a diagrammatic view of one embodiment of messages used to terminate a communication session being supported by a bridge server, such as the bridge server 302a of FIG. 3. A second leg 1406 receives a BYE 1404 and a first leg 1402 then sends out the BYE 1404, resulting in both first and second legs 1402 and 1406 being torn down.

Figure 15:
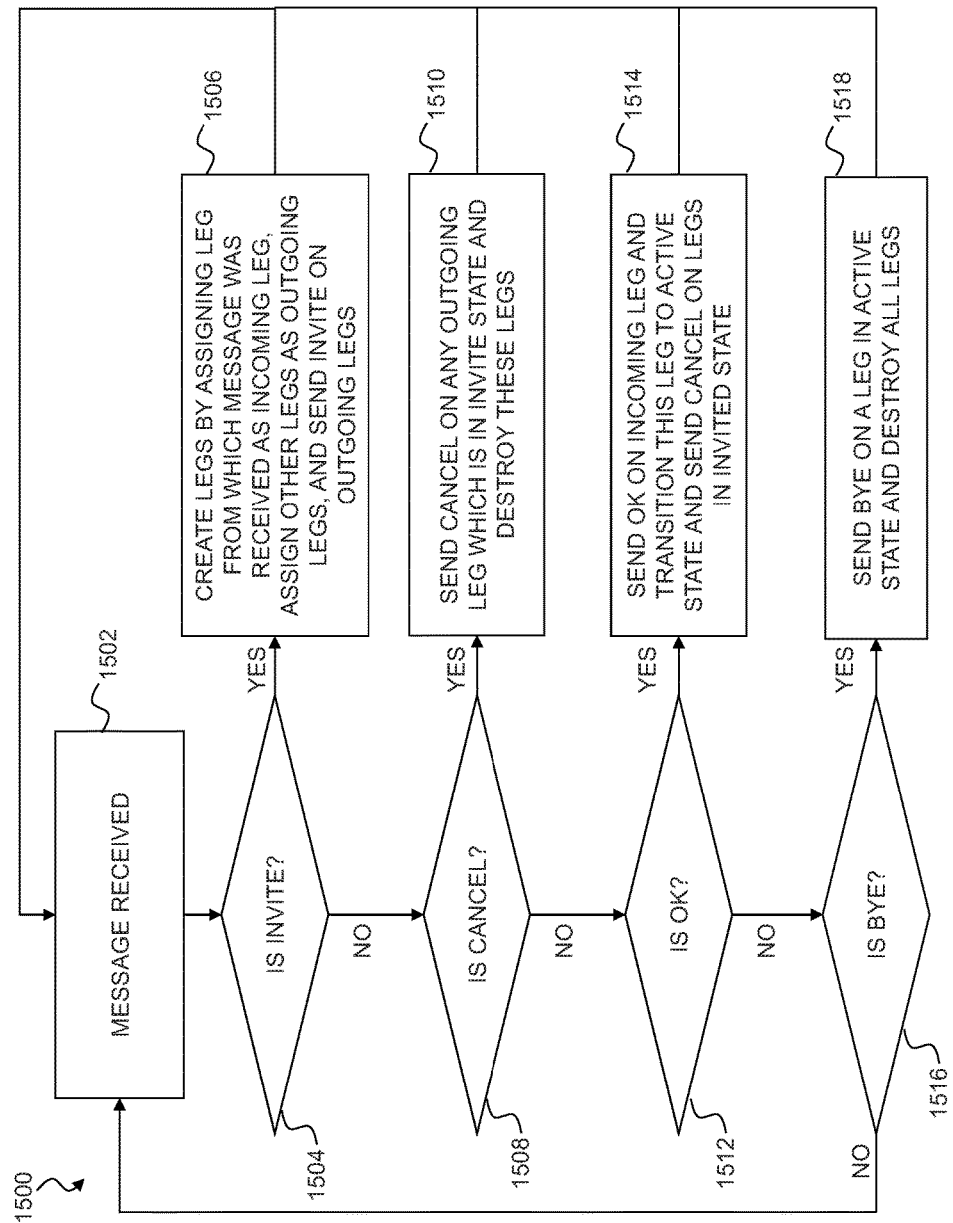
FIG. 15 illustrates a flowchart of one embodiment of a method that may be executed by the bridge server of FIG. 1 or FIG. 3 to manage messages.

Referring to FIG. 15, there is illustrated a flowchart of one embodiment of a method 1500 of conducting a communications session. The steps for conducting the communications session are specific to a single communications session for a single user. The method 1500 begins at step 1502 when a message is received by a leg on a bridge server, such as the bridge server 302a of FIG. 3. The method 1500 then moves to step 1504 where it is determined whether the message is an INVITE. If the message is an INVITE, at step 1506, call legs are created by assigning the leg from which the INVITE was received as the incoming leg and assigning the other legs as outgoing legs. The INVITE is then sent out over the outgoing legs. The method 1500 then returns to step 1502 to wait for another message to be received.

If the message is not an INVITE as determined at step 1504, the method 1500 moves to step 1508, where it is determined if the message is a CANCEL. If the message is a CANCEL, at step 1510, a CANCEL is sent out over any outgoing legs that are in an INVITE state, resulting in these legs being destroyed. The method 1500 then moves back to step 1502 to await another message to be received.

If the message is not a CANCEL as determined at step 1508, the method 1500 moves to step 1512, where it is determined whether the message is an OK. If the message is an OK, at step 1514, the OK is sent over the incoming leg to transition the incoming leg to an active state, while a CANCEL is sent out over any other legs that are in an INVITE state. This destroys those legs while the leg that is now in an active state participates in the communication session. The method 1500 then moves back to step 1502 to await another message.

If it is determined that the message is not an OK as determined at step 1512, the method 1500 moves to step 1516, where it is determined whether the message is a BYE. If the message is a BYE, the method 1500 moves to step 1518, where a BYE is sent on a leg that is in an active state, and then all legs are destroyed. The method 1500 then moves back to step 1502 to await another message.

If it is determined that the message is not a BYE as determined at step 1516, the method 1500 moves back to step 1502 to await another message, since a check has now been made for all message types (e.g., INVITE, CANCEL, OK, and BYE) and the message was found to contain none of these. It will be understood that the order in which each command is checked may be different, as the method 1500 is able to react to any message received at any time, and follows the proper procedure depending on what type of message is received. In addition, it is understood that additional message types may be checked.

Figure 16:
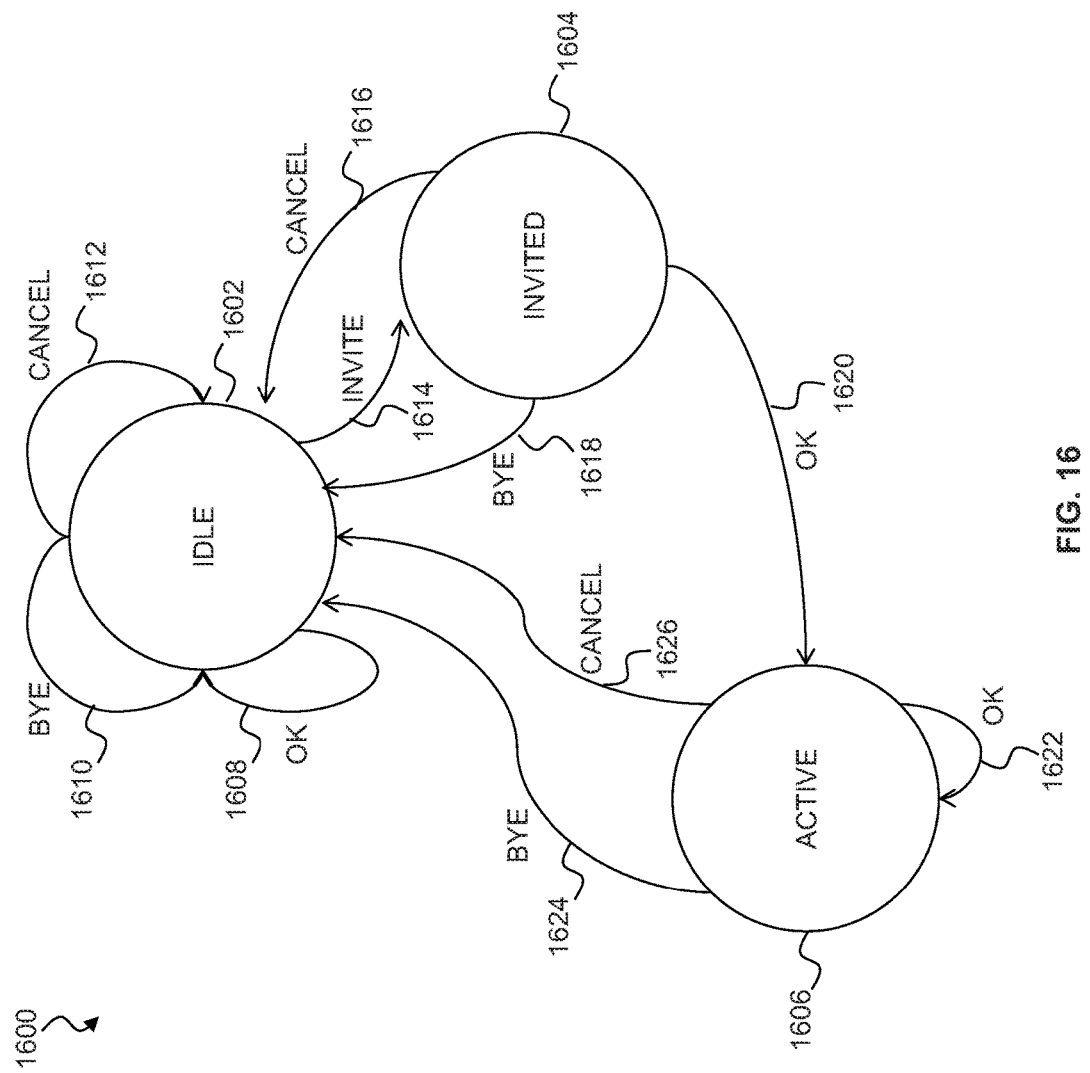
FIG. 16 illustrates a finite state machine diagram of one embodiment of available communication leg states on the bridge server of FIG. 1 or FIG. 3.

Referring now to FIG. 16, there is illustrated a finite state machine diagram view of one embodiment of a bridge server 1600, that may be similar or identical the bridge server 302a of FIG. 3. Different states may be associated for each call leg. In the present example, there is an IDLE state 1602, an INVITED state 1604, and an ACTIVE state 1606. When in the IDLE state 1602, the receipt of an OK 1608, a BYE 1610, and a CANCEL 1612 for the call leg will result in the call leg remaining in the IDLE state 1602. The only way for the call leg to leave the IDLE state 1602 is for an INVITE 1614 to be received. If the INVITE 1614 is received, the call leg's state changes to the INVITED state 1604.

While in the INVITE state 1604, a CANCEL 1616 or a BYE 1618 will return the call leg's state to the IDLE state 1602. If an OK 1620 is received, the state changes from the INVITE stated 1604 to the ACTIVE state 1606. While in the ACTIVE state 1606, if an OK 1622 is received, the state remains in the ACTIVE state 1606. If a BYE 1624 or a CANCEL 1626 is received, the state changes from the ACTIVE state 1606 to the IDLE state 1602. If any INVITE messages are received while in the INVITED state 1604 or the ACTIVE state 1606, the state will remain unchanged.

It is understood that, in all the embodiments described herein, the INVITE, OK, CANCEL, and BYE messages sent over the legs of the communication session may be separate messages passed between each node in the communication session, or they may be single messages. For example, an INVITE sent from a client to a server may be one unique INVITE command, while the subsequent INVITE message sent from the server to the bridge server may be another unique message. However, a single INVITE sent from a client to a server may also be forwarded to the bridge server as the same message, rather than as a unique message.

Figure 17:
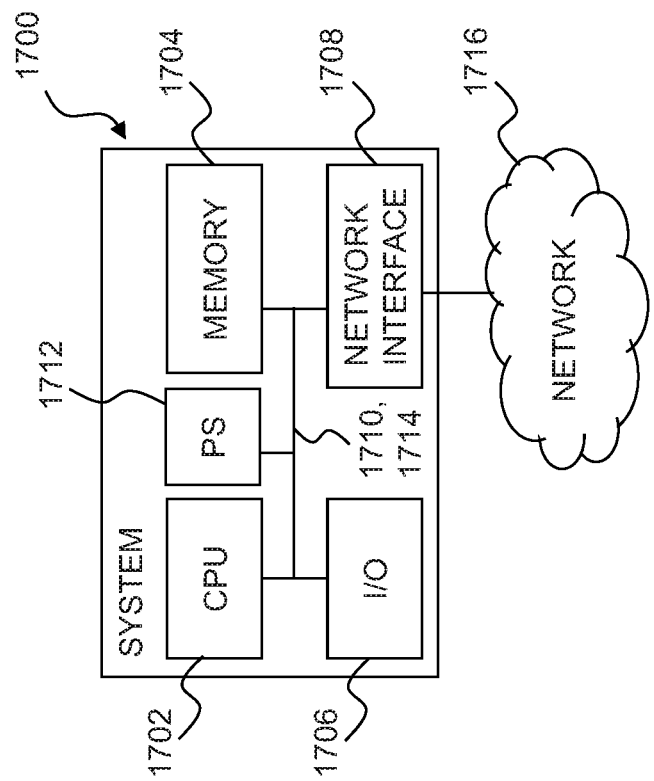
FIG. 17 illustrates a diagrammatic view of one embodiment of a device that may be used within the environments of FIG. 1 and FIG. 3.

Referring to FIG. 17, one embodiment of a device 1700 is illustrated. The device 1700 is one example of a portion or all of the server 108, the server 110, the client 108, the client 112, the bridge server 114, and/or the media server 118 of FIG. 1, as well as other clients and servers described in other embodiments, including FIG. 3. The system 1700 may include a controller (e.g., a processor/central processing unit ("CPU")) 1702, a memory unit 1704, an input/output ("I/O") device 1706, and a network interface 1708. The components 1702, 1704, 1706, and 1708 are interconnected by a data transport system (e.g., a bus) 1710. A power supply (PS) 1712 may provide power to components of the system 1700 via a power transport system 1714 (shown with data transport system 180, although the power and data transport systems may be separate).

It is understood that the system 1700 may be differently configured and that each of the listed components may actually represent several different components. For example, the CPU 1702 may actually represent a multi-processor or a distributed processing system; the memory unit 1704 may include different levels of cache memory, main memory, hard disks, and remote storage locations; the I/O device 1706 may include monitors, keyboards, and the like; and the network interface 1708 may include one or more network cards providing one or more wired and/or wireless connections to a network 1716. Therefore, a wide range of flexibility is anticipated in the configuration of the system 1700, which may range from a single physical platform configured primarily for a single user or autonomous operation to a distributed multi-user platform such as a cloud computing system.

The system 1700 may use any operating system (or multiple operating systems), including various versions of operating systems provided by Microsoft (such as WINDOWS), Apple (such as Mac OS X), UNIX, and LINUX, and may include operating systems specifically developed for handheld devices (e.g., iOS, Android, Blackberry, and/or Windows Phone), personal computers, servers, and other computing platforms depending on the use of the system 1700. The operating system, as well as other instructions (e.g., for telecommunications and/or other functions provided by the device 1700), may be stored in the memory unit 1704 and executed by the processor 1702. For example, if the system 1700 is the device 1700, the memory unit 1704 may include instructions for performing some or all of the steps, process, and methods described herein.

The network 1716 may be a single network or may represent multiple networks, including networks of different types, whether wireless or wireline. For example, the device 1700 may be coupled to external devices via a network that includes a cellular link coupled to a data packet network, or may be coupled via a data packet link such as a wide local area network (WLAN) coupled to a data packet network or a Public Switched Telephone Network (PSTN). Accordingly, many different network types and configurations may be used to couple the device 1700 with external devices.

While the preceding description shows and describes one or more embodiments, it will be understood by those skilled in the art that various changes in form and detail may be made therein without departing from the spirit and scope of the present disclosure. For example, various steps illustrated within a particular flow chart or sequence diagram may be combined or further divided. In addition, steps described in one flow chart or diagram may be incorporated into another flow chart or diagram. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. A method for supporting a cross-domain communication session between communication platforms using a bridge server, the method comprising:
    registering, by a bridge server, with a plurality of communication platforms using a user identifier, wherein at least two of the communication platforms are in incompatible domains and cannot communicate directly with one another, and wherein the user identifier is registered with each of the communication platforms via one or more clients that are in communication with the communication platforms;
    receiving, by the bridge server, a request to establish a communication session with a user corresponding to the user identifier, the request being received from one of the communication platforms;
    creating, by the bridge server, a separate communication leg for each of the communication platforms, wherein the communication leg created for the communication platform from which the request was received is designated as an incoming leg and any other of the communication legs are designated as outgoing legs;
    sending, by the bridge server, the request to establish the communication session over the outgoing legs;
    receiving, by the bridge server, a communication acceptance from one of the outgoing legs;
    sending, by the bridge server, a cancel message over any of the outgoing legs from which the communication acceptance was not received;
    sending, by the bridge server, the communication acceptance over the incoming leg; and
    bridging, by the bridge server, the incoming leg and the outgoing leg from which the communication acceptance was received to establish the communication session, wherein bridging the incoming leg and the outgoing leg to establish the communication session includes creating a bridged media path through which communications sent over the incoming leg and the outgoing leg by the communication platforms during the communication session are first received by the bridge server before transmitting the communications to the communication platforms, and wherein the bridge server is configured to convert information received over the bridged media path between different media formats if the media format used by the incoming leg is different than the media format used by one of the outgoing legs.

2. The method of claim 1 further comprising:
    receiving, from one of the incoming leg and the outgoing leg from which the communication acceptance was received, a communication session termination request;
    sending the communication session termination request over the incoming leg or the outgoing leg from which the communication session termination request was not received; and
    destroying all of the communication legs.

3. The method of claim 1, wherein the bridge server is coupled to a media server that forms part of a cross-domain system with the bridge server, wherein the media server handles media legs for the communication session.

4. The method of claim 3, wherein the cross-domain system includes a cross-domain database having a plurality of information specific to the communication platforms.

5. The method of claim 4, wherein the plurality of information includes an IP address, a port number, and a plurality of functionality identifiers, the plurality of functionality identifiers indicating whether each of the communication platforms supports certain Unified Communications and Collaboration (UCC) functions.

6. The method of claim 5 further comprising managing the communication session by the bridge server, wherein the bridge server uses the plurality of information contained in the cross-domain database to enable communications between the communication platforms that are in incompatible domains and cannot communicate directly with one another.

7. The method of claim 1 wherein the bridge server bridges the incoming leg and the outgoing leg both when the communication platforms corresponding to the incoming leg and outgoing leg are in incompatible domains and cannot communicate directly with one another and when the communication platforms corresponding to the incoming leg and outgoing leg are in compatible domains and can communicate directly with one another.

8. The method of claim 1 further comprising:
receiving, by the bridge server, a second request to establish a second communication session with the user corresponding to the user identifier, the second request being received from one of the communication platforms;
creating, by the bridge server, a separate second communication leg for each of the communication platforms, wherein the second communication leg created for the communication platform from which the second request was received is designated as a second incoming leg and any other of the second communication legs are designated as second outgoing legs;
sending, by the bridge server, the second request to establish the communication session over the second outgoing legs;
receiving, by the bridge server, a cancel message from the second incoming leg;
sending, by the bridge server, the cancel message over the second outgoing legs; and
destroying, by the bridge server, the second communication legs.

9. A method for supporting a cross-domain communication session between communication platforms using a bridge server, the method comprising:
registering, by a bridge server, with a plurality of communication platforms using a user identifier, wherein at least two of the communication platforms are in incompatible domains and cannot communicate directly with one another, and wherein the user identifier is registered with each of the communication platforms via one or more clients that are in communication with the communication platforms;
receiving, by the bridge server, a request to establish a communication session with the user corresponding to the user identifier, the request being received from one of the communication platforms;
creating, by the bridge server, a separate communication leg for each of the communication platforms, wherein the communication leg created for the communication platform from which the request was received is designated as an incoming leg and any other of the communication legs are designated as outgoing legs;
sending, by the bridge server, the request to establish the communication session over the outgoing legs;
receiving, by the bridge server, a cancel message from the incoming leg;
sending, by the bridge server, a cancel message over the outgoing legs; and
destroying, by the bridge server, all of the communication legs,
wherein the bridge server is configured to:
bridge the incoming leg and the outgoing leg to establish the communication session to create a bridged media path through which communications sent over the incoming leg and the outgoing leg by the communication platforms during the communication session are first received by the bridge server before transmitting the communications to the communication platforms, and
convert information received over the bridge media path between different media formats if the media format used by the incoming leg is different than the media format used by one of the outgoing legs.

10. The method of claim 9, wherein the bridge server is coupled to a media server that forms part of a cross-domain system with the bridge server, wherein the media server handles media legs for any communication sessions managed by the bridge server.

11. The method of claim 10, wherein the cross-domain system includes a cross-domain database having a plurality of information specific to the communication platforms.

12. The method of claim 11, wherein the plurality of information includes an IP address, a port number, and a plurality of functionality identifiers, the plurality of functionality identifiers indicating whether each of the communication platforms supports certain Unified Communications and Collaboration (UCC) functions.

13. The method of claim 12 wherein the bridge server uses the plurality of information contained in the cross-domain database to enable communications between any of the communication platforms that are in incompatible domains and cannot communicate directly with one another.

14. A system for supporting a cross-domain communication session between communication platforms using a bridge server, the system comprising:
a processor; and
a memory coupled to the processor, the memory containing computer executable instructions for:
providing a bridge server;
registering, by the bridge server, with a plurality of communication platforms using a user identifier, wherein at least two of the communication platforms are in incompatible domains and cannot communicate directly with one another, and wherein the user identifier is registered with each of the communication platforms via one or more clients that are in communication with the communication platforms;
receiving, by the bridge server, a request to establish a communication session with a user corresponding to the user identifier, the request being received from one of the communication platforms;
creating, by the bridge server, a separate communication leg for each of the communication platforms, wherein the communication leg created for the communication platform from which the request was received is designated as an incoming leg and any other of the communication legs are designated as outgoing legs;

sending, by the bridge server, the request to establish the communication session over the outgoing legs;

receiving, by the bridge server, a communication acceptance from one of the outgoing legs;

sending, by the bridge server, a cancel message over any of the outgoing legs from which the communication acceptance was not received;

sending, by the bridge server, the communication acceptance over the incoming leg; and bridging, by the bridge server, the incoming leg and the outgoing leg from which the communication acceptance was received to establish the communication session, wherein bridging the incoming leg and the outgoing leg to establish the communication session includes creating a bridged media path through which communications sent over the incoming leg and the outgoing leg by the communication platforms during the communication session are first received by the bridge server before transmitting the communications to the communication platforms, and wherein the bridge server is configured to convert information received over the bridged media path between different media formats if the media format used by the incoming leg is different than the media format used by one of the outgoing legs.

15. The system of claim 14 further comprising instructions for:

receiving, from one of the incoming leg and the outgoing leg from which the communication acceptance was received, a communication session termination request;

sending the communication session termination request over the incoming leg or the outgoing leg from which the communication session termination request was not received; and destroying all of the communication legs.

16. The system of claim 14, wherein the bridge server is coupled to a media server that forms part of a cross-domain system with the bridge server, wherein the media server handles media legs for the communication session.

17. The system of claim 16, wherein the cross-domain system includes a cross-domain database having a plurality of information specific to the communication platforms.

18. The system of claim 17, wherein the plurality of information includes an IP address, a port number, and a plurality of functionality identifiers, the plurality of functionality identifiers indicating whether each of the communication platforms supports certain Unified Communications and Collaboration (UCC) functions.

19. The system of claim 18 further comprising instructions for managing the communication session by the bridge server, wherein the bridge server uses the plurality of information contained in the cross-domain database to enable communications between the communication platforms that are in incompatible domains and cannot communicate directly with one another.

20. The system of claim 14, wherein the bridge server bridges the incoming leg and the outgoing leg both when the communication platforms corresponding to the incoming leg and outgoing leg are in incompatible domains and cannot communicate directly with one another and when the communication platforms corresponding to the incoming leg and outgoing leg are in compatible domains and can communicate directly with one another.

21. The system of claim 14 further comprising instructions for:

receiving, by the bridge server, a second request to establish a second communication session with the user corresponding to the user identifier, the second request being received from one of the communication platforms;

creating, by the bridge server, a separate second communication leg for each of the communication platforms, wherein the second communication leg created for the communication platform from which the second request was received is designated as a second incoming leg and any other of the second communication legs are designated as second outgoing legs;

sending, by the bridge server, the second request to establish the communication session over the second outgoing legs;

receiving, by the bridge server, a cancel message from the second incoming leg;

sending, by the bridge server, the cancel message over the second outgoing legs; and destroying, by the bridge server, the second communication legs.

22. A system for supporting a cross-domain communication session between communication platforms using a bridge server, the system comprising:

a processor; and a memory coupled to the processor, the memory containing computer executable instructions for:

providing a bridge server;

registering, by the bridge server, with a plurality of communication platforms using a user identifier, wherein at least two of the communication platforms are in incompatible domains and cannot communicate directly with one another, and wherein the user identifier is registered with each of the communication platforms via one or more clients that are in communication with the communication platforms;

receiving, by the bridge server, a request to establish a communication session with the user corresponding to the user identifier, the request being received from one of the communication platforms;

creating, by the bridge server, a separate communication leg for each of the communication platforms, wherein the communication leg created for the communication platform from which the request was received is designated as an incoming leg and any other of the communication legs are designated as outgoing legs;

sending, by the bridge server, the request to establish the communication session over the outgoing legs;

receiving, by the bridge server, a cancel message from the incoming leg;

sending, by the bridge server, the cancel message over the outgoing legs; and destroying, by the bridge server, all of the communication legs, wherein the bridge server is configured to:

bridge the incoming leg and the outgoing leg to establish the communication session to create a bridged media path through which communications sent over the incoming leg and the outgoing leg by the communication platforms during the communication session are first received by the bridge server before transmitting the communications to the communication platforms, and convert information received over the bridged media path between different media formats if the media format used by the incoming leg is different than the media format used by one of the outgoing legs.

23. The system of claim 22, wherein the bridge server is coupled to a media server that forms part of a cross-domain system with the bridge server, wherein the media server handles media legs for any communication sessions managed by the bridge server.

24. The system of claim 23, wherein the cross-domain system includes a cross-domain database having a plurality of information specific to the communication platforms.

25. The system of claim 24, wherein the plurality of information includes an IP address, a port number, and a plurality of functionality identifiers, the plurality of functionality identifiers indicating whether each of the communication platforms supports certain Unified Communications and Collaboration (UCC) functions.

26. The system of claim 25 wherein the bridge server uses the plurality of information contained in the cross-domain database to enable communications between any of the communication platforms that are in incompatible domains and cannot communicate directly with one another.

27. A system for supporting a cross-domain communication session between communication platforms, the system comprising:
   a bridge server registered with at least two communication platforms using a user identifier, wherein the at least two communication platforms are in separate and incompatible domains and wherein the user identifier is recognized by all of the at least two communication platforms; and
   a cross-domain database having a plurality of information specific to the at least two communication platforms and the user identifier,
   wherein the bridge server is configured to receive communications requests from the at least two communication platforms, to manage communication sessions between the at least two communication platforms using the plurality of information specific to the at least two communication platforms, to create a bridged media path through which communications for the communication session between the at least two communication platforms are first received by the bridge server before transmitting the communications to the communication platforms, and to convert information received over the bridge media path between different media formats if the media format used by one of the at least two communication platforms is different than the media format used by another one of the at least two communication platforms.

28. The system of claim 27 further comprising a media server interfaced with the bridge server.

29. The system of claim 27, wherein the plurality of information includes an IP address, a port number, and a plurality of functionality identifiers, the plurality of functionality identifiers indicating whether each of the communication platforms supports certain Unified Communications and Collaboration (UCC) functions.

30. The system of claim 27, wherein one of the at least two communication platforms is compatible with another one of the at least two communication platforms.

* * * * *